US010264568B2

(12) United States Patent
Zhang et al.

(10) Patent No.: US 10,264,568 B2
(45) Date of Patent: Apr. 16, 2019

(54) BEAM CONFIGURATION METHOD, BASE STATION, AND USER EQUIPMENT

(71) Applicant: Huawei Technologies Co., Ltd., Shenzhen (CN)

(72) Inventors: Jian Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 44 days.

(21) Appl. No.: 15/466,546

(22) Filed: Mar. 22, 2017

(65) Prior Publication Data

US 2017/0195998 A1 Jul. 6, 2017

Related U.S. Application Data

(63) Continuation of application No. PCT/CN2014/087193, filed on Sep. 23, 2014.

(51) Int. Cl.
*H04W 72/04* (2009.01)
*H04W 74/08* (2009.01)
*H04W 56/00* (2009.01)
*H04W 24/10* (2009.01)
*H04B 7/06* (2006.01)
(Continued)

(52) U.S. Cl.
CPC ........ *H04W 72/042* (2013.01); *H04B 7/0695* (2013.01); *H04B 7/086* (2013.01); *H04L 5/0048* (2013.01); *H04L 5/0057* (2013.01); *H04W 24/10* (2013.01); *H04W 56/0005* (2013.01); *H04W 74/0833* (2013.01); *H04B 7/0421* (2013.01); *H04B 7/0632* (2013.01); *H04W 72/046* (2013.01)

(58) Field of Classification Search
CPC ........... H04W 72/042; H04W 56/0005; H04W 74/0833; H04W 24/10; H04B 7/086; H04L 5/0048; H04L 5/0057
See application file for complete search history.

(56) References Cited

U.S. PATENT DOCUMENTS

2011/0110250 A1 5/2011 Jeon et al.
2013/0065622 A1* 3/2013 Hwang ................. H04W 16/28
455/500

(Continued)

FOREIGN PATENT DOCUMENTS

CN 104115419 A 10/2014
JP 2011517392 A 6/2011
(Continued)

*Primary Examiner* — Raj Jain
*Assistant Examiner* — Harry H Kim
(74) *Attorney, Agent, or Firm* — Leydig, Voit & Mayer, Ltd.

(57) ABSTRACT

The present invention discloses a beam configuration method which includes: sending initial beam index information of an initial beam, allocated for user equipment, of a millimeter wave band to the user equipment; receiving a radio resource management (RRM) measurement report from the user equipment, where the RRM measurement report is obtained after the user equipment performs RRM measurement on the initial beam that is indicated by the initial beam index information; and determining, according to the RRM measurement report, the initial beam index information that is used for communication with the user equipment.

20 Claims, 5 Drawing Sheets

(51) Int. Cl.
*H04B 7/08* (2006.01)
*H04B 7/0417* (2017.01)
*H04L 5/00* (2006.01)

(56) References Cited

U.S. PATENT DOCUMENTS

| | | | |
|---|---|---|---|
| 2013/0155847 A1 | 6/2013 | Li et al. | |
| 2014/0349693 A1 | 11/2014 | Kim et al. | |
| 2015/0181450 A1* | 6/2015 | Xin | H04W 76/28 370/252 |
| 2016/0006549 A1* | 1/2016 | Kim | H04L 1/0026 370/252 |
| 2016/0028519 A1* | 1/2016 | Wei | H04B 7/0456 375/267 |
| 2017/0272223 A1* | 9/2017 | Kim | H04B 7/0617 |

FOREIGN PATENT DOCUMENTS

| | | |
|---|---|---|
| WO | WO 2013089495 A1 | 6/2013 |
| WO | WO 2014036150 A1 | 3/2014 |
| WO | WO 2014116928 A1 | 7/2014 |

* cited by examiner

BEAM CONFIGURATION METHOD, BASE STATION, AND USER EQUIPMENT

CROSS-REFERENCE TO RELATED APPLICATIONS

This application is a continuation of International Application No. PCT/CN2014/087193, filed on Sep. 23, 2014, the disclosure of which is hereby incorporated by reference in its entirety.

TECHNICAL FIELD

Embodiments of the present invention relate to the communications field, and in particular, to a beam configuration method, a base station, and user equipment.

BACKGROUND

As packet services and intelligent terminals rapidly develop, a requirement of high-speed and large-data volume services on a spectrum is continuously increasing. In existing cellular communication, for example, Long Term Evolution (English: Long Term Evolution, LTE for short), generally a band around 2 GHz or a lower band is used for data transmission. For example, maximum bandwidth supported by Long Term Evolution Advanced (English: Long Term Evolution Advanced, LTE-A for short) is 100 MHz, and a spectrum range that can be used is limited.

To meet a requirement of a service on a spectrum, a 60 GHz band is used for wireless local area network (English: Wireless Local Area Network, WLAN for short) in the IEEE 802.11ad standard, and is generally used for indoor communication with a short distance of around 10 meters. The 60 GHz band belongs to a millimeter wave band. In a broad sense, the millimeter wave band includes a spectrum of 3 GHz to 300 GHz, and generally, for millimeter wave communication, a band of 6 GHz to 100 GHz is mainly studied. The millimeter wave band has relatively large free space attenuation, and factors such as air absorption, and absorption and scattering of rain, fog, a building, or another object lead to extremely severe signal attenuation.

During a process of implementing the present invention, the inventors find that the prior art has at least the following disadvantages: There is severe attenuation of an existing millimeter wave band, consequently a transmission distance is relatively short, and a millimeter wave is seldom considered for cellular communication in the prior art; therefore, a data communication requirement of UE in a cellular communication environment cannot be met.

SUMMARY

To resolve existing problems of a relatively short transmission distance caused by severe attenuation of a millimeter wave band and a failure to meet a data communication requirement of user equipment in a cellular communication environment, embodiments of the present invention provide a beam configuration method, a base station, and user equipment. The technical solutions are as follows:

According to a first aspect, an embodiment of the present invention provides a base station, where the base station includes:

a sending module, configured to send initial beam index information of an initial beam, allocated for user equipment, of a millimeter wave band to the user equipment;

a receiving module, configured to receive a radio resource management RRM measurement report from the user equipment, where the RRM measurement report is obtained after the user equipment performs RRM measurement on the initial beam that is indicated by the initial beam index information sent by the sending module; and a determining module, configured to determine, according to the RRM measurement report received by the receiving module, the initial beam index information that is used for communication with the user equipment.

In a first possible implementation manner of the first aspect, the determining module is specifically configured to determine, from reference signal information corresponding to each piece of initial beam index information in the RRM measurement report, first initial beam index information of which the reference signal information is greater than a first threshold, where the reference signal information includes at least one of reference signal received power RSRP or reference signal received quality RSRQ; and the sending module is further configured to send control information to the user equipment on a control channel by using an initial beam corresponding to the first initial beam index information determined by the determining module, and the user equipment is configured to: after switching from a dormant state to an active state, listen to the control information by using the initial beam corresponding to the determined first initial beam index information.

In a second possible implementation manner of the first aspect, the determining module is specifically configured to specify second initial beam index information from each piece of initial beam index information in the RRM measurement report by using at least one of radio resource control RRC signaling or a Media Access Control control element MAC CE, where an initial beam corresponding to the specified second initial beam index information is used to send the control information to the user equipment on a control channel.

In a third possible implementation manner of the first aspect, the sending module is further configured to send alternative beam index information of an alternative beam, allocated for the user equipment, of a millimeter wave band to the user equipment;

the receiving module is further configured to receive first alternative beam index information that is selected from each piece of alternative beam index information sent by the sending module and that is sent by the user equipment, where the first alternative beam index information is alternative beam index information of which reference signal information of the initial beam is less than a second threshold and of which reference signal information determined after RRM measurement is performed on an alternative beam indicated by each piece of alternative beam index information is greater than a third threshold, and the reference signal information includes at least one of RSRP or RSRQ; and the base station further includes a communication module, configured to communicate with the user equipment according to an alternative beam corresponding to the first alternative beam index information received by the receiving module.

With reference to the third possible implementation manner of the first aspect, in a fourth possible implementation manner of the first aspect, the receiving module is further configured to receive a first random access request sent by the user equipment;

the base station further includes a generating module, configured to generate uplink timing advance TA according to the first random access request; and the communication module is configured to communicate with the user equipment according to the uplink TA generated by the generating module and the alternative beam corresponding to the received first alternative beam index information.

With reference to the third possible implementation manner of the first aspect, in a fifth possible implementation manner of the first aspect, the determining module is configured to determine, by using beam tracking, to use the alternative beam allocated for the user equipment to communicate with the user equipment;

the sending module is further configured to send a random access instruction to the user equipment on a control channel;

the receiving module is further configured to receive a second random access request that is sent by the user equipment according to the random access instruction sent by the sending module;

the base station further includes a generating module, configured to generate uplink TA according to the second random access request; and the communication module is further configured to communicate with the user equipment according to the uplink TA generated by the generating module and an alternative beam corresponding to allocated second alternative beam index information.

With reference to the first aspect, the fourth possible implementation manner of the first aspect, or the fifth possible implementation manner of the first aspect, in a sixth possible implementation manner of the first aspect, the determining module is further configured to determine beams that have same uplink TA and are in beams for communication with the user equipment as a group, where the beam includes at least one of the initial beam or the alternative beam;

the generating module is further configured to generate one TA set according to each group obtained by the determining module, where the TA set includes a TA set identifier, beam index information of each beam in the group, and a cell identifier and a time alignment timer TAT that correspond to each beam in the group; and the sending module is further configured to send the TA set generated by the generating module to the user equipment.

In a seventh possible implementation manner of the first aspect, the receiving module is further configured to: after the determining module determines, according to the RRM measurement report, the initial beam index information that is used for communication with the user equipment, receive a power headroom report PHR from the user equipment, where the PHR includes power headroom PH, and the PH is generated, after path loss information is obtained by measuring RSRP of each initial beam, according to smallest path loss information;

the base station further includes an allocating module, configured to allocate an uplink resource for the user equipment according to the PH received by the receiving module and an initial beam corresponding to the PH; and the communication module is specifically configured to communicate, by using the initial beam corresponding to the PH, with the user equipment on the corresponding uplink resource allocated by the allocating module.

With reference to the seventh possible implementation manner of the first aspect, in an eighth possible implementation manner of the first aspect, the sending module is further configured to: before the receiving module receives the power headroom report PHR from the user equipment, send, to the user equipment, a first indication carrying first beam index information of a first beam in a beam range of a single initial beam, where the first indication is used to instruct the user equipment to measure RSRP of the first beam.

In a ninth possible implementation manner of the first aspect, the receiving module is configured to: after the determining module determines, according to the RRM measurement report, the initial beam index information that is used for communication with the user equipment, receive a channel state information CSI measurement report from the user equipment, where the CSI measurement report includes CSI information, and the CSI information is generated, after a channel quality indicator CQI is obtained by performing CSI measurement on each initial beam, according to a highest CQI; and the communication module is specifically configured to communicate with the user equipment according to the CSI information received by the receiving module and an initial beam corresponding to the CSI information.

With reference to the ninth possible implementation manner of the first aspect, in a tenth possible implementation manner of the first aspect, the sending module is further configured to: before the receiving module receives a channel state information CSI measurement report from the user equipment, send, to the user equipment, a second indication carrying second beam index information of a second beam in a beam range of a single initial beam, where the second indication is used to instruct the user equipment to perform CSI measurement on the second beam.

In an eleventh possible implementation manner of the first aspect, the base station further includes an adjustment module, configured to: after the determining module determines, according to the RRM measurement report, the initial beam index information that is used for communication with the user equipment, adjust cell bandwidth according to a traffic volume of at least one user equipment, where the cell bandwidth has a positive correlation with the traffic volume; and the sending module is further configured to broadcast information about cell bandwidth adjusted by the adjustment module and information about a center frequency to each user equipment, or send information about adjusted cell bandwidth and information about a center frequency to each user equipment by using RRC signaling, where the center frequency is a center frequency in a frequency range corresponding to the adjusted cell bandwidth or is a specified frequency in the frequency range.

With reference to the eleventh possible implementation manner of the first aspect, in a twelfth possible implementation manner of the first aspect, if the adjusted cell includes same-bandwidth channels:

the sending module is further configured to send common information to each user equipment on a channel located at the center frequency, or send common information to each user equipment on a central frequency of each channel.

In a thirteenth possible implementation manner of the first aspect, the base station further includes an adjustment module, configured to: after the determining module determines, according to the RRM measurement report, the initial beam index information that is used for communication with the user equipment, adjust user bandwidth of the user equipment according to a traffic volume of the user equipment, where the user bandwidth has a positive correlation with the traffic volume; and the sending module is further configured to send, by using at least one of RRC signaling, a MAC CE, or a control channel, information about user bandwidth adjusted by the adjustment module to the user equipment.

With reference to the thirteenth possible implementation manner of the first aspect, in a fourteenth possible implementation manner of the first aspect, the adjustment module is specifically configured to adjust, according to the traffic volume of the user equipment, a channel allocated for the user equipment, to obtain the user bandwidth.

According to a second aspect, an embodiment of the present invention provides user equipment, where the user equipment includes:

a receiving module, configured to receive initial beam index information sent by a base station, where the initial beam index information is used to indicate an initial beam, allocated by the base station for the user equipment, of a millimeter wave band; and a sending module, configured to send a radio resource management RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In a first possible implementation manner of the second aspect, if the RRM measurement report includes reference signal information corresponding to each piece of initial beam index information and the reference signal information includes at least one of reference signal received power RSRP or reference signal received quality RSRQ, the user equipment further includes:

a determining module, configured to: after the sending module sends the radio resource management RRM measurement report, determine first initial beam index information of which the reference signal information is greater than a first threshold after the user equipment switches from a dormant state to an active state; and a listening module, configured to listen to control information on a control channel by using an initial beam corresponding to the first initial beam index information determined by the determining module.

In a second possible implementation manner of the second aspect, the receiving module is further configured to receive second beam index information that is specified from each piece of initial beam index information in the RRM measurement report by the base station by using at least one of radio resource control RRC signaling or a Media Access Control control element MAC CE; and the user equipment further includes a listening module, configured to listen to control information on a control channel by using an initial beam corresponding to the second initial beam index information received by the receiving module.

With reference to the first possible implementation manner of the second aspect or the second possible implementation manner of the second aspect, in a third possible implementation manner of the second aspect, the listening module is specifically configured to receive the control information in an omnidirectional manner, or receive the control information by using a beam range greater than or equal to a beam range of the initial beam corresponding to the first initial beam index information, or receive the control information by using a beam range less than a beam range of the initial beam corresponding to the first initial beam index information; or the listening module is specifically configured to receive the control information in an omnidirectional manner, or receive the control information by using a beam range greater than or equal to a beam range of the initial beam corresponding to the second initial beam index information, or receive the control information by using a beam range less than a beam range of the initial beam corresponding to the second initial beam index information.

In a fourth possible implementation manner of the second aspect, the receiving module is further configured to receive alternative beam index information sent by the base station, where the alternative beam index information is used to indicate an alternative beam, allocated by the base station for the user equipment, of a millimeter wave band;

the user equipment further includes:

a measurement module, configured to: when reference signal information of the initial beam is less than a second threshold, perform RRM measurement on an alternative beam indicated by each piece of alternative beam index information, where the reference signal information includes at least one of RSRP or RSRQ; and a determining module, configured to determine, according to the RRM measurement performed by the measurement module, first alternative beam index information of which reference signal information is greater than a third threshold; and the sending module is further configured to send the first alternative beam index information determined by the determining module to the base station, where the base station is configured to communicate with the user equipment according to an alternative beam corresponding to the first alternative beam index information.

With reference to the fourth possible implementation manner of the second aspect, in a fifth possible implementation manner of the second aspect, the sending module is further configured to automatically send a first random access request to the base station, where the first random access request is used to instruct the base station to generate uplink timing advance TA and to communicate with the user equipment according to the uplink TA and an alternative beam corresponding to allocated second alternative beam index information; or the receiving module is further configured to receive, on a control channel, a random access instruction sent by the base station, where the random access instruction is sent after the base station determines, by using beam tracking, to use the alternative beam allocated for the user equipment to communicate with the user equipment; and send a second random access request to the base station according to the random access instruction, where the second random access request is used to instruct the base station to generate uplink TA and to communicate with the user equipment according to the uplink TA and the alternative beam corresponding to the received first alternative beam index information.

With reference to the fourth possible implementation manner of the second aspect, in a sixth possible implementation manner of the second aspect, the receiving module is further configured to receive a TA set sent by the base station, where the TA set is generated, after the base station determines beams that have same uplink TA and are in beams for communication with the user equipment as a group, according to each group, the TA set includes a TA set identifier, beam index information of each beam in the group, and a cell identifier and a time alignment timer TAT that correspond to each beam in the group, and the beam includes at least one of the initial beam or the alternative beam;

the measurement module is further configured to: when the TAT in the TA set received by the receiving module has expired, detect whether the cell identifier in the TA set corresponds to beam index information in another TA set and whether a TAT in the another TA set has not expired; and the user equipment further includes:

a maintaining module, configured to: when the measurement module detects that the cell identifier in the TA set corresponds to the beam index information in the another TA set and the TAT in the another TA set has not expired, determine a cell corresponding to the beam index information, and maintain a hybrid automatic repeat request HARQ buffer area and a sounding reference symbol SRS resource that correspond to the cell; and a release module, configured to: when the measurement module detects that the cell identifier in the TA set corresponds to the beam index information in the another TA set and the TAT in the another TA set has expired, determine a cell corresponding to the beam index information, and release a HARQ buffer area and an SRS resource that correspond to the cell.

In a seventh possible implementation manner of the second aspect, the user equipment further includes:

a measurement module, configured to: after the sending module sends a radio resource management RRM measurement report, measure RSRP of an initial beam corresponding to each piece of initial beam index information, to obtain path loss information of each initial beam; and a generating module, configured to generate power headroom PH according to smallest path loss information measured by the measurement module, to obtain a power headroom report PHR; and the sending module is specifically configured to send the PHR generated by the generating module, where the PHR is used to instruct the base station to allocate an uplink resource for the user equipment according to the PH and an initial beam corresponding to the PH and to communicate with the user equipment on the corresponding uplink resource by using the initial beam corresponding to the PH.

With reference to the seventh possible implementation manner of the second aspect, in an eighth possible implementation manner of the second aspect, the receiving module is further configured to receive a first indication that is sent by the base station and carries first beam index information of a first beam in a beam range of a single initial beam; and the generating module is further configured to measure RSRP of each first beam that is indicated by the first indication received by the receiving module, to obtain path loss information of each first beam.

In a ninth possible implementation manner of the second aspect, the user equipment further includes:

a measurement module, configured to: after the sending module sends a radio resource management RRM measurement report, perform channel state information CSI measurement on an initial beam corresponding to each piece of initial beam index information, to obtain a channel quality indicator CQI of each initial beam; and a generating module, configured to generate at least one piece of channel state information CSI information according to a highest CQI measured by the measurement module, to obtain a CSI measurement report; and the sending module is configured to send the CSI measurement report generated by the generating module, where the CSI measurement report is used to instruct the base station to communicate with the user equipment according to the CSI information and an initial beam corresponding to the CSI information.

With reference to the ninth possible implementation manner of the second aspect, in a tenth possible implementation manner of the second aspect, the receiving module is further configured to receive a second indication that is sent by the base station and carries second beam index information of a second beam in a beam range of a single initial beam; and the generating module is further configured to perform CSI measurement on each second beam that is indicated by the second indication received by the receiving module, to obtain a CQI of each second beam.

In an eleventh possible implementation manner of the second aspect, the receiving module is configured to: receive, by means of broadcasting, information about adjusted cell bandwidth and information about a center frequency that are sent by the base station, or receive RRC signaling sent by the base station, where the RRC signaling carries information about adjusted cell bandwidth and information about a center frequency, the adjusted cell bandwidth is adjusted by the base station according to a traffic volume of at least one user equipment, the cell bandwidth has a positive correlation with the traffic volume, and the center frequency is a central frequency in a frequency range corresponding to the adjusted cell bandwidth or is a specified frequency in the frequency range; and when the adjusted cell includes same-bandwidth channels, receive, on a channel located at the center frequency, common information sent by the base station, or receive, on a central frequency of each channel, common information sent by the base station.

In a twelfth possible implementation manner of the second aspect, the receiving module is further configured to receive information, sent by the base station, about adjusted user bandwidth by using at least one of RRC signaling, a MAC CE, or a control channel, where the adjusted user bandwidth is adjusted by the base station according to a traffic volume of the user equipment, and the user bandwidth has a positive correlation with the traffic volume; and the user equipment further includes a listening module, configured to listen to a control channel of channels that are included by the user bandwidth and received by the receiving module.

According to a third aspect, an embodiment of the present invention provides a base station, where the base station includes:

a transmitter, configured to send initial beam index information of an initial beam, allocated for user equipment, of a millimeter wave band to the user equipment;

a receiver, configured to receive a radio resource management RRM measurement report from the user equipment, where the RRM measurement report is obtained after the user equipment performs RRM measurement on the initial beam that is indicated by the initial beam index information sent by the transmitter; and a processor, configured to determine, according to the RRM measurement report received by the receiver, the initial beam index information that is used for communication with the user equipment.

In a first possible implementation manner of the third aspect, the processor is specifically configured to determine, from reference signal information corresponding to each piece of initial beam index information in the RRM measurement report, first initial beam index information of which the reference signal information is greater than a first threshold, where the reference signal information includes at least one of reference signal received power RSRP or reference signal received quality RSRQ; and the transmitter is configured to send control information to the user equipment on a control channel by using an initial beam corresponding to the first initial beam index information determined by the processor, and the user equipment is configured to: after switching from a dormant state to an active state, listen to the control information by using the initial beam corresponding to the determined first initial beam index information.

In a second possible implementation manner of the third aspect, the transmitter is further configured to specify second initial beam index information from each piece of initial beam index information in the RRM measurement report by using at least one of radio resource control RRC signaling or a Media Access Control control element MAC CE, where an initial beam corresponding to the specified second initial beam index information is used to send the control information to the user equipment on a control channel.

In a third possible implementation manner of the third aspect, the transmitter is further configured to send alternative beam index information of an alternative beam, allocated for the user equipment, of a millimeter wave band to the user equipment;

the receiver is further configured to receive first alternative beam index information that is selected from each piece of alternative beam index information sent by the transmitter and that is sent by the user equipment, where the first alternative beam index information is alternative beam index information of which reference signal information of the initial beam is less than a second threshold and of which reference signal information determined after RRM measurement is performed on an alternative beam indicated by each piece of alternative beam index information is greater than a third threshold, and the reference signal information includes at least one of RSRP or RSRQ; and the processor is further configured to communicate with the user equipment according to an alternative beam corresponding to the first alternative beam index information received by the receiver.

With reference to the third possible implementation manner of the third aspect, in a fourth possible implementation manner of the third aspect, the transmitter is further configured to receive a first random access request sent by the user equipment; and the processor is specifically configured to generate uplink timing advance TA according to the first random access request, and communicate with the user equipment according to the uplink TA and the alternative beam corresponding to the received first alternative beam index information.

With reference to the third possible implementation manner of the third aspect, in a fifth possible implementation manner of the third aspect, the processor is further configured to determine, by using beam tracking, to use the alternative beam allocated for the user equipment to communicate with the user equipment;

the transmitter is further configured to send a random access instruction to the user equipment on a control channel;

the receiver is further configured to receive a second random access request that is sent by the user equipment according to the random access instruction sent by the transmitter; and the processor is specifically configured to generate uplink TA according to the second random access request received by the receiver, and communicate with the user equipment according to the uplink TA and an alternative beam corresponding to allocated second alternative beam index information.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner of the third aspect, the processor is further configured to: determine beams that have same uplink TA and are in beams for communication with the user equipment as a group, where the beam includes at least one of the initial beam or the alternative beam; and generate one TA set according to each group, where the TA set includes a TA set identifier, beam index information of each beam in the group, and a cell identifier and a time alignment timer TAT that correspond to each beam in the group; and the transmitter is further configured to send the TA set generated by the processor to the user equipment.

In a seventh possible implementation manner of the third aspect, the receiver is configured to: after the processor determines, according to the RRM measurement report, the initial beam index information that is used for communication with the user equipment, receive a power headroom report PHR from the user equipment, where the PHR includes power headroom PH, and the PH is generated, after path loss information is obtained by measuring RSRP of each initial beam, according to smallest path loss information; and the processor is configured to allocate an uplink resource for the user equipment according to the PH received by the receiver and an initial beam corresponding to the PH, and communicate with the user equipment on the corresponding uplink resource by using the initial beam corresponding to the PH.

With reference to the seventh possible implementation manner of the third aspect, in an eighth possible implementation manner of the third aspect, the transmitter is further configured to: before the receiver receives the power headroom report PHR from the user equipment, send, to the user equipment, a first indication carrying first beam index information of a first beam in a beam range of a single initial beam, where the first indication is used to instruct the user equipment to measure RSRP of the first beam.

In a ninth possible implementation manner of the third aspect, the receiver is configured to: after the processor determines, according to the RRM measurement report, the initial beam index information that is used for communication with the user equipment, receive a channel state information CSI measurement report from the user equipment, where the CSI measurement report includes CSI information, and the CSI information is generated, after a channel quality indicator CQI is obtained by performing CSI measurement on each initial beam, according to a highest CQI; and the processor is configured to communicate with the user equipment according to the CSI information received by the receiver and an initial beam corresponding to the CSI information.

With reference to the ninth possible implementation manner of the third aspect, in a tenth possible implementation manner of the third aspect, the transmitter is further configured to: before the receiver receives a channel state information CSI measurement report from the user equipment, send, to the user equipment, a second indication carrying second beam index information of a second beam in a beam range of a single initial beam, where the second indication is used to instruct the user equipment to perform CSI measurement on the second beam.

In an eleventh possible implementation manner of the third aspect, the processor is further configured to: after determining, according to the RRM measurement report, the initial beam index information that is used for communication with the user equipment, adjust cell bandwidth according to a traffic volume of at least one user equipment, where the cell bandwidth has a positive correlation with the traffic volume; and the transmitter is further configured to broadcast information about cell bandwidth adjusted by the processor and information about a center frequency to each user equipment, or send information about adjusted cell bandwidth and information about a center frequency to each user equipment by using RRC signaling, where the center frequency is a center frequency in a frequency range corresponding to the adjusted cell bandwidth or is a specified frequency in the frequency range.

With reference to the eleventh possible implementation manner of the third aspect, in a twelfth possible implementation manner of the third aspect, if the adjusted cell includes same-bandwidth channels, the transmitter is further configured to send common information to each user equipment on a channel located at the center frequency, or send common information to each user equipment on a central frequency of each channel.

In a thirteenth possible implementation manner of the third aspect, the processor is further configured to: after determining, according to the RRM measurement report, the initial beam index information that is used for communication with the user equipment, adjust user bandwidth of the user equipment according to a traffic volume of the user equipment, where the user bandwidth has a positive correlation with the traffic volume; and the transmitter is further configured to send, by using at least one of RRC signaling, a MAC CE, or a control channel, information about user bandwidth adjusted by the processor to the user equipment.

With reference to the thirteenth possible implementation manner of the third aspect, in a fourteenth possible implementation manner of the third aspect, the processor is specifically configured to adjust, according to the traffic volume of the user equipment, a channel allocated for the user equipment, to obtain the user bandwidth.

According to a fourth aspect, an embodiment of the present invention provides user equipment, where the user equipment includes:

a receiver, configured to receive initial beam index information sent by a base station, where the initial beam index information is used to indicate an initial beam, allocated by the base station for the user equipment, of a millimeter wave band; and a transmitter, configured to send a radio resource management RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In a first possible implementation manner of the fourth aspect, if the RRM measurement report includes reference signal information corresponding to each piece of initial beam index information and the reference signal information includes at least one of reference signal received power RSRP or reference signal received quality RSRQ:

the user equipment further includes a processor, configured to: after the transmitter sends the radio resource management RRM measurement report, determine first initial beam index information of which the reference signal information is greater than a first threshold after the user equipment switches from a dormant state to an active state; and the receiver is further configured to listen to control information on a control channel by using an initial beam corresponding to the first initial beam index information determined by the processor.

In a second possible implementation manner of the fourth aspect, the receiver is further configured to: receive second initial beam index information that is specified from each piece of initial beam index information in the RRM measurement report by the base station by using at least one of radio resource control RRC signaling or a Media Access Control control element MAC CE; and listen to control information on a control channel by using an initial beam corresponding to the second initial beam index information.

With reference to the first possible implementation manner of the fourth aspect or the second possible implementation manner of the fourth aspect, in a third possible implementation manner of the fourth aspect, the receiver is specifically configured to receive the control information in an omnidirectional manner, or receive the control information by using a beam range greater than or equal to a beam range of the initial beam corresponding to the first initial beam index information, or receive the control information by using a beam range less than a beam range of the initial beam corresponding to the first initial beam index information; or the receiver is specifically configured to receive the control information in an omnidirectional manner, or receive the control information by using a beam range greater than or equal to a beam range of the initial beam corresponding to the second initial beam index information, or receive the control information by using a beam range less than a beam range of the initial beam corresponding to the second initial beam index information.

In a fourth possible implementation manner of the fourth aspect, the receiver is further configured to receive alternative beam index information sent by the base station, where the alternative beam index information is used to indicate an alternative beam, allocated by the base station for the user equipment, of a millimeter wave band;

the user equipment further includes a processor, configured to: when reference signal information of the initial beam is less than a second threshold, perform RRM measurement on an alternative beam indicated by each piece of alternative beam index information received by the receiver, where the reference signal information includes at least one of RSRP or RSRQ; and determine, according to the RRM measurement, first alternative beam index information of which reference signal information is greater than a third threshold; and the transmitter is further configured to send the first alternative beam index information determined by the processor to the base station, where the base station is configured to communicate with the user equipment according to an alternative beam corresponding to the first alternative beam index information.

With reference to the fourth possible implementation manner of the fourth aspect, in a fifth possible implementation manner of the fourth aspect, the transmitter is further configured to: automatically send a first random access request to the base station, where the first random access request is used to instruct the base station to generate uplink timing advance TA and to communicate with the user equipment according to the uplink TA and an alternative beam corresponding to allocated second alternative beam index information; or receive, on a control channel, a random access instruction sent by the base station, where the random access instruction is sent after the base station determines, by using beam tracking, to use the alternative beam allocated for the user equipment to communicate with the user equipment; and send a second random access request to the base station according to the random access instruction, where the second random access request is used to instruct the base station to generate uplink TA and to communicate with the user equipment according to the uplink TA and the alternative beam corresponding to the received first alternative beam index information.

With reference to the fourth aspect, the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner of the fourth aspect, the receiver is further configured to receive a TA set sent by the base station, where the TA set is generated, after the base station determines beams that have same uplink TA and are in beams for communication with the user equipment as a group, according to each group, the TA set includes a TA set identifier, beam index information of each beam in the group, and a cell identifier and a time alignment timer TAT that correspond to each beam in the group, and the beam includes at least one of the initial beam or the alternative beam; and the processor is further configured to: when the TAT in the TA set received by the receiving module has expired, detect whether the cell identifier in the TA set corresponds to beam index information in another TA set and whether a TAT in the another TA set has not expired; and when it is detected that the cell identifier in the TA set corresponds to the beam index information in the another TA set and the TAT in the another TA set has not expired, determine a cell corresponding to the beam index information, and maintain a hybrid automatic repeat request HARQ buffer area and a sounding reference symbol SRS resource that correspond to the cell; or when it is detected that the cell identifier in the TA set corresponds to the beam index information in the another TA set and the TAT in the another TA set has expired, determine a cell corresponding to the beam index information, and release a HARQ buffer area and an SRS resource that correspond to the cell.

In a seventh possible implementation manner of the fourth aspect, the user equipment further includes: a processor, configured to: after the transmitter sends a radio resource management RRM measurement report, measure RSRP of an initial beam corresponding to each piece of initial beam index information, to obtain path loss information of each initial beam; and generate power headroom PH according to smallest path loss information, to obtain a power headroom report PHR; and the transmitter is further configured to send the PHR generated by the processor, where the PHR is used to instruct the base station to allocate an uplink resource for the user equipment according to the PH and an initial beam corresponding to the PH and to communicate with the user equipment on the corresponding uplink resource by using a beam corresponding to the PH.

With reference to the seventh possible implementation manner of the fourth aspect, in an eighth possible implementation manner of the fourth aspect, the receiver is further configured to receive a first indication that is sent by the base station and carries first beam index information of a first beam in a beam range of a single initial beam; and the processor is further configured to measure RSRP of each first beam that is indicated by the first indication received by the receiver, to obtain path loss information of each first beam.

In a ninth possible implementation manner of the fourth aspect, the user equipment further includes a processor, configured to: after the transmitter sends a radio resource management RRM measurement report, perform channel state information CSI measurement on an initial beam corresponding to each piece of initial beam index information, to obtain a channel quality indicator CQI of each initial beam; and generate at least one piece of channel state information CSI information according to a highest CQI, to obtain a CSI measurement report; and the transmitter is further configured to send the CSI measurement report generated by the processor, where the CSI measurement report is used to instruct the base station to communicate with the user equipment according to the CSI information and an initial beam corresponding to the CSI information.

With reference to the ninth possible implementation manner of the fourth aspect, in a tenth possible implementation manner of the fourth aspect, the receiver is further configured to receive a second indication that is sent by the base station and carries second beam index information of a second beam in a beam range of a single initial beam; and the processor is further configured to perform CSI measurement on each second beam that is indicated by the second indication received by the receiver, to obtain a CQI of each second beam.

In an eleventh possible implementation manner of the fourth aspect, the receiver is further configured to: receive, by means of broadcasting, information about adjusted cell bandwidth and information about a center frequency that are sent by the base station, or receive RRC signaling sent by the base station, where the RRC signaling carries information about adjusted cell bandwidth and information about a center frequency, the adjusted cell bandwidth is adjusted by the base station according to a traffic volume of at least one user equipment, the cell bandwidth has a positive correlation with the traffic volume, and the center frequency is a central frequency in a frequency range corresponding to the adjusted cell bandwidth or is a specified frequency in the frequency range; and if the adjusted cell includes same-bandwidth channels, receive, on a channel located at the center frequency, common information sent by the base station, or receive, on a central frequency of each channel, common information sent by the base station.

In a twelfth possible implementation manner of the fourth aspect, the receiver is further configured to: receive information, sent by the base station, about adjusted user bandwidth by using at least one of RRC signaling, a MAC CE, or a control channel, where the adjusted user bandwidth is adjusted by the base station according to a traffic volume of the user equipment, and the user bandwidth has a positive correlation with the traffic volume; and listen to a control channel of channels that are included by the user bandwidth.

According to a fifth aspect, an embodiment of the present invention provides a beam configuration method, where the method includes:

sending, by a base station, initial beam index information of an initial beam, allocated for user equipment, of a millimeter wave band to the user equipment;

receiving, by the base station, a radio resource management RRM measurement report from the user equipment, where the RRM measurement report is obtained after the user equipment performs RRM measurement on the initial beam that is indicated by the initial beam index information; and determining, by the base station according to the RRM measurement report, the initial beam index information that is used for communication with the user equipment.

In a first possible implementation manner of the fifth aspect, the determining, by the base station according to the RRM measurement report, the initial beam index information that is used for communication with the user equipment includes:

determining, by the base station from reference signal information corresponding to each piece of initial beam index information in the RRM measurement report, first initial beam index information of which the reference signal information is greater than a first threshold, where the reference signal information includes at least one of reference signal received power RSRP or reference signal received quality RSRQ; where the base station sends control information to the user equipment on a control channel by using an initial beam corresponding to the determined first initial beam index information, and the user equipment is configured to: after switching from a dormant state to an active state, listen to the control information by using the initial beam corresponding to the determined first initial beam index information.

In a second possible implementation manner of the fifth aspect, the method further includes:

specifying, by the base station, second initial beam index information from each piece of initial beam index information in the RRM measurement report by using at least one of radio resource control RRC signaling or a Media Access Control control element MAC CE, where an initial beam corresponding to the specified second initial beam index information is used to send the control information to the user equipment on a control channel.

In a third possible implementation manner of the fifth aspect, the method further includes:

sending, by the base station, alternative beam index information of an alternative beam, allocated for the user equipment, of a millimeter wave band to the user equipment;

receiving, by the base station, first alternative beam index information that is selected from each piece of alternative beam index information and that is sent by the user equipment, where the first alternative beam index information is at least one piece of alternative beam index information of which reference signal information of the initial beam is less than a second threshold and of which reference signal information determined after RRM measurement is performed on an alternative beam indicated by each piece of alternative beam index information is greater than a third threshold, and the reference signal information includes at least one of RSRP or RSRQ; and communicating, by the base station, with the user equipment according to an alternative beam corresponding to the received first alternative beam index information.

With reference to the third possible implementation manner of the fifth aspect, in a fourth possible implementation manner of the fifth aspect, the communicating, by the base station, with the user equipment according to an alternative beam corresponding to the received alternative beam index information includes:

receiving, by the base station, a first random access request sent by the user equipment, and generating uplink timing advance TA according to the first random access request; and communicating, by the base station, with the user equipment according to the uplink TA and the alternative beam corresponding to the received first alternative beam index information.

With reference to the third possible implementation manner of the fifth aspect, in a fifth possible implementation manner of the fifth aspect, the method further includes:

determining, by the base station by using beam tracking, to use the alternative beam allocated for the user equipment to communicate with the user equipment;

sending, by the base station, a random access instruction to the user equipment on a control channel;

receiving, by the base station, a second random access request that is sent by the user equipment according to the random access instruction, and generating uplink TA according to the second random access request; and communicating, by the base station, with the user equipment according to the uplink TA and an alternative beam corresponding to allocated second alternative beam index information.

With reference to the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, the method further includes:

determining, by the base station, beams that have same uplink TA and are in beams for communication with the user equipment as a group, where the beam includes at least one of the initial beam or the alternative beam;

generating, by the base station, one TA set according to each group, where the TA set includes a TA set identifier, beam index information of each beam in the group, and a cell identifier and a time alignment timer TAT that correspond to each beam in the group; and sending, by the base station, the generated TA set to the user equipment.

In a seventh possible implementation manner of the fifth aspect, after the determining, by the base station according to the RRM measurement report, the initial beam index information that is used for communication with the user equipment, the method further includes:

receiving, by the base station, a power headroom report PHR from the user equipment, where the PHR includes power headroom PH, and the PH is generated, after path loss information is obtained by measuring RSRP of each initial beam, according to smallest path loss information;

allocating, by the base station, an uplink resource for the user equipment according to the PH and an initial beam corresponding to the PH; and communicating, by the base station, with the user equipment on the corresponding uplink resource by using the initial beam corresponding to the PH.

With reference to the seventh possible implementation manner of the fifth aspect, in an eighth possible implementation manner of the fifth aspect, before the receiving, by the base station, a power headroom report PHR from the user equipment, the method further includes:

sending, by the base station to the user equipment, a first indication carrying first beam index information of a first beam in a beam range of a single initial beam, where the first indication is used to instruct the user equipment to measure RSRP of the first beam.

In a ninth possible implementation manner of the fifth aspect, after the determining, by the base station according to the RRM measurement report, the initial beam index information that is used for communication with the user equipment, the method further includes:

receiving, by the base station, a channel state information CSI measurement report from the user equipment, where the CSI measurement report includes CSI information, and the CSI information is generated, after a channel quality indicator CQI is obtained by performing CSI measurement on each initial beam, according to a highest CQI; and communicating, by the base station, with the user equipment according to the CSI information and an initial beam corresponding to the CSI information.

With reference to the ninth possible implementation manner of the fifth aspect, in a tenth possible implementation manner of the fifth aspect, before the receiving, by the base station, a channel state information CSI measurement report from the user equipment, the method further includes:

sending, by the base station to the user equipment, a second indication carrying second beam index information of a second beam in a beam range of a single initial beam, where the second indication is used to instruct the user equipment to perform CSI measurement on the second beam.

In an eleventh possible implementation manner of the fifth aspect, after the determining, by the base station according to the RRM measurement report, the initial beam index information that is used for communication with the user equipment, the method further includes:

adjusting, by the base station, cell bandwidth according to a traffic volume of at least one user equipment, where the cell bandwidth has a positive correlation with the traffic volume; and broadcasting, by the base station, information about adjusted cell bandwidth and information about a center frequency to each user equipment, or sending information about adjusted cell bandwidth and information about a center frequency to each user equipment by using RRC signaling, where the center frequency is a central frequency in a frequency range corresponding to the adjusted cell bandwidth or is a specified frequency in the frequency range.

With reference to the eleventh possible implementation manner of the fifth aspect, in a twelfth possible implementation manner of the fifth aspect, if the adjusted cell includes same-bandwidth channels, the method further includes:

sending, by the base station, common information to each user equipment on a channel located at the center frequency, or sending common information to each user equipment on a central frequency of each channel.

In a thirteenth possible implementation manner of the fifth aspect, after the determining, by the base station according to the RRM measurement report, the initial beam index information that is used for communication with the user equipment, the method further includes:

adjusting, by the base station, user bandwidth of the user equipment according to a traffic volume of the user equipment, where the user bandwidth has a positive correlation with the traffic volume; and sending, by the base station, information about adjusted user bandwidth to the user equipment by using at least one of RRC signaling, a MAC CE, or a control channel.

With reference to the thirteenth possible implementation manner of the fifth aspect, in a fourteenth possible implementation manner of the fifth aspect, the adjusting, by the base station, user bandwidth of the user equipment according to a traffic volume of the user equipment includes:

adjusting, by the base station according to the traffic volume of the user equipment, a channel allocated for the user equipment, to obtain the user bandwidth.

According to a sixth aspect, an embodiment of the present invention provides a beam configuration method, where the method includes:

receiving, by user equipment, initial beam index information sent by a base station, where the initial beam index information is used to indicate an initial beam, allocated by the base station for the user equipment, of a millimeter wave band; and sending, by the user equipment, a radio resource management RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In a first possible implementation manner of the sixth aspect, if the RRM measurement report includes reference signal information corresponding to each piece of initial beam index information and the reference signal information includes at least one of reference signal received power RSRP or reference signal received quality RSRQ, after the sending, by the user equipment, a radio resource management RRM measurement report, the method further includes:

determining, by the user equipment, first initial beam index information of which the reference signal information is greater than a first threshold after the user equipment switches from a dormant state to an active state; and listening to, by the user equipment, control information on a control channel by using an initial beam corresponding to the first initial beam index information.

In a second possible implementation manner of the sixth aspect, the method further includes:

receiving, by the user equipment, second initial beam index information that is specified from each piece of initial beam index information in the RRM measurement report by the base station by using at least one of radio resource control RRC signaling or a Media Access Control control element MAC CE; and listening to, by the user equipment, control information on a control channel by using an initial beam corresponding to the second initial beam index information.

With reference to the first possible implementation manner of the sixth aspect or the second possible implementation manner of the sixth aspect, in a third possible implementation manner of the sixth aspect, the listening to, by the user equipment, control information on a control channel by using an initial beam corresponding to the first initial beam index information includes: receiving, by the user equipment, the control information in an omnidirectional manner, or receiving the control information by using a beam range greater than or equal to a beam range of the initial beam corresponding to the first initial beam index information, or receiving the control information by using a beam range less than a beam range of the initial beam corresponding to the first initial beam index information; and the listening to, by the user equipment, control information on a control channel by using an initial beam corresponding to the second initial beam index information includes: receiving, by the user equipment, the control information in an omnidirectional manner, or receiving the control information by using a beam range greater than or equal to a beam range of the initial beam corresponding to the second initial beam index information, or receiving the control information by using a beam range less than a beam range of the initial beam corresponding to the second initial beam index information.

In a fourth possible implementation manner of the sixth aspect, the method further includes:

receiving, by the user equipment, alternative beam index information sent by the base station, where the alternative beam index information is used to indicate an alternative beam, allocated by the base station for the user equipment, of a millimeter wave band;

if reference signal information of the initial beam is less than a second threshold, performing, by the user equipment, RRM measurement on an alternative beam indicated by each piece of alternative beam index information, where the reference signal information includes at least one of RSRP or RSRQ;

determining, by the user equipment according to the RRM measurement, first alternative beam index information of which reference signal information is greater than a third threshold; and sending, by the user equipment, the determined first alternative beam index information to the base station, where the base station is configured to communicate with the user equipment according to an alternative beam corresponding to the first alternative beam index information.

With reference to the fourth possible implementation manner of the sixth aspect, in a fifth possible implementation manner of the sixth aspect, the method further includes:

automatically sending, by the user equipment, a first random access request to the base station, where the first random access request is used to instruct the base station to generate uplink timing advance TA and to communicate with the user equipment according to the uplink TA and an alternative beam corresponding to allocated second alternative beam index information; or receiving, by the user equipment on a control channel, a random access instruction sent by the base station, where the random access instruction is sent after the base station determines, by using beam tracking, to use the alternative beam allocated for the user equipment to communicate with the user equipment; sending a second random access request to the base station according to the random access instruction, where the second random access request is used to instruct the base station to generate uplink TA and to communicate with the user equipment according to the uplink TA and the alternative beam corresponding to the received first alternative beam index information.

With reference to the sixth aspect, the first possible implementation manner of the sixth aspect, the second possible implementation manner of the sixth aspect, the third possible implementation manner of the sixth aspect, the fourth possible implementation manner of the sixth aspect, or the fifth possible implementation manner of the sixth aspect, in a sixth possible implementation manner of the sixth aspect, the method further includes:

receiving, by the user equipment, a TA set sent by the base station, where the TA set is generated, after the base station determines beams that have same uplink TA and are in beams for communication with the user equipment as a group, according to each group, the TA set includes a TA set identifier, beam index information of each beam in the group, and a cell identifier and a time alignment timer TAT that correspond to each beam in the group, and the beam includes at least one of the initial beam or the alternative beam;

if the TAT in the TA set has expired, detecting, by the user equipment, whether the cell identifier in the TA set corresponds to beam index information in another TA set and whether a TAT in the another TA set has not expired; and if it is detected that the cell identifier in the TA set corresponds to the beam index information in the another TA set and the TAT in the another TA set has not expired, determining, by the user equipment, a cell corresponding to the beam index information, and maintaining a hybrid automatic repeat request HARQ buffer area and a sounding reference symbol SRS resource that correspond to the cell; or if it is detected that the cell identifier in the TA set corresponds to the beam index information in the another TA set and the TAT in the another TA set has expired, determining, by the user equipment, a cell corresponding to the beam index information, and releasing a HARQ buffer area and an SRS resource that correspond to the cell.

In a seventh possible implementation manner of the sixth aspect, after the sending, by the user equipment, a radio resource management RRM measurement report, the method further includes:

measuring, by the user equipment, RSRP of an initial beam corresponding to each piece of initial beam index information, to obtain path loss information of each initial beam;

generating, by the user equipment, power headroom PH according to smallest path loss information, to obtain a power headroom report PHR; and sending, by the user equipment, the PHR, where the PHR is used to instruct the base station to allocate an uplink resource for the user equipment according to the PH and an initial beam corresponding to the PH and to communicate with the user equipment on the corresponding uplink resource by using the initial beam corresponding to the PH.

With reference to the seventh possible implementation manner of the sixth aspect, in an eighth possible implementation manner of the sixth aspect, the measuring, by the user equipment, RSRP of an initial beam corresponding to each piece of initial beam index information, to obtain path loss information of each initial beam includes:

receiving, by the user equipment, a first indication that is sent by the base station and carries first beam index information of a first beam in a beam range of a single initial beam; and measuring, by the user equipment, RSRP of each first beam indicated by the first indication, to obtain path loss information of each first beam.

In a ninth possible implementation manner of the sixth aspect, after the sending, by the user equipment, a radio resource management RRM measurement report, the method further includes:

performing, by the user equipment, channel state information CSI measurement on an initial beam corresponding to each piece of initial beam index information, to obtain a channel quality indicator CQI of each initial beam;

generating, by the user equipment, channel state information CSI information according to a highest CQI, to obtain a CSI measurement report; and sending, by the user equipment, the CSI measurement report, where the CSI measurement report is used to instruct the base station to communicate with the user equipment according to the CSI information and an initial beam corresponding to the CSI information.

With reference to the ninth possible implementation manner of the sixth aspect, in a tenth possible implementation manner of the sixth aspect, the performing, by the user equipment, channel state information CSI measurement on an initial beam corresponding to each piece of initial beam index information, to obtain a channel quality indicator CQI of each initial beam includes:

receiving, by the user equipment, a second indication that is sent by the base station and carries second beam index information of a second beam in a beam range of a single initial beam; and performing, by the user equipment, CSI measurement on each second beam indicated by the second indication, to obtain a CQI of each second beam.

In an eleventh possible implementation manner of the sixth aspect, the method further includes:

receiving, by the user equipment by means of broadcasting, information about adjusted cell bandwidth and information about a center frequency that are sent by the base station, or receiving RRC signaling sent by the base station, where the RRC signaling carries information about adjusted cell bandwidth and information about a center frequency, the adjusted cell bandwidth is adjusted by the base station according to a traffic volume of at least one user equipment, the cell bandwidth has a positive correlation with the traffic volume, and the center frequency is a central frequency in a frequency range corresponding to the adjusted cell bandwidth or is a specified frequency in the frequency range; and if the adjusted cell includes same-bandwidth channels, receiving, by the user equipment on a channel located at the center frequency, common information sent by the base station, or receiving, on a central frequency of each channel, common information sent by the base station.

In a twelfth possible implementation manner of the sixth aspect, the method further includes:

receiving, by the user equipment, information, sent by the base station, about adjusted user bandwidth by using at least one of RRC signaling, a MAC CE, or a control channel, where the adjusted user bandwidth is adjusted by the base station according to a traffic volume of the user equipment, and the user bandwidth has a positive correlation with the traffic volume; and listening to, by the user equipment, a control channel of channels included by the user bandwidth.

The technical solutions provided by the embodiments of the present invention have the following beneficial effects:

Initial beam index information of an initial beam, allocated for user equipment, of a millimeter wave band is sent to the UE; an RRM measurement report from the user equipment is received, where the RRM measurement report is obtained after the user equipment performs RRM measurement on the initial beam indicated by the initial beam index information; the initial beam index information that is used for communication with the user equipment is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

The embodiments of the present invention relate to a beam configuration method. Existing LTE-A carrier aggregation is used as a background for the beam configuration method, and a relatively low band carrier and a millimeter wave band carrier in an LTE-A technology are aggregated, to provide higher bandwidth and larger capacity. In the embodiments of the present invention, that a relatively low band carrier is used as a primary carrier PCell and a millimeter wave band carrier is used as a secondary carrier Scell is used as an example, which is also applicable to a case in which a millimeter wave band carrier is used as a primary carrier. A beamforming technology involved in the embodiments of the present invention may refer to a beam on a horizontal plane or may refer to a beam on a vertical plane.

Figure 1:
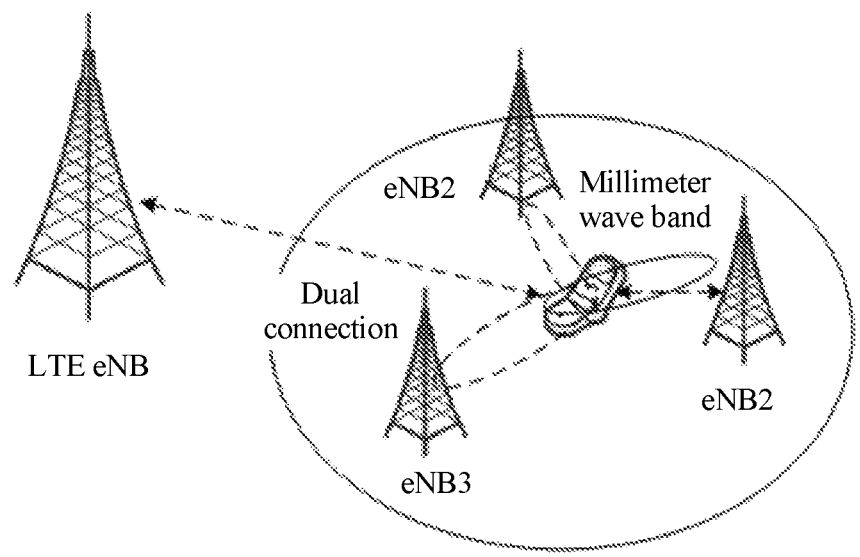
FIG. 1 is a schematic composition diagram of a beam configuration system according to an embodiment of the present invention.

The PCell and the SCell may be co-sited or not be co-site. The SCell is located within coverage of the PCell, or the PCell and the SCell cover an overlapped area. When the PCell and the SCell are co-sited, an LTE-A base station providing the PCell and one or more millimeter wave small cells or remote radio heads (English: Remote Radio Head, RRH for short) providing one or more SCells are connected by using fiber or in a wireless manner for wireless backhaul communication. Wireless backhaul may use a microwave or millimeter wave. When the wireless backhaul uses the millimeter wave, a band of the millimeter wave used by the wireless backhaul may be the same as or different from a band at which the SCell works. Referring to a schematic composition diagram of a beam configuration system shown in FIG. 1, FIG. 1 includes one LTE evolved NodeB (English: evolved Node B, eNB for short), three millimeter wave cellular communication evolved NodeBs (English: millimeter wave eNB) eNB1, eNB2, and eNB3, and user equipment (English: User equipment, UE for short). eNB1 to eNB3 provide millimeter wave band coverage. In FIG. 1, eNB1 to eNB3 may be one or more eNBs, and they and the LTE eNB may not be co-sited or may be co-sited. eNB1 to eNB3 may be remote radio units RRHs that have a backhaul connection to the LTE eNB.

Figure 2:
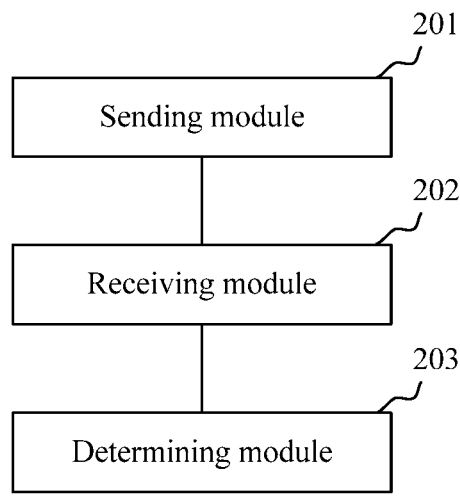
FIG. 2 is a structural block diagram of a base station according to an embodiment of the present invention.

Referring to FIG. 2, FIG. 2 shows a structural block diagram of a base station according to an embodiment of the present invention. The base station may be the LTE eNB, or the millimeter wave eNB1, eNB2, or eNB3 shown in FIG. 1. Embodiments of the present invention use the LTE eNB and one of the millimeter wave eNBs, such as the eNB1, as an example for description. In the following embodiments, unless otherwise specified, the base station refers to the millimeter wave eNB. The base station may include a sending module 201, a receiving module 202, and a determining module 203.

The sending module 201 is configured to send initial beam index information of an initial beam, allocated for user equipment, of a millimeter wave band to the user equipment.

The initial beam index information is used to indicate an initial beam used when the base station sends downlink information to the user equipment, and is preconfigured by the base station for the user equipment. The initial beam index information is associated with an antenna weight value or codebook information used when the base station sends downlink information, to determine information such as a direction and a width of the initial beam. The direction of the initial beam refers to angle information of the initial beam with respect to a horizontal direction and/or a vertical direction. The initial beam index information is further associated with characteristic information of the initial beam, and the base station sends particular characteristic information of the initial beam on different initial beams, so that the user equipment identifies different initial beams according to different characteristic information. The base station uses different reference signal sequences for different initial beams or broadcasts the initial beam index information of the initial beam on different initial beams. The user equipment may uniquely determine a particular initial beam according to the initial beam index information and the characteristic information of the initial beam. The initial beam index information may also serve as a virtual cell identifier, that is, further divide a same cell into different sectors or subsectors according to multiple relatively wide initial beams. For a function and a usage method of an initial beam index information in the following embodiments of the present invention, refer to descriptions in this embodiment, which are not described in the following.

The LTE eNB and the millimeter wave eNB can both configure, for the user equipment, the initial beam index information for radio resource management (Radio Resource Management, RRM) measurement. When the LTE eNB configures, for the user equipment, the initial beam index information for RRM measurement, the millimeter wave eNB sends a configuration of the initial beam index information to the LTE eNB, and the LTE eNB sends the configuration of the initial beam index information to the user equipment. For a configuration method of an initial beam index information in the following embodiments of the present invention, refer to descriptions in this embodiment, which are not described in the following. The RRM measurement herein may refer to measurement used for mobility management in an ordinary meaning, and is a measurement method filtered (filtered) through a radio resource control (English: Radio Resource Control, RRC for short) layer. For example, a filtering method used in an LTE system is $F_n=(1-a)\cdot F_{n-1}+a\cdot M_n$, where $F_n$ is a latest filtered measurement result and is used to assess a criterion for triggering a measurement report, $F_{n-1}$ is a measurement result filtered after a previous calculation, $M_n$ is a latest measurement result of a physical layer, and a is coefficient determined according to different measurement requirements. In a millimeter wave cell, the user equipment may move relatively fast between different beams, and therefore an RRM measurement requirement used for a beam update may be stricter than that in an existing LTE system. For example, an assessment is performed every tens of milliseconds, to determine whether a criterion for measurement report is met.

The RRM measurement herein may also refer to measurement performed in a beam training manner. For example, the base station and the user equipment respectively perform sending and receiving on multiple beams in their respective cell ranges to find a best matching beam pair. During communication between such a pair of a sending beam and a receiving beam, receiving efficiency is highest and data transmitted is most reliable. Measurement in this case may be filtered through an RRC layer, but a measurement requirement needs to be stricter; or does not need to be filtered through an RRC layer but a current measurement result is directly used. For example, smaller transmit power may be used between the base station and the user equipment to achiever a better transmission effect. For a meaning of RRM measurement in the following embodiments of the present invention, refer to descriptions in this embodiment, which are not described in the following. In order to select an initial beam of relatively good signal quality, for communication, from a beam allocated by the base station to improve communication quality, the UE may further determine, according to the initial beam index information, the initial beam allocated by the base station, perform RRM measurement on the initial beam allocated by the base station, and generate an RRM measurement report according to a measurement result.

The receiving module 202 is configured to receive the RRM measurement report from the user equipment, where the RRM measurement report is obtained after the user equipment performs RRM measurement on the initial beam that is indicated by the initial beam index information sent by the sending module 201.

When the user equipment sends the RRM measurement report to the millimeter wave eNB, the millimeter wave eNB may directly receive the RRM measurement report. When the user equipment sends the RRM measurement report to the LTE eNB, the LTE eNB forwards the received RRM measurement report and beam index information to the millimeter wave eNB. For a method for receiving an RRM measurement report by a millimeter wave eNB in the following embodiments of the present invention, refer to descriptions in this embodiment, which are not described in the following.

The determining module 203 is configured to determine, according to the RRM measurement report received by the receiving module 202, the initial beam index information that is used for communication with the UE.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

In conclusion, according to the base station provided in this embodiment of the present invention, initial beam index information of an initial beam, allocated for user equipment, of a millimeter wave band is sent to the user equipment; an RRM measurement report from the user equipment is received, where the RRM measurement report is obtained after the user equipment performs RRM measurement on the initial beam indicated by the initial beam index information; the initial beam index information that is used for communication with the UE is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 3:
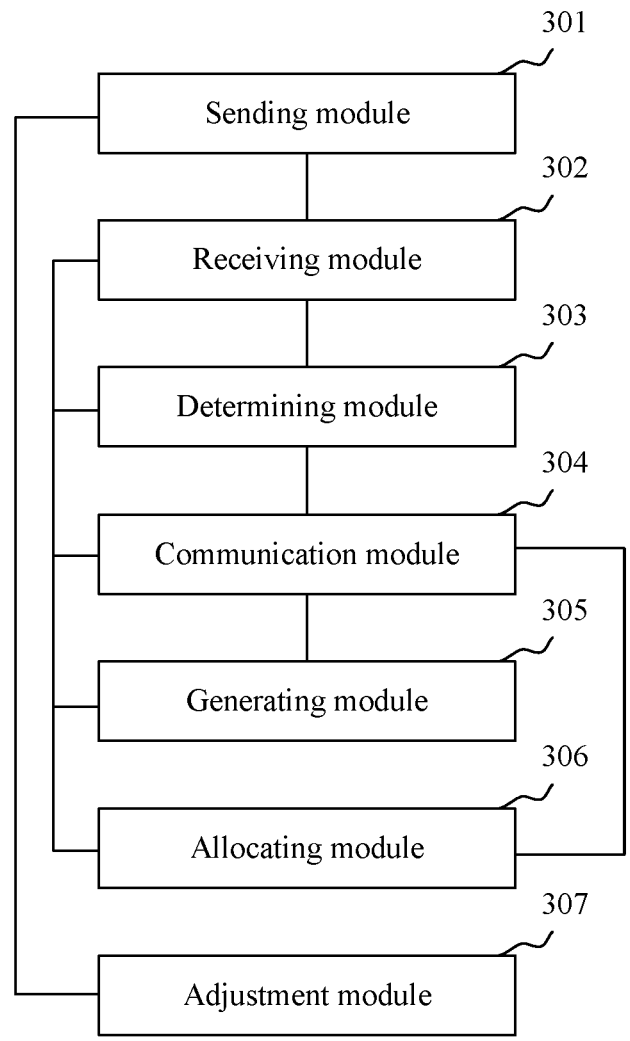
FIG. 3 is a structural block diagram of a base station according to another embodiment of the present invention.

Referring to FIG. 3, FIG. 3 shows a structural block diagram of a base station according to another embodiment of the present invention. The base station may include the base station shown in FIG. 1. The base station may include a sending module 301, a receiving module 302, and a determining module 303.

The sending module 301 is configured to send initial beam index information of an initial beam, allocated for user equipment, of a millimeter wave band to the user equipment.

The initial beam index information is used to indicate a beam used when the base station sends downlink information to the user equipment, and is preconfigured by the base station for the user equipment. The initial beam index information is associated with an antenna weight value or codebook information used when the base station sends downlink information, to determine information such as a direction and a width of the initial beam. The direction of the initial beam refers to angle information of the initial beam with respect to a horizontal direction and/or a vertical direction. For example, a beam direction of an initial beam is a direction of 30° to −60° with respect to a horizontal direction, a direction of 20° to −40° with respect to a vertical direction, or the like. The initial beam index information is further associated with characteristic information of the initial beam, and the base station sends particular characteristic information of the initial beam on different initial beams, so that the user equipment identifies different initial beams according to different characteristic information. For details, refer to descriptions in the embodiment shown in FIG. 2, which are not described herein.

In this embodiment, the base station may configure at least one initial beam for the user equipment, and send initial beam index information of each initial beam in the at least one initial beam to the user equipment, so that the user equipment determines an initial beam on which the downlink information sent by the base station is to be received.

The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

The receiving module 302 is configured to receive the RRM measurement report from the user equipment, where the RRM measurement report is obtained after the user equipment performs RRM measurement on the initial beam that is indicated by the initial beam index information sent by the sending module 301.

The determining module 303 is configured to determine, according to the RRM measurement report received by the receiving module 302, the initial beam index information that is used for communication with the user equipment.

The base station determines signal quality of a beam according to an RRM measurement report, and then selects a beam of relatively good signal quality for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

The following uses different application scenarios as examples to describe a beam configuration method, and details are as follows:

A first application scenario uses an example in which the base station is applied to a discontinuous receiving scenario for description.

There are a dormant state and an active state for the user equipment, and user equipment in the active state needs to listen to a control channel by using a beam allocated by the base station, so as to receive, on the control channel, control information that is sent by the base station by using the beamforming technology. The control information includes a resource allocation control instruction, where the resource allocation control instruction is used to indicate an uplink/downlink resource allocated by the base station for the user equipment. The control channel includes at least one of physical downlink control channel (English: Physical Downlink Control Channel, PDCCH for short) or enhanced physical downlink control channel (Enhanced Physical Downlink Control Channel, EPDCCH for short).

When the user equipment switches from the dormant state to the active state, a beam on which resource allocation control signaling is previously received when the user equipment is in the active state no longer applies. Therefore, the user equipment further needs to determine a beam of a control channel that needs to be listened to this time. This embodiment provides two methods for determining a beam of a control channel that needs to be listened to. The following separately describes the two methods in detail.

In a first method, the determining module 303 is specifically configured to determine, from reference signal information corresponding to each piece of initial beam index information in the RRM measurement report, first initial beam index information of which the reference signal information is greater than a first threshold, where the reference signal information includes at least one of reference signal received power (English: Reference Signal Receiving Power, RSRP for short) or reference signal received quality (English: Reference Signal Receiving Quality, RSRQ for short); and the sending module 301 is further configured to send the control information to the user equipment on the control channel by using an initial beam corresponding to the first initial beam index information determined by the determining module 302, and the user equipment is configured to: after switching from the dormant state to the active state, listen to the control information by using the initial beam corresponding to the determined first initial beam index information.

In the first method for determining the beam, the base station and the user equipment may agree to use an initial beam of relatively good signal quality in the RRM measurement report. Specifically, the base station reads the reference signal information from the RRM measurement report, and determines an initial beam indicated by the first initial beam index information of which the reference signal information is greater than the first threshold as a beam that needs to send the control information on the control channel. The reference signal information includes at least one of the RSRP or the RSRQ. When the reference signal information is the RSRP, the first threshold may be an RSRP threshold; when the reference signal information is the RSRQ, the first threshold may be an RSRQ threshold; when the reference signal information is the RSRP and the RSRQ, the first threshold may include an RSRP threshold and an RSRQ threshold.

For example, when the reference signal information is the RSRP, the base station may sort out at least one RSRP greater than the RSRP threshold from the RRM measurement report, determine at least one piece of initial beam index information corresponding to the at least one RSRP, and determine at least one initial beam according to the least one piece of initial beam index information. Alternatively, when the reference signal information is the RSRP and the RSRQ, the base station may sort out at least one RSRP greater than the RSRP threshold and at least one RSRQ greater than the RSRQ threshold from the RRM measurement report, determine an RSRP and an RSRQ that belong to a same initial beam from the at least one RSRP and the at least one RSRQ, determine at least one piece of corresponding initial beam index information, and determine at least one initial beam according to the least one piece of initial beam index information.

In a second method, the determining module 303 is further configured to specify second initial beam index information from each piece of initial beam index information in the RRM measurement report by using at least one of RRC signaling or a Media Access Control (English: Media Access Control, MAC for short) control element (English: Control Element, CE for short), where an initial beam corresponding to the specified second initial beam index information is used to send the control information to the user equipment on the control channel.

In the second method for determining the beam, the base station may specify, from the allocated initial beam, an initial beam that is used to send the resource allocation control signaling on the control channel, and then send the second initial beam index information of the specified initial beam to the user equipment by using the RRC signaling or the MAC CE.

It should be additionally noted that beam index information may also be jointly determined by using the foregoing first method and second method. For example, a base station first specifies second initial beam index information by using at least one of RRC signaling or a MAC CE, and after a particular period of time, the base station selects first initial beam index information from an RRM measurement report according to reference signal information. Alternatively, a base station first selects first initial beam index information from an RRM measurement report according to reference signal information, and after a period of time, specifies second initial beam index information by using at least one of RRC signaling or a MAC CE. Certainly, the beam index information may also be determined by using another method, which is not limited in this embodiment.

First initial beam index information of which reference signal information is greater than a first threshold is determined from reference signal information corresponding to each piece of initial beam index information in an RRM measurement report, control information is sent to user equipment on a control channel by using an initial beam corresponding to the first initial beam index information, so that the control information can be transmitted by using an initial beam of relatively good signal quality in the RRM measurement report, thereby improving communication efficiency.

A second application scenario uses an example in which the base station is applied to a timing advance (English: Time Advance, TA for short) scenario for description.

A barrier between the user equipment and the base station lowers communication quality of the initial beam. Therefore, the base station may preconfigure an alternative beam for the user equipment, so as to improve communication quality by avoiding the barrier. Therefore, the sending module 301 is further configured to send alternative beam index information of an alternative beam, allocated for the user equipment, of a millimeter wave band to the user equipment.

The receiving module 302 is further configured to receive first alternative beam index information that is selected from each piece of alternative beam index information sent by the sending module 301 and that is sent by the user equipment, where the first alternative beam index information is alternative beam index information of which reference signal information of the initial beam is less than a second threshold and of which reference signal information determined after RRM measurement is performed on an alternative beam indicated by each piece of alternative beam index information is greater than a third threshold, and the reference signal information includes at least one of RSRP or RSRQ.

The base station further includes a communication module 304, configured to communicate with the user equipment according to an alternative beam corresponding to the first alternative beam index information received by the receiving module 302.

The base station may separately send the alternative beam index information to the user equipment; or may send the alternative beam index information and the initial beam index information together to the user equipment when sending the initial beam index information to the user equipment, to reduce transmission overheads. A method for sending alternative beam index information in the following embodiments of the present invention is the same as the method for sending alternative beam index information in this embodiment.

When the user equipment communicates with the base station by using the initial beam allocated by the base station, the user equipment may scheduledly or periodically measure reference signal information of the initial beam. When the user equipment obtains, by measurement, that the reference signal information is less than the second threshold, the user equipment determines that quality of the initial beam is relatively poor. In this case, the user equipment may read prestored alternative beam index information, and use the alternative beam indicated by each piece of alternative beam index information to communicate with the base station. The reference signal information includes at least one of the RSRP or the RSRQ. When the reference signal information is the RSRP, the second threshold is an RSRP threshold; when the reference signal information is the RSRQ, the reference signal information is an RSRQ threshold; when the reference signal information includes the RSRP and the RSRQ, the second threshold includes an RSRP threshold and an RSRQ threshold.

Before using at least one alternative beam to communicate with the base station, the user equipment further needs to perform RRM measurement on the least one alternative beam, and sort out reference signal information greater than the third threshold from obtained reference signal information of each alternative beam, so as to determine a corresponding alternative beam according to the reference signal information that is sorted out. The performing RRM measurement on the alternative beam may be triggered after the user equipment detects that the reference signal information of the initial beam is less than the second threshold, or may be periodically triggered. This is not limited in this embodiment.

When the reference signal information is greater than the third threshold, it may be determined that quality of an alternative beam corresponding to the reference signal information is relatively good, and the alternative beam can be used for communication with the base station. A method for detecting whether the reference signal information is greater than the third threshold is the same as a method for detecting whether the reference signal information is greater than the second threshold, and details are not described herein. The third threshold may be the same as or different from the second threshold.

After the user equipment sorts out at least one alternative beam of relatively good quality, first alternative beam index information of the at least one alternative beam is sent to the base station. The base station communicates with the user equipment according to an alternative beam corresponding to at least one piece of received alternative beam index information.

Further, in addition to that the user equipment actively performs RRM measurement on the initial beam and determines, by using the reference signal information, whether to use an alternative beam for communication, the base station may use a beam tracking technology to detect whether the user equipment is about to enter a barrier area. When the base station detects that the user equipment is about to enter the barrier area, the user equipment is triggered to perform RRM measurement on the alternative beam.

In this embodiment, different user equipments have different distances with the base station. Therefore, signal transmission delays of different user equipments are different. If uplink information sent by different user equipments needs to arrive at the base station at the same time, the base station needs to configure different TA for different user equipments according to distances between the user equipments and the base station. For example, when the user equipment is relatively far away from the base station, relatively smaller uplink TA may be configured for the user equipment; when the user equipment is relatively near to the base station, relatively small uplink TA may be configured for the user equipment.

Generally, compared with the initial beam allocated by the base station, the alternative beam has a relatively long propagation path, leading to a relatively large propagation delay. In this case, consequently, the uplink TA changes suddenly. In this case, the user equipment needs to redetermine the uplink TA. Determining the uplink TA needs to be implemented by using a random access procedure.

When the user equipment actively triggers the random access procedure, the user equipment actively sends a first random access request to the base station. In this case, the receiving module 302 is further configured to receive the first random access request sent by the user equipment.

The base station further includes a generating module 305, configured to generate uplink TA according to the first random access request.

The communication module 304 is configured to communicate with the user equipment according to the uplink TA generated by the generating module 304 and the alternative beam corresponding to the received first alternative beam index information.

When the user equipment triggers the random access procedure as instructed by a random access instruction, the user equipment sends a second random access request to the base station. In this case, the determining module 303 is further configured to determine, by using beam tracking, to use the alternative beam allocated for the user equipment to communicate with the user equipment.

The sending module 301 is configured to send the random access instruction to the user equipment on the control channel.

The receiving module 302 is further configured to receive the second random access request that is sent by the user equipment according to the random access instruction sent by the sending module 301.

The base station further includes a generating module 305, configured to generate uplink TA according to the second random access request.

The communication module 304 is further configured to communicate with the user equipment according to the uplink TA generated by the generating module 305 and an alternative beam corresponding to allocated second alternative beam index information.

The random access instruction may be applied to a non-contention-based random access procedure, and the base station uses the random access instruction to indicate a dedicated random access preamble (preamble) and a physical random access channel resource (PRACH resource). In this case, the second random access request sent by the user equipment indicates that the user equipment sends a random access preamble to the base station on the PRACH resource indicated by the base station. For a contention-based random access procedure, the user equipment itself selects a random access preamble and a PRACH resource, and the user equipment sends the random access preamble to the base station on the PRACH resource selected by the user equipment itself. For a random access procedure in the following embodiments of the present invention, refer to descriptions in this embodiment, which are not described in the following.

Accordingly, when the user equipment detects that reference signal information of each alternative beam is less than the third threshold and that reference signal information of at least one initial beam is greater than the second threshold, it is determined that quality of the initial beam is relatively good, and initial beam index information of the at least one initial beam is sent to the base station. The base station uses the at least one initial beam to communicate with the user equipment. Alternatively, the base station uses a beamforming technology to determine that the user equipment is about to leave the barrier area; and when detecting that the reference signal information of the at least one initial beam is greater than the second threshold, determines to use the at least one initial beam to communicate with the base station. In this case, the user equipment may redetermine the uplink TA, or may not determine the uplink TA.

In this embodiment, there may be different TA for beams used by the user equipment, and the TA may be for a same millimeter wave base station or may be for different millimeter wave base stations. Therefore, the base station may further configure at least one TA set for each user equipment, where each TA set includes at least one piece of beam index information, and uplink TA corresponding to each piece of beam index information is the same. The beam index information may be the initial beam index information of the initial beam, or may be the alternative beam index information of the alternative beam. Beams indicated by beam index information in one TA set may belong to a same cell, or may belong to different cells. Therefore, a cell identifier of a cell associated with each beam may further be identified in the TA set.

Optionally, the determining module 303 is further configured to determine beams that have same uplink TA and are in beams for communication with the user equipment as a group, where the beam includes at least one of the initial beam or the alternative beam.

The generating module 305 is further configured to generate one TA set according to each group obtained by the determining module 303, where the TA set includes a TA set identifier, beam index information of each beam in the group, and a cell identifier and a time alignment timer TAT that correspond to each beam in the group.

The sending module 301 is configured to send the TA set generated by the generating module 305 to the user equipment.

It should be additionally noted that when the uplink TA changes because the user equipment moves, the base station may reconfigure a TA set for the user equipment according to new uplink TA, and allocate beam index information in the TA set and a cell associated with the beam index information. The base station may adjust the uplink TA and the TA set by using a TA cmd.

First alternative beam index information that is selected from each piece of sent alternative beam index information and that is sent by user equipment is received, where the first alternative beam index information is alternative beam index information of which reference signal information of an initial beam is less than a second threshold and of which reference signal information determined after RRM measurement is performed on an alternative beam indicated by each piece of alternative beam index information is greater than a third threshold. Communication with the user equipment is performed according to an alternative beam corresponding to the first alternative beam index information. An alternative beam of relatively good quality can be used for communication with the user equipment when quality of an allocated initial beam is relatively poor, thereby achieving an effect of improving communication efficiency.

A third application scenario uses an example in which the base station is applied to a power control scenario for description.

The base station uses the beamforming technology, and path losses at different beam directions may be different. Therefore, at least one initial beam with a smallest path loss needs to be selected from the allocated initial beam, and communication is performed on the at least one selected initial beam.

Therefore, the receiving module 302 is configured to: after the determining module 303 determines, according to the RRM measurement report, the initial beam index information that is used for communication with the user equipment, receive a PHR from the user equipment, where the PHR includes PH, and the PH is generated, after path loss information is obtained by measuring RSRP of each initial beam, according to smallest path loss information.

The base station further includes an allocating module 306, configured to allocate an uplink resource for the user equipment according to the PH received by the receiving module 302 and an initial beam corresponding to the PH.

The communication module 304 is specifically configured to communicate with the user equipment on the corresponding uplink resource allocated by the allocating module 306 by using the initial beam corresponding to the PH.

When the user equipment sends the PHR to the millimeter wave eNB, the millimeter wave eNB may directly receive the PHR. When the user equipment sends the PHR to the LTE eNB, the LTE eNB forwards the received PHR to the millimeter wave eNB. For a method for receiving a PHR by a millimeter wave eNB in the following embodiments of the present invention, refer to descriptions in this embodiment, which are not described in the following.

After receiving the PHR, the base station allocates the uplink resource for the user equipment according to initial beam index information and the PH in the PHR, so that the user equipment sends uplink information on a corresponding initial beam by using appropriate power not greater than maximum allowed transmit power of the user equipment.

It should be additionally noted that when the user equipment sends PH of an initial beam and the base station determines that the user equipment can use at least two initial beams at the same time for communication, at least two initial beams to be scheduled can be determined by measuring an SRS of the user equipment.

If the base station expects to perform uplink scheduling on the user equipment within a smaller beam range to obtain a better directional gain and more accurate power control, beam index information can be dynamically indicated by using a MAC CE, so that the user equipment reports PH of a beam with a smallest path loss thereof. Specifically, the sending module 301 is configured to: before the receiving module 302 receives the power headroom report PHR from the user equipment, send, to the user equipment, a first indication carrying first beam index information of a first beam in a beam range of a single initial beam, where the first indication is used to instruct the user equipment to measure RSRP of the first beam.

The first beam in the beam range of the single initial beam refers to a narrower beam in an initial beam. For example, when a beam range of a single initial beam is 30° to −60°, a first beam refers to a beam between 30° and 60°, for example, a first beam of 30° to 40° or a first beam of 35° to −55°.

Further, path loss information of different beams is different. Therefore, during allocation of transmit power for a beam, path loss information of the beam further needs to be considered. Optionally, when the base station allocates an uplink resource for multiple beams of the user equipment, power control can be separately performed on each beam direction. For example, different uplink resources are allocated for beams that need to consume different uplink power.

A PHR from user equipment is received, where the PHR includes PH, and the PH is generated, after path loss information is obtained by measuring RSRP of each initial beam, according to smallest path loss information; an uplink resource is allocated for the user equipment according to the PH and an initial beam corresponding to the PH; communication with the user equipment is performed on the corresponding uplink resource by using the initial beam corresponding to the PH, so that an uplink resource corresponding to an initial beam with a smallest path loss can be selected for communication with the user equipment, thereby reducing transmit power.

A fourth application scenario uses an example in which the base station is applied to a channel state information (English: Channel State Information, CSI for short) scenario for description.

In this embodiment, the user equipment further needs to perform CSI measurement on the initial beam to obtain CSI information, so as to determine quality of the initial beam according to the CSI information. The CSI information includes a channel quality indicator (English: Channel Quality Indication, CQI for short), a precoding matrix index (English: Precoding Matrix Index, PMI for short), and a rank indication (English: Rank Indication, RI for short).

Therefore, the receiving module 302 is configured to: after the determining module 303 determines, according to the RRM measurement report, the initial beam index information that is used for communication with the user equipment, receive a CSI measurement report from the user equipment, where the CSI measurement report includes the CSI information, and the CSI information is generated, after a CQI is obtained by performing CSI measurement on each initial beam, according to a highest CQI.

The communication module 304 is configured to communicate with the user equipment according to the CSI information received by the receiving module 302 and an initial beam corresponding to the CSI information.

When the user equipment sends the CSI measurement report to the millimeter wave eNB, the millimeter wave eNB may directly receive the CSI measurement report. When the user equipment sends the CSI measurement report to the LTE eNB, the LTE eNB forwards the received CSI measurement report to the millimeter wave eNB. For a method for receiving a CSI measurement report by a millimeter wave eNB in the following embodiments of the present invention, refer to descriptions in this embodiment, which are not described in the following.

After receiving the CSI measurement report, the base station selects an initial beam of relatively good quality according to the CSI information in the CSI measurement report, and uses the selected initial beam to communicate with the user equipment.

If the base station expects to perform uplink scheduling on the user equipment within a smaller beam range to obtain a better directional gain, initial beam index information can be dynamically indicated by using a MAC CE, so that the user equipment reports CSI information with a highest CQI thereof. Specifically, the sending module 301 is configured to: before the receiving module 302 receives the CSI measurement report from the user equipment, send, to the user equipment, a second indication carrying second beam index information of a second beam in a beam range of a single initial beam, where the second indication is used to instruct the user equipment to perform CSI measurement on the second beam.

The second beam in the beam range of the single initial beam refers to a narrower beam in an initial beam. For example, when a beam range of a single initial beam is 30° to −60°, a second beam in the beam range of the single initial beam refers to a beam between 30° and −60°, for example, a second beam of 30° to 40° or a second beam of 35° to −55°.

A CSI measurement report from user equipment is received, where the CSI measurement report includes CSI information, and the CSI information is generated, after a CQI is obtained by performing CSI measurement on each initial beam, according to a highest CQI; communication with the user equipment is performed according to the CSI information and an initial beam corresponding to the CSI information, and an initial beam with the highest CQI can be selected for communication with the user equipment, thereby improving communication efficiency.

A fifth application scenario uses an example in which the base station is applied to a cell bandwidth adjustment scenario for description.

In this embodiment, when a traffic volume of each user equipment that accesses a cell changes and consequently, load of the cell changes, the base station needs to adjust cell bandwidth of the cell. For example, when load decreases, a maximum bandwidth of 500 MHz may be no longer required; in this case, cell bandwidth may be reduced to, for example, 200 MHz. When load increases, cell bandwidth may need to be increased, for example, to 400 MHz or 500 MHz. If it is required to delete the original cell and add a new cell each time when a radio resource is to be adjusted, a relative large signaling overhead and a relatively large delay are caused. Actually, however, it is possible that only cell bandwidth information changes and another radio resource configuration parameter does not need to change. Therefore, the base station may adjust the cell bandwidth when the traffic volume of the user equipment changes.

Specifically, the base station may include:

an adjustment module 307, configured to: after the determining module 303 determines, according to the RRM measurement report, the initial beam index information that is used for communication with the user equipment, adjust the cell bandwidth according to a traffic volume of at least one user equipment, where the cell bandwidth has a positive correlation with the traffic volume.

The sending module 301 is configured to broadcast information about cell bandwidth adjusted by the adjustment module 307 and information about a center frequency to each user equipment, or send information about adjusted cell bandwidth and information about a center frequency to each user equipment by using RRC signaling, where the center frequency is a center frequency in a frequency range corresponding to the adjusted cell bandwidth or is a specified frequency in the frequency range.

When the base station adjusts the cell bandwidth, one of the following methods may be used: The center frequency keeps unchanged, and a reduction or an increase is symmetrically made from two sides; for example, cell bandwidth is 100 MHz to 300 MHz and a center frequency is 200 MHz; then, an increase of 50 MHz may be made separately from two sides, and it is obtained that adjusted cell bandwidth is 50 MHz to 350 MHz; or a reduction or an increase is made from a single side; for example, cell bandwidth is 200 MHz to 300 MHz and a reduction of 100 MHz is made from a single side, and it is obtained that adjusted cell bandwidth is 100 MHz to 300 MHz; or a continuous frequency range is dynamically captured; for example, cell bandwidth is 100 MHz to 300 MHz, and 200 MHz to 300 MHz are captured from the cell bandwidth as adjusted cell bandwidth. The adjusted cell bandwidth is a continuous frequency range.

In this embodiment, the base station may adjust the cell bandwidth multiple times. In this case, granularity or unit information that can be adjusted each time may further be set. For example, a reduction or an increase of 20 MHz or the like is made each time. The granularity or unit information may be stipulated in advance or configured by using operation, administration, and maintenance (English: Operation, Administration and Maintenance, OAM for short)

Further, the base station may directly notify all user equipments of the adjusted cell bandwidth and the center frequency, or the base station notifies all user equipments of new cell bandwidth and a new center frequency by using an LTE-A base station. For example, the base station notifies all user equipments on a BCH or system information broadcast (English: System Information Broadcast, SIB for short) or by using RRC signaling.

An adjusted cell may use multiple channels, so that the multiple channels share a same HARQ entity. In this case, the entire cell may include multiple same-bandwidth channels, and the base station may send common information on a channel located at the center frequency, or the base station may send the common information on a central frequency of each channel. That is, if the adjusted cell includes same-bandwidth channels, the sending module 301 is configured to send the common information to each user equipment on the channel located at the center frequency, or send the common information to each user equipment on the central frequency of each channel.

The common information may be a PSS and an SSS, a broadcast channel (English: Broadcast Channel, BCH for short), a physical random access channel (English: Physical Random Access Channel, PRACH for short), or the like.

It should be additionally noted that when a center frequency of the adjusted cell bandwidth changes with respect to a center frequency of the unadjusted cell bandwidth, the base station further needs to a sending manner of common information sent only in a frequency range near the center frequency. For example, for a PSS and an SSS, a BCH, a PRACH, and the like, the base station may send common information on the center frequency of the adjusted cell bandwidth. The center frequency of the adjusted cell bandwidth is a central position in a frequency range corresponding to the adjusted cell bandwidth.

Cell bandwidth is adjusted according to a traffic volume of at least one user equipment, where the cell bandwidth has a positive correlation with the traffic volume; information about adjusted cell bandwidth and information about a center frequency are broadcast to each user equipment, or information about adjusted cell bandwidth and information about a center frequency are broadcast to each user equipment by using RRC signaling, so that only the cell bandwidth can be adjusted and it is not required to configure another radio resource configuration parameter, thereby reducing communication overheads during a cell bandwidth configuration process.

A sixth application scenario uses an example in which the base station is applied to a user bandwidth adjustment scenario for description.

Sometimes, an overall load status of a cell does not change significantly but traffic volumes of some user equipments change greatly, and consequently, a requirement of these user equipments for cell bandwidth changes. In this case, only cell bandwidth of these user equipments needs to be adjusted. From a perspective of user equipment, user bandwidth of the user equipment may be adaptively reduced or increased. From a perspective of the base station, however, the base station still sends information by using originally used cell bandwidth but frequency ranges used by different user equipments may be different.

Therefore, the base station may further include:

an adjustment module 307, configured to: after the determining module 303 determines, according to the RRM measurement report, the initial beam index information that is used for communication with the user equipment, adjust user bandwidth of the user equipment according to a traffic volume of the user equipment, where the user bandwidth has a positive correlation with the traffic volume.

The sending module 301 is configured to send, by using at least one of RRC signaling, a MAC CE, or a control channel, information about user bandwidth adjusted by the adjustment module 307 to the user equipment.

The user bandwidth includes channels. Therefore, when adjusting the user bandwidth, the base station may adjust the user bandwidth according to the traffic volume by using a channel allocated for the user equipment. Specifically, the adjustment module 307 is specifically configured to adjust, according to the traffic volume of the user equipment, the channel allocated for the user equipment, to obtain the user bandwidth.

For example, when the user bandwidth needs to be increased because the traffic volume increases, a channel in an inactive state or in a dormant state may be activated and the channel is allocated to the user equipment. When the user bandwidth needs to be reduced because the traffic volume decreases, a channel in an active state may be changed to the inactive state or the dormant state; in this case, the user equipment cannot use the channel.

After the user bandwidth is determined, the base station may use the RRC signaling, the MAC CE, or the control channel to indicate the adjusted user bandwidth to the user equipment.

User bandwidth of user equipment is adjusted according to a traffic volume of the user equipment, where the user bandwidth has a positive correlation with the traffic volume; information about adjusted user bandwidth is sent to the user equipment according to at least one of RRC signaling, a MAC CE, or a control channel, so that the user bandwidth can be adjusted in real time according to the traffic volume of the user equipment, thereby ensuring normal working of the user equipment.

A seventh application scenario uses an example in which the base station is applied to a semi-persistent scheduling (English: Semi-Persistent Scheduling, SPS for short) scenario for description.

The sending module 301 is configured to send SPS resource information to the user equipment, where the SPS resource information is used to indicate resource information and beam index information that are allocated by the base station for the user equipment.

When the SPS resource information includes the initial beam index information, the user equipment may determine the initial beam according to the initial beam index information. When the SPS resource information does not include the initial beam index information, the user equipment may determine the initial beam according to initial beam index information carried in the RRM measurement report. The initial beam may be a sending beam, or may be a receiving beam. The base station may indicate the initial beam index information when configuring the user equipment by using RRC signaling or when using a control channel to activate an SPS resource.

The communication module 304 is configured to communicate with the user equipment according to a beam corresponding to beam index information that is indicated by SPS information.

When the SPS resource information indicates at least two pieces of beam index information, the base station and the user equipment may agree to use a beam of relatively good quality or to use a preset beam according to a measurement result. In this case, the user equipment may send/receive information on the beam of relatively good quality, and correspondingly, the base station receives/sends information on the beam. Alternatively, the user equipment sends/receives information on at least one preset beam at the same time, and correspondingly, the base station receives/sends information on the at least one beam.

The user equipment selects a beam with a relatively good signal status when sending/receiving information in an SPS manner, or sends and/or receives information on one or more predetermined beams at the same time. Correspondingly, the base station may receive/send information on the one or more predetermined beams in the SPS manner. The base station and the user equipment may preferentially select one or more beams with a good signal status from multiple predetermined beam ranges according to the measurement result.

It should be additionally noted that when the base station re-indicates the beam index information according to the measurement result or according to beam index information recommended by the user equipment, only the beam index information in the SPS resource information needs to be modified and it is not required to modify the resource information. In this case, the base station may re-indicate the beam index information to the user equipment by using the RRC signaling, the MAC CE, or the control channel.

SPS resource information is sent to user equipment, where the SPS resource information is used to indicate resource information and beam index information that are allocated by the base station for the user equipment; communication with the user equipment is performed according to a beam corresponding to the beam index information that is indicated by SPS information, so that a resource and a beam can be configured for the user equipment in a manner of sending the SPS resource information, and a problem of wasting communication overheads that is caused by dynamically configuring a resource and a beam for the user equipment can be resolved, thereby achieving an effect of reducing communication overheads.

An eighth application scenario uses an example in which the base station is applied to a device-to-device (English: Device to Device, for short D2D) scenario for description.

To avoid mutual interference of D2D communication or D2D communication interference to normal communication of another user equipment in a cell, the base station allocates initial beam index information of an initial beam for D2D communication for the user equipment.

An allocating module 306 is configured to send, to the user equipment, resource indication information used during D2D communication, where the resource indication information includes D2D resource information and the initial beam index information, and is used to instruct the user equipment and the another user equipment to use a resource and an initial beam used during D2D communication.

Beam index information allocated by the base station may be set by the base station, or may be initial beam index information that the user equipment requests the base station to allocate after determining beam index information of a beam of relatively good quality according to a measurement result. The beam index information allocated by the base station is used for D2D communication between the user equipment and the another user equipment. The D2D resource information includes time-domain resource information and frequency-domain resource information.

It should be additionally noted that cellular communication used between the base station and the user equipment and D2D communication used between the user equipment and the another user equipment may reuse a time-domain resource and a frequency-domain resource on different initial beams.

Resource indication information used during D2D communication is sent to user equipment, where the resource indication information includes D2D resource information and initial beam index information, and is used to instruct the user equipment and another user equipment to use a resource and a beam used during D2D communication, so that communication with the another user equipment can be performed according to an initial beam allocated by the base station, thereby resolving a problem of mutual interference in D2D communication, and achieving an effect of improving communication quality.

In conclusion, according to the base station provided in this embodiment of the present invention, initial beam index information of an initial beam, allocated for user equipment, of a millimeter wave band is sent to the UE; an RRM measurement report from the user equipment is received, where the RRM measurement report is obtained after the user equipment performs RRM measurement on the initial beam indicated by the initial beam index information; the initial beam index information that is used for communication with the user equipment is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 4:
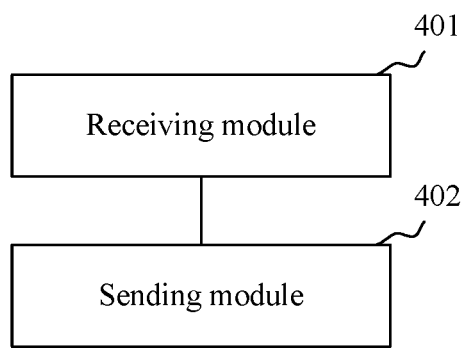
FIG. 4 is a structural block diagram of user equipment according to another embodiment of the present invention.

Referring to FIG. 4, FIG. 4 shows a structural block diagram of user equipment according to an embodiment of the present invention. The user equipment may be the UE shown in FIG. 1, and the UE may include a receiving module 401 and a sending module 402.

The receiving module 401 is configured to receive initial beam index information sent by a base station, where the initial beam index information is used to indicate an initial beam, allocated by the base station for the user equipment, of a millimeter wave band.

For details on the initial beam index information, refer to descriptions in the embodiment shown in FIG. 2, which are not described herein.

The sending module 402 is configured to send an RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In order to select an initial beam of relatively good signal quality, for communication, from the initial beam allocated by the base station to improve communication quality, the user equipment may further perform RRM measurement on the determined initial beam allocated by the base station, and generate an RRM measurement report according to a measurement result.

The user equipment may send the RRM measurement report to an LTE eNB, where the LTE eNB forwards the RRM measurement report to a millimeter wave eNB; or may send the RRM measurement report to a millimeter wave eNB. This embodiment imposes no limitation on a manner of sending the RRM measurement report by the user equipment. For a method for sending an RRM measurement report by user equipment in the following embodiments of the present invention, refer to descriptions in this embodiment, which are not described in the following.

The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

In conclusion, according to the user equipment provided in this embodiment of the present invention, initial beam index information sent by a base station is received, where the initial beam index information is used to indicate an initial beam, allocated by the base station for the user equipment, of a millimeter wave band; a radio resource management RRM measurement report is sent, where the RRM measurement report is obtained after the user equipment performs RRM measurement on the initial beam indicated by the initial beam index information, and the RRM measurement report is used to instruct the base station to determine the initial beam index information that is used for communication with the user equipment. Signal quality of the initial beam can be reported to the base station according to the RRM measurement report so that the base station selects a beam of relatively good signal quality to communicate with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 5:
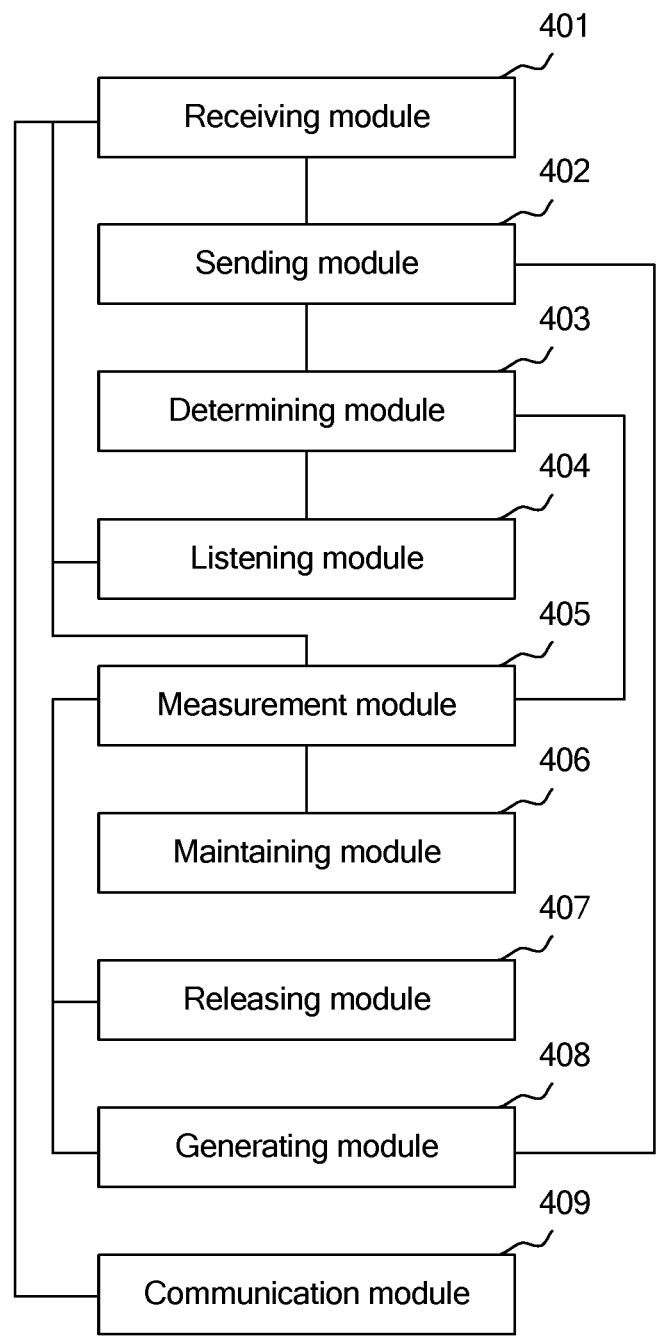
FIG. 5 is a structural block diagram of user equipment according to another embodiment of the present invention.

Referring to FIG. 5, FIG. 5 shows a structural block diagram of user equipment according to an embodiment of the present invention. The user equipment may be the UE shown in FIG. 1, and the UE may include a receiving module 501 and a sending module 502.

The receiving module 501 is configured to receive initial beam index information sent by a base station, where the initial beam index information is used to indicate an initial beam, allocated by the base station for the user equipment, of a millimeter wave band.

For details on the initial beam index information, refer to descriptions in the embodiment shown in FIG. 2, which are not described herein.

The sending module 502 is configured to send an RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In order to select an initial beam of relatively good signal quality, for communication, from the initial beam allocated by the base station to improve communication quality, the user equipment may further perform RRM measurement on the determined initial beam allocated by the base station, and generate an RRM measurement report according to a measurement result. The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

For a method for sending an RRM measurement report by user equipment, refer to descriptions in the embodiment shown in FIG. 2, which are not described in the following.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

The following uses different application scenarios as examples to describe a beam configuration method, and details are as follows:

A first application scenario uses an example in which the user equipment is applied to a discontinuous receiving scenario for description. This application scenario corresponds to the first application scenario in the embodiment shown in FIG. 3.

There are a dormant state and an active state for the user equipment, and user equipment in the active state needs to listen to a control channel by using a beam allocated by the base station, so as to receive, on the control channel, control information that is sent by the base station by using a beamforming technology. The control information includes a resource allocation control instruction, where the resource allocation control instruction is used to indicate an uplink/downlink resource allocated by the base station for the user equipment. When the user equipment switches from the dormant state to the active state, a beam on which resource allocation control signaling is previously received when the user equipment is in the active state no longer applies. Therefore, the user equipment further needs to determine a beam of a control channel that needs to be listened to this time. This embodiment provides two methods for determining a beam of a control channel that needs to be listened to. The following separately describes the two methods in detail.

In a first method, the user equipment needs to determine, according to the RRM measurement report, the beam of the control channel that needs to be listened to. Therefore, if the RRM measurement report includes reference signal information corresponding to each piece of initial beam index information and the reference signal information includes at least one of reference signal received power RSRP or reference signal received quality RSRQ, the user equipment further includes:

a determining module 403, configured to: after the sending module 402 sends the RRM measurement report, determine first initial beam index information of which the reference signal information is greater than a first threshold after the user equipment switches from a dormant state to an active state; and a listening module 404, configured to listen to control information on the control channel by using an initial beam corresponding to the first initial beam index information determined by the determining module 403.

After the user equipment sends the RRM measurement report, if the user equipment switches from the dormant state to the active state, the user equipment can determine at least one initial beam according to the foregoing method from the RRM measurement report, and listen to the control information on the control channel by using the determined at least one initial beam.

A process in which the user equipment determines the first initial beam index information is the same as a process in which the base station determines the first initial beam index information. For details, refer to descriptions of the first application scenario in the embodiment shown in FIG. 3, which are not described herein.

In a second method, the user equipment needs to receive specified beam index information; then, the receiving module 401 is further configured to receive second initial beam index information that is specified from each piece of initial beam index information in the RRM measurement report by the base station by using at least one of RRC signaling or a MAC CE.

The user equipment further includes a listening module 404, configured to listen to control information on a control channel by using an initial beam corresponding to the second initial beam index information received by the receiving module 401.

It should be additionally noted that beam index information may also be jointly determined by using the foregoing first method and second method. For example, a base station first specifies second initial beam index information by using at least one of RRC signaling or a MAC CE, and after a particular period of time, the base station selects first initial beam index information from an RRM measurement report according to reference signal information. Alternatively, a base station first selects first initial beam index information from an RRM measurement report according to reference signal information, and after a period of time, specifies second initial beam index information by using at least one of RRC signaling or a MAC CE. Certainly, the beam index information may also be determined by using another method, which is not limited in this embodiment.

After determining an initial beam of the control channel, the user equipment may further listen to the control channel in at least one of the following manners. The listening module 404 is specifically configured to receive the control information in an omnidirectional manner, or receive the control information by using a beam range greater than or equal to a beam range of the initial beam corresponding to the first initial beam index information, or receive the control information by using a beam range less than a beam range of the initial beam corresponding to the first initial beam index information. Alternatively, the listening module 404 is specifically configured to receive the control information in an omnidirectional manner, or receive the control information by using a beam range greater than or equal to a beam range of the initial beam corresponding to the second initial beam index information, or receive the control information by using a beam range less than a beam range of the initial beam corresponding to the second initial beam index information.

In this embodiment, the user equipment may receive the control information in the omnidirectional manner, and in this case, may not need to determine an initial beam of the control channel. A smaller beam range indicates a larger gain. Therefore, receiving the control information in the omnidirectional manner leads to a relatively small gain. Therefore, the user equipment may also determine the beam range according to the first initial beam index information or the second initial beam index information, and receive the control information according to the beam range.

That the beam range is determined according to the first initial beam index information is used as an example for description. Then, after determining the beam range, the user equipment may receive the control information by using a beam range greater than or equal to the beam range of the initial beam. For example, a beam range indicated by first initial beam index information is 20° to 30°; then, user equipment may receive control information by using a beam range of 15° to −35°. Alternatively, the user equipment may receive the control information by using a beam range less than the beam range of the initial beam. For example, a beam range indicated by first initial beam index information is 10° to −30°; then, user equipment may receive control information by using a beam range of 15° to −25°.

It should be additionally noted that a method for determining the beam range according to the second initial beam index information is the same as a method for determining the beam range according to the first initial beam index information, and details are not described herein.

If an RRM measurement report includes reference signal information corresponding to each piece of initial beam index information and the reference signal information includes at least one of reference signal received power RSRP or reference signal received quality RSRQ, after user equipment switches from a dormant state to an active state, the user equipment determines first initial beam index information of which the reference signal information is greater than a first threshold, and listen to control information on a control channel by using an initial beam corresponding to the first initial beam index information, so that the control information can be received by using an initial beam of relatively good signal quality in the RRM measurement report, thereby improving communication efficiency.

A second application scenario uses an example in which the user equipment is applied to a TA scenario for description. This application scenario corresponds to the second application scenario in the embodiment shown in FIG. 3.

A barrier between the user equipment and the base station lowers communication quality of the initial beam. Therefore, the base station may preconfigure an alternative beam for the user equipment, so as to improve communication quality by avoiding the barrier. Therefore, the receiving module 401 is further configured to receive alternative beam index information sent by the base station, where the alternative beam index information is used to indicate an alternative beam, allocated by the base station for the user equipment, of a millimeter wave band.

The user equipment further includes a measurement module 405, configured to: when reference signal information of the initial beam is less than a second threshold, perform RRM measurement on an alternative beam indicated by each piece of alternative beam index information, where the reference signal information includes at least one of RSRP or RSRQ; and a determining module 403, configured to determine, according to the RRM measurement performed by the measurement module 405, first alternative beam index information of which reference signal information is greater than a third threshold.

The sending module 402 is configured to send the first alternative beam index information determined by the determining module 403 to the base station, where the base station is configured to communicate with the user equipment according to an alternative beam corresponding to the first alternative beam index information.

The base station may separately send the alternative beam index information to the user equipment; or may send the alternative beam index information and the initial beam index information together to the user equipment when sending the initial beam index information to the user equipment, to reduce transmission overheads. A method for sending alternative beam index information in the following embodiments of the present invention is the same as the method for sending alternative beam index information in this embodiment.

In this embodiment, for details on a method for determining the first alternative beam index information by the user equipment, refer to descriptions in the embodiment shown in FIG. 3, which are not described herein.

Further, in addition to that the user equipment actively performs RRM measurement on the initial beam and determines, by using the reference signal information, whether to use an alternative beam for communication, the base station may use a beam tracking technology to detect whether the user equipment is about to enter a barrier area. When the base station detects that the user equipment is about to enter the barrier area, the user equipment is triggered to perform RRM measurement on the alternative beam.

In this embodiment, different user equipments have different distances with the base station. Therefore, signal transmission delays of different user equipments are different. If uplink information sent by different user equipments needs to arrive at the base station at the same time, the base station needs to configure different TA for different user equipments according to distances between the user equipments and the base station. Generally, compared with the initial beam allocated by the base station, the alternative beam has a relatively long propagation path, leading to a relatively large propagation delay. In this case, consequently, uplink TA changes suddenly. In this case, the user equipment needs to redetermine the uplink TA. Determining the uplink TA needs to be implemented by using a random access procedure.

In this embodiment, the user equipment may receive a random access instruction sent by the base station, and trigger the random access procedure as instructed by the random access instruction, to re-acquire the uplink TA, or may actively trigger the random access procedure, to re-acquire the uplink TA. Specifically, the sending module 402 is further configured to automatically send a first random access request to the base station, where the first random access request is used to instruct the base station to generate uplink TA and to communicate with the user equipment according to the uplink TA and an alternative beam corresponding to allocated second alternative beam index information; or the receiving module 401 is further configured to receive, on the control channel, a random access instruction sent by the base station, where the random access instruction is sent after the base station determines, by using beam tracking, to use the alternative beam allocated for the user equipment to communicate with the user equipment; and send a second random access request to the base station according to the random access instruction, where the second random access request is used to instruct the base station to generate uplink TA and to communicate with the user equipment according to the uplink TA and the alternative beam corresponding to the received first alternative beam index information.

Accordingly, when the user equipment detects that reference signal information of each alternative beam is less than the third threshold and that reference signal information of at least one initial beam is greater than the second threshold, it is determined that quality of the initial beam is relatively good, and initial beam index information of the at least one initial beam is sent to the base station. The base station uses the at least one initial beam to communicate with the base station. Alternatively, the base station uses a beamforming technology to determine that the user equipment is about to leave the barrier area; and when detecting that the reference signal information of the at least one initial beam is greater than the second threshold, determines to use the at least one initial beam to communicate with the base station. In this case, the user equipment may redetermine the uplink TA, or may not determine the uplink TA.

In this embodiment, there may be different TA for beams used by the user equipment, and the TA may be for a same millimeter wave base station or may be for different millimeter wave base stations. Therefore, the base station may further configure at least one TA set for each user equipment, where each TA set includes at least one piece of beam index information, and uplink TA corresponding to each piece of beam index information is the same. The beam index information may be the initial beam index information of the initial beam, or may be the alternative beam index information of the alternative beam. Beams indicated by beam index information in one TA set may belong to a same cell, or may belong to different cells. Therefore, a cell identifier of a cell associated with each beam may further be identified in the TA set.

Accordingly, the receiving module 401 is configured to receive a TA set sent by the base station, where the TA set is generated, after the base station determines beams that have same uplink TA and are in beams for communication with the user equipment as a group, according to each group, the TA set includes a TA set identifier, beam index information of each beam in the group, and a cell identifier and a time alignment timer TAT that correspond to each beam in the group, and the beam includes at least one of the initial beam or the alternative beam.

The measurement module 405 is configured to: when the TAT in the TA set received by the receiving module 401 has expired, detect whether the cell identifier in the TA set corresponds to beam index information in another TA set and whether a TAT in the another TA set has not expired.

The user equipment further includes a maintaining module 406, configured to: when the measurement module 405 detects that the cell identifier in the TA set corresponds to the beam index information in the another TA set and the TAT in the another TA set has not expired, determine a cell corresponding to the beam index information, and maintain a hybrid automatic repeat request (English: Hybrid Automatic Repeat Request, HARQ for short) buffer area and a sounding reference symbol (English: Sounding Reference Signal, SRS for short) resource that correspond to the cell; and a release module 407, configured to: when the measurement module 405 detects that the cell identifier in the TA set corresponds to the beam index information in the another TA set and the TAT in the another TA set has expired, determine a cell corresponding to the beam index information, and release a HARQ buffer area and an SRS resource that correspond to the cell.

For example, a TA set 1 includes a beam 1 and a beam 2, and the beam 1 corresponds to a cell 1. After user equipment detects that a TAT has expired, if it is detected that a beam 3 associated with the cell 1 is further in a TA set 2 and a TAT in the TA set 2 has not expired, the user equipment maintains a HARQ buffer area and an SRS resource that correspond to the cell and does not send an SRS or a HARQ ACK/NACK on the beam 1; if it is detected that a beam 3 associated with the cell 1 is in TA set 2 and a TAT in the TA set 2 has expired, the user equipment releases a HARQ buffer area and an SRS resource that correspond to the cell.

Alternative beam index information sent by a base station is received, where the alternative beam index information is used to indicate an alternative beam, allocated by the base station for user equipment, of a millimeter wave band; if reference signal information of an initial beam is less than a second threshold, RRM measurement is performed on an alternative beam indicated by each piece of alternative beam index information; first alternative beam index information of which reference signal information is greater than a third threshold is determined according to the RRM measurement; the determined first alternative beam index information is sent to the base station. An alternative beam of relatively good quality can be used for communication with the base station when quality of an allocated initial beam is relatively poor, achieving an effect of improving communication efficiency.

A third application scenario uses an example in which the user equipment is applied to a power control scenario for description. This application scenario corresponds to the third application scenario in the embodiment shown in FIG. 3.

The base station uses the beamforming technology, and path losses at different beam directions may be different. Therefore, at least one initial beam with a smallest path loss needs to be selected from the allocated initial beam, and communication is performed on the at least one selected initial beam.

Optionally, the user equipment further includes:
a measurement module 405, configured to: after the sending module 402 sends an RRM measurement report, measure RSRP of an initial beam corresponding to each piece of initial beam index information, to obtain path loss information of each initial beam; and
a generating module 408, configured to generate power headroom (English: Power Headroom, PH for short) according to smallest path loss information measured by the measurement module 407, to obtain a power headroom report (English: Power Headroom Report, PHR for short).

The sending module 402 is configured to send the PHR generated by the generating module 408, where the PHR is used to instruct the base station to allocate an uplink resource for the user equipment according to the PH and an initial beam corresponding to the PH and to communicate with the user equipment on the corresponding uplink resource by using the beam corresponding to the PH.

Beam index information sent by the base station may correspond to a beam outside a beam range corresponding to the RRM measurement report, may correspond to an initial beam in a beam range corresponding to the RRM measurement report, or may be an adaptively determined beam. This is not limited in this embodiment.

When the user equipment allows PHs of at least two initial beams to be sent at the same time to support concurrent power control on multiple beams, the user equipment may sort out, from the PHs of the at least two initial beams, at least two PHs that meet a preset condition, and add the PHs of the at least two initial beams to the PHR. Meeting the preset condition may be that the PH is greater than a fixed threshold, or that a difference between the PH and a PH of one of the at least two initial beams is greater than a fixed threshold, or the like.

The user equipment may send the PHR to an LTE eNB, where the LTE eNB forwards the PHR to a millimeter wave eNB; or may send the PHR to a millimeter wave eNB. This embodiment imposes no limitation on a manner of sending the PHR by the user equipment. For a method for sending a PHR by user equipment in the following embodiments of the present invention, refer to descriptions in this embodiment, which are not described in the following.

If the base station expects to perform uplink scheduling on the user equipment within a smaller beam range to obtain a better directional gain and more accurate power control, beam index information can be dynamically indicated by using a MAC CE, so that the user equipment reports PH of a beam with a smallest path loss thereof.

Therefore, the receiving module 401 is further configured to receive a first indication that is sent by the base station and carries first beam index information of a first beam in a beam range of a single initial beam.

The generating module 408 is further configured to measure RSRP of each first beam that is indicated by the first indication received by the receiving module 401, to obtain path loss information of each first beam.

After the user equipment measures PH of each piece of initial beam index information, if it is detected that a difference between measured path loss information of the initial beam index information and path loss information of the initial beam index information included in the RRM measurement report, the user equipment may add PH of the initial beam index information included in the RRM measurement report to the PHR for sending.

It should be additionally noted that when the base station does not limit uplink transmit power of the user equipment, the user equipment may support multiple beams in terms of uplink, to improve air interface efficiency. Specifically, the user equipment may send same or different information on multiple beams, send same or different HARQ redundancy version (English: Redundancy Version, RV for short), send the control information on some beams, and send data information on some beams, and the like.

Further, when the user equipment uses multiple beams for communication, uplink transmit power among beams needs to be allocated. For example, when a difference between path losses of multiple beams is not large, the user equipment may evenly allocate total transmit power among the multiple beams.

If the user equipment supports multiple beams at the same time and power is limited to an extent, transmit power of at least one beam further needs to be lowered. For example, the user equipment may evenly lower transmit power of each beam according to a same factor or coefficient, or the user equipment may set different factors or coefficients for different beams and lower transmit power of beams according to their respective factors or coefficients, or the user equipment may differentiate priorities according to information content carried on different beams and lower transmit power of each beam according to the priorities. When the control information and the data information are sent at the same time, a priority of a beam carrying the control information is higher than a priority of a beam carrying the data information.

RSRP of an initial beam corresponding to each piece of initial beam index information is performed, to obtain path loss information of each initial beam; PH is generated according to smallest path loss information, to obtain a PHR; the PHR is sent, where the PHR is used to instruct a base station to allocate an uplink resource for user equipment according to the PH and an initial beam corresponding to the PH; communication with the user equipment is performed on the corresponding uplink resource by using the initial beam corresponding to the PH, so that an uplink resource corresponding to an initial beam with a smallest path loss can be selected for communication with the base station, thereby reducing transmit power.

A fourth application scenario uses an example in which the user equipment is applied to a CSI measurement scenario for description. This application scenario corresponds to the fourth application scenario in the embodiment shown in FIG. 3.

In this embodiment, the user equipment further needs to perform CSI measurement on the initial beam to obtain CSI information, so as to determine quality of the initial beam according to the CSI information.

Specifically, the user equipment further includes:

a measurement module 405, configured to: after the sending module 403 sends the RRM measurement report, perform CSI measurement on an initial beam corresponding to each piece of initial beam index information, to obtain a channel quality indicator (English: Channel Quality Information, CQI for short of each initial beam; and a generating module 408, configured to generate at least one piece of channel state information CSI information according to a highest CQI measured by the measurement module 405, to obtain a CSI measurement report.

The sending module 402 is configured to send the CSI measurement report generated by the generating module 408, where the CSI measurement report is used to instruct the base station to communicate with the user equipment according to the CSI information and an initial beam corresponding to the CSI information.

A beam measured by the user equipment may be an initial beam in a range of the RRM measurement report; then, the user equipment first needs to acquire an initial beam corresponding to the RRM measurement report. For example, by default, RRM measurement corresponds to beams of a primary synchronization signal (English: Primary Synchronization Signal, PSS for short) and a secondary synchronization signal (English: Secondary Synchronization Signal, SSS) to which user equipment corresponds when the user equipment accesses a base station; or user equipment includes identifier information of an initial beam in an RRM measurement report, and the user equipment determines a beam according to the identifier information; or user equipment determines initial beam index information according to a measurement result of a downlink reference signal, and includes the initial beam index information in an RRM measurement report.

After measuring the CSI information of each initial beam, the user equipment may sort out, from each piece of CSI information, CSI information that includes a highest CQI, and generate the CSI measurement report according to at least one CSI information that is sorted out. The CSI information includes at least one of a CQI, a PMI, or an RI, and the user equipment may send at least one of the CQI, the PMI, or the RI at the same time or at different moments.

The user equipment may send the CSI measurement report to an LTE eNB, where the LTE eNB forwards the CSI measurement report to a millimeter wave eNB; or may send the CSI measurement report to a millimeter wave eNB. This embodiment imposes no limitation on a manner of sending the CSI measurement report by the user equipment. For a method for sending a CSI measurement report by user equipment in the following embodiments of the present invention, refer to descriptions in this embodiment, which are not described in the following.

If the base station expects to perform uplink scheduling on the user equipment within a smaller beam range to obtain a better directional gain, initial beam index information can be dynamically indicated by using a MAC CE, so that the user equipment reports CSI information with a highest CQI thereof. Specifically:

the receiving module 401 is further configured to receive a second indication that is sent by the base station and carries second beam index information of a second beam in a beam range of a single initial beam; and the generating module 408 is further configured to perform CSI measurement on each second beam that is indicated by the second indication received by the receiving module 401, to obtain a CQI of each second beam.

Channel state information CSI measurement is performed on an initial beam corresponding to each piece of initial beam index information, to obtain a CQI of each initial beam; CSI information is generated according to a highest CQI, to obtain a CSI measurement report; the CSI measurement report is sent, where the CSI measurement report is used to instruct a base station to communicate with user equipment according to the CSI information and an initial beam corresponding to the CSI information, so that an initial beam with the highest CQI can be selected to communicate with the base station, thereby improving communication efficiency.

A fifth application scenario uses an example in which the user equipment is applied to a cell bandwidth adjustment scenario for description. This application scenario corresponds to the fifth application scenario in the embodiment shown in FIG. 3.

In this embodiment, when a traffic volume of each user equipment that accesses a cell changes and consequently, load of the cell changes, the base station needs to adjust cell bandwidth of the cell. For details on a manner of adjusting cell bandwidth by the base station, refer to descriptions of the fifth application scenario in the embodiment shown in FIG. 3, which are not described herein.

Therefore, the receiving module 401 is further configured to: receive, by means of broadcasting, information about adjusted cell bandwidth and information about a center frequency that are sent by the base station, or receive RRC signaling sent by the base station, where the RRC signaling carries information about adjusted cell bandwidth and information about a center frequency, the adjusted cell bandwidth is adjusted by the base station according to a traffic volume of at least one user equipment, the cell bandwidth has a positive correlation with the traffic volume, and the center frequency is a central frequency in a frequency range corresponding to the adjusted cell bandwidth or is a specified frequency in the frequency range; and when the adjusted cell includes same-bandwidth channels, receive, on a channel located at the center frequency, common information sent by the base station, or receive, on a central frequency of each channel, common information sent by the base station.

The user equipment may receive the information about the adjusted cell bandwidth and the information about the center frequency in a manner corresponding to a manner in which the base station sends the information about the adjusted cell bandwidth and the information about the center frequency. The user equipment receives, according to the information about the center frequency, common information on a channel located at the center frequency, or receives common information on a central frequency of each channel.

Information about adjusted cell bandwidth and information about a center frequency that are sent by a base station are received by means of broadcasting, or RRC signaling sent by a base station is received, where the RRC signaling carries information about adjusted cell bandwidth and information about a center frequency, the adjusted cell bandwidth is adjusted by the base station according to a traffic volume of user equipment, the cell bandwidth has a positive correlation with the traffic volume, and the center frequency is a central frequency in a frequency range corresponding to the adjusted cell bandwidth or is a specified frequency in the frequency range, so that only the cell bandwidth can be adjusted and it is not required to configure another radio resource configuration parameter, thereby reducing communication overheads during a cell bandwidth configuration process.

A sixth application scenario uses an example in which the user equipment is applied to a user bandwidth adjustment scenario for description. This application scenario corresponds to the sixth application scenario in the embodiment shown in FIG. 3.

Sometimes, an overall load status of a cell does not change significantly but traffic volumes of some user equipments change greatly, and consequently, a requirement of these user equipments for cell bandwidth changes. In this case, only cell bandwidth of these user equipments needs to be adjusted. From a perspective of user equipment, user bandwidth of the user equipment may be adaptively reduced or increased. From a perspective of the base station, however, the base station still sends information by using originally used cell bandwidth but frequency ranges used by different user equipments may be different.

The user bandwidth includes channels. Therefore, when adjusting the user bandwidth, the base station may adjust the user bandwidth according to the traffic volume by using a channel allocated for the user equipment.

Therefore, the receiving module 401 is configured to receive information, sent by the base station, about adjusted user bandwidth by using at least one of RRC signaling, a MAC CE, or a control channel, where the adjusted user bandwidth is adjusted by the base station according to a traffic volume of the user equipment, and the user bandwidth has a positive correlation with the traffic volume.

The user equipment further includes a listening module 404, configured to listen to a control channel of channels that are included by the user bandwidth and received by the receiving module 401.

The user equipment may receive the information about the adjusted user bandwidth in a manner corresponding to a manner in which the base station sends the information about the adjusted cell bandwidth, and listen to the channels that are included by the user bandwidth. Bandwidth remaining after the user bandwidth is adjusted may be continuous or discontinuous in a frequency domain.

Information, sent by a base station, about adjusted user bandwidth is received by using at least one of RRC signaling, a MAC CE, or a control channel, where the adjusted user bandwidth is adjusted by the base station according to a traffic volume of user equipment, and the user bandwidth has a positive correlation with the traffic volume, so that the user bandwidth can be adjusted in real time according to the traffic volume of the user equipment, thereby ensuring normal working of the user equipment.

A seventh application scenario uses an example in which the user equipment is applied to an SPS scenario for description. This application scenario corresponds to the seventh application scenario in the embodiment shown in FIG. 3.

The receiving module 401 is configured to receive SPS resource information sent by the base station.

A determining module 403 is configured to determine, according to the SPS resource information, resource information and beam index information that are allocated by the base station for the user equipment.

When the SPS resource information includes the initial beam index information, the user equipment may determine the initial beam according to the initial beam index information. When the SPS resource information does not include the initial beam index information, the user equipment may determine the initial beam according to initial beam index information carried in the RRM measurement report. The initial beam may be a sending beam, or may be a receiving beam. The base station may indicate the initial beam index information when configuring the user equipment by using RRC signaling or when using a control channel to activate an SPS resource.

When the SPS resource information indicates at least two pieces of beam index information, the base station and the user equipment may agree to use a beam of relatively good quality or to use a preset beam according to a measurement result. In this case, the user equipment may send/receive information on the beam of relatively good quality, and correspondingly, the base station receives/sends information on the beam. Alternatively, the user equipment sends/receives information on at least one preset beam at the same time, and correspondingly, the base station receives/sends information on the at least one beam.

The user equipment selects a beam with a relatively good signal status when sending/receiving information in an SPS manner, or sends and/or receives information on one or more predetermined beams at the same time. Correspondingly, the base station may receive/send information on the one or more predetermined beams in the SPS manner. The base station and the user equipment may preferentially select one or more beams with a good signal status from multiple predetermined beam ranges according to the measurement result.

SPS resource information sent by a base station is received, and resource information and beam index information that are allocated by the base station for user equipment is determined according to the SPS resource information, so that a resource and a beam can be configured in a manner of sending the SPS resource information, and a problem of wasting communication overheads that is caused by dynamically configuring a resource and a beam for the user equipment can be resolved, thereby achieving an effect of reducing communication overheads.

An eighth application scenario uses an example in which the user equipment is applied to a D2D scenario for description. This application scenario corresponds to the eighth application scenario in the embodiment shown in FIG. 3.

To avoid mutual interference of D2D communication or D2D communication interference to normal communication of another user equipment in a cell, the base station allocates initial beam index information of an initial beam for D2D communication for the user equipment.

The receiving module 401 is configured to receive resource indication information sent by the base station, where the resource indication information includes D2D resource information and the initial beam index information.

The user equipment further includes a communication module 409, configured to determine, according to the resource indication information received by the receiving module 401, a resource and an initial beam used when D2D communication with another user equipment is used.

The initial beam index information allocated by the base station may be set by the base station, or may be initial beam index information that the user equipment requests the base station to allocate after determining beam index information of a beam of relatively good quality according to a measurement result. The initial beam index information allocated by the base station is used for D2D communication between the user equipment and the another user equipment. The D2D resource information includes time-domain resource information and frequency-domain resource information.

It should be additionally noted that cellular communication used between the base station and the user equipment and D2D communication used between the user equipment and the another user equipment may reuse a time-domain resource and a frequency-domain resource on different initial beams.

Resource indication information sent by a base station is received, where the resource indication information includes D2D resource information and beam index information; a resource and a beam used when D2D communication with another user equipment is used is determined according to the resource indication information, so that communication with the another user equipment can be performed according to a beam allocated by the base station, thereby resolving a problem of mutual interference in D2D communication, and achieving an effect of improving communication quality.

In conclusion, according to the user equipment provided in this embodiment of the present invention, initial beam index information sent by a base station is received, where the initial beam index information is used to indicate an initial beam, allocated by the base station for the user equipment, of a millimeter wave band; a radio resource management RRM measurement report is sent, where the RRM measurement report is obtained after the user equipment performs RRM measurement on the initial beam indicated by the initial beam index information, and the RRM measurement report is used to instruct the base station to determine the initial beam index information that is used for communication with the user equipment. Signal quality of the initial beam can be reported to the base station according to the RRM measurement report so that the base station selects a beam of relatively good signal quality to communicate with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 6:
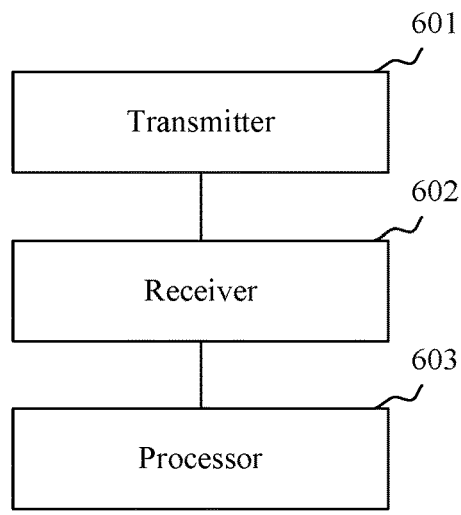
FIG. 6 is a structural block diagram of a base station according to another embodiment of the present invention.

Referring to FIG. 6, FIG. 6 shows a structural block diagram of a base station according to an embodiment of the present invention. The base station may be the base station shown in FIG. 1. The base station may include a transmitter 601, a receiver 602, and a processor 603.

The transmitter 601 is configured to send initial beam index information of an initial beam, allocated for user equipment, of a millimeter wave band to the user equipment.

The initial beam index information is used to indicate an initial beam used when the base station sends downlink information to the user equipment, and is preconfigured by the base station for the user equipment. The initial beam index information is associated with an antenna weight value or codebook information used when the base station sends downlink information, to determine information such as a direction and a width of the initial beam. The direction of the initial beam refers to angle information of the initial beam with respect to a horizontal direction and/or a vertical direction. The initial beam index information is further associated with characteristic information of the initial beam, and the base station sends particular characteristic information of the initial beam on different initial beams, so that the user equipment identifies different initial beams according to different characteristic information. For details, refer to descriptions in the embodiment shown in FIG. 2, which are not described herein.

The receiver 602 is configured to receive the RRM measurement report from the user equipment, where the RRM measurement report is obtained after the user equipment performs RRM measurement on the initial beam that is indicated by the initial beam index information sent by the transmitter 601.

The processor 603 is configured to determine, according to the RRM measurement report received by the receiver 602, the initial beam index information that is used for communication with the user equipment.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

In conclusion, according to the base station provided in this embodiment of the present invention, initial beam index information of an initial beam, allocated for user equipment, of a millimeter wave band is sent to the UE; an RRM measurement report from the user equipment is received, where the RRM measurement report is obtained after the user equipment performs RRM measurement on the initial beam indicated by the initial beam index information; the initial beam index information that is used for communication with the user equipment is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Another embodiment of the present invention provides a base station. The base station may be the base station shown in FIG. 1. The base station may include a transmitter 601, a receiver 602, and a processor 603.

The transmitter 601 is configured to send initial beam index information of an initial beam, allocated for user equipment, of a millimeter wave band to the user equipment.

The initial beam index information is used to indicate a beam used when the base station sends downlink information to the user equipment, and is preconfigured by the base station for the user equipment. The initial beam index information is associated with an antenna weight value or codebook information used when the base station sends downlink information, to determine information such as a direction and a width of the initial beam. The direction of the initial beam refers to angle information of the initial beam with respect to a horizontal direction and/or a vertical direction. For example, a beam direction of an initial beam is a direction of 30° to −60° with respect to a horizontal direction, a direction of 20° to −40° with respect to a vertical direction, or the like. The initial beam index information is further associated with characteristic information of the initial beam, and the base station sends particular characteristic information of the initial beam on different initial beams, so that the user equipment identifies different initial beams according to different characteristic information. For details, refer to descriptions in the embodiment shown in FIG. 2, which are not described herein.

In this embodiment, the base station may configure at least one initial beam for the user equipment, and send initial beam index information of each initial beam in the at least one initial beam to the user equipment, so that the user equipment determines an initial beam on which the downlink information sent by the base station is to be received.

The receiver 602 is configured to receive a radio resource management RRM measurement report from the user equipment, where the RRM measurement report is obtained after the user equipment performs RRM measurement on the initial beam that is indicated by the initial beam index information sent by the transmitter 601.

The processor 603 is configured to determine, according to the RRM measurement report received by the receiver 602, the initial beam index information that is used for communication with the user equipment.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

The following uses different application scenarios as examples to describe a beam configuration method, and details are as follows:

A first application scenario uses an example in which the base station is applied to a discontinuous receiving scenario for description. This application scenario corresponds to the first application scenario in the embodiment shown in FIG. 3.

There are a dormant state and an active state for the user equipment, and user equipment in the active state needs to listen to a control channel by using a beam allocated by the base station, so as to receive, on the control channel, control information that is sent by the base station by using a beamforming technology. The control information includes a resource allocation control instruction, where the resource allocation control instruction is used to indicate an uplink/downlink resource allocated by the base station for the user equipment. When the user equipment switches from the dormant state to the active state, a beam on which resource allocation control signaling is previously received when the user equipment is in the active state no longer applies. Therefore, the user equipment further needs to determine a beam of a control channel that needs to be listened to this time. This embodiment provides two methods for determining a beam of a control channel that needs to be listened to. The following separately describes the two methods in detail.

In a first method, the processor 603 is specifically configured to determine, from reference signal information corresponding to each piece of initial beam index information in the RRM measurement report, first initial beam index information of which the reference signal information is greater than a first threshold, where the reference signal information includes at least one of reference signal received power RSRP or reference signal received quality RSRQ.

The transmitter 601 is further configured to send control information to the user equipment on a control channel by using an initial beam corresponding to the first initial beam index information determined by the processor 603, and the user equipment is configured to: after switching from a dormant state to an active state, listen to the control information by using the initial beam corresponding to the determined first initial beam index information.

In the first method for determining the beam, the base station and the user equipment may agree to use an initial beam of relatively good signal quality in the RRM measurement report. For details on a specific process, refer to descriptions of the first application scenario in the embodiment shown in FIG. 3, which are not described herein.

In a second method, the transmitter 601 is further configured to specify second initial beam index information from each piece of initial beam index information in the RRM measurement report by using at least one of radio resource control RRC signaling or a Media Access Control control element MAC CE, where an initial beam corresponding to the specified second initial beam index information is used to send the control information to the user equipment on a control channel.

In the second method for determining the beam, the base station may specify, from the allocated initial beam, an initial beam that is used to send the resource allocation control signaling on the control channel, and then send the second initial beam index information of the specified initial beam to the user equipment by using the RRC signaling or the MAC CE.

It should be additionally noted that beam index information may also be jointly determined by using the foregoing first method and second method. For details, refer to descriptions of the first application scenario in the embodiment shown in FIG. 3, which are not described herein.

First initial beam index information of which reference signal information is greater than a first threshold is determined from reference signal information corresponding to each piece of initial beam index information in an RRM measurement report, control information is sent to user equipment on a control channel by using an initial beam corresponding to the first initial beam index information, so that the control information can be transmitted by using an initial beam of relatively good signal quality in the RRM measurement report, thereby improving communication efficiency.

A second application scenario uses an example in which the base station is applied to a TA scenario for description. This application scenario corresponds to the second application scenario in the embodiment shown in FIG. 3.

A barrier between the user equipment and the base station lowers communication quality of a beam. Therefore, the base station may preconfigure an alternative beam for the user equipment, so as to improve communication quality by avoiding the barrier. Therefore, specifically, the transmitter 601 is further configured to send alternative beam index information of an alternative beam, allocated for the user equipment, of a millimeter wave band to the user equipment.

The receiver 602 is further configured to receive first alternative beam index information that is selected from each piece of alternative beam index information sent by the transmitter 601 and that is sent by the user equipment, where the first alternative beam index information is alternative beam index information of which reference signal information of the initial beam is less than a second threshold and of which reference signal information determined after RRM measurement is performed on an alternative beam indicated by each piece of alternative beam index information is greater than a third threshold, and the reference signal information includes at least one of RSRP or RSRQ.

The processor 603 is further configured to communicate with the user equipment according to an alternative beam corresponding to the first alternative beam index information received by the receiver 602.

For details on a process of configuring an alternative beam for the user equipment by the base station, refer to descriptions of the second application scenario in the embodiment shown in FIG. 3, which are not described herein. The base station communicates with the user equipment according to an alternative beam corresponding to at least one piece of received alternative beam index information.

Further, in addition to that the user equipment actively performs RRM measurement on the initial beam and determines, by using the reference signal information, whether to use an alternative beam for communication, the base station may use a beam tracking technology to detect whether the user equipment is about to enter a barrier area. When the base station detects that the user equipment is about to enter the barrier area, the user equipment is triggered to perform RRM measurement on the alternative beam.

In this embodiment, different user equipments have different distances with the base station. Therefore, signal transmission delays of different user equipments are different. If uplink information sent by different user equipments needs to arrive at the base station at the same time, the base station needs to configure different TA for different user equipments according to distances between the user equipments and the base station. Generally, compared with the initial beam allocated by the base station, the alternative beam has a relatively long propagation path, leading to a relatively large propagation delay. In this case, consequently, the uplink TA changes suddenly. In this case, the user equipment needs to redetermine the uplink TA. Determining the uplink TA needs to be implemented by using a random access procedure.

When the user equipment actively triggers the random access procedure, the user equipment actively sends a first random access request to the base station. In this case, the transmitter 601 is further configured to receive the first random access request sent by the user equipment.

The processor 603 is specifically configured to generate uplink timing advance TA according to the first random access request, and communicate with the user equipment according to the uplink TA and the alternative beam corresponding to the received first alternative beam index information.

When the user equipment triggers the random access procedure as instructed by a random access instruction, the user equipment sends a second random access request to the base station. In this case, the processor 603 is further configured to determine, by using beam tracking, to use the alternative beam allocated for the user equipment to communicate with the user equipment.

The transmitter 601 is further configured to send the random access instruction to the user equipment on the control channel.

The receiver 602 is further configured to receive the second random access request that is sent by the user equipment according to the random access instruction sent by the transmitter 601.

The processor 603 is further configured to generate uplink TA according to the second random access request received by the receiver 602, and communicate with the user equipment according to the uplink TA and an alternative beam corresponding to allocated second alternative beam index information.

In this embodiment, there may be different TA for beams used by the user equipment, and the TA may be for a same millimeter wave base station or may be for different millimeter wave base stations. Therefore, the base station may further configure at least one TA set for each user equipment, where each TA set includes at least one piece of beam index information, and uplink TA corresponding to each piece of beam index information is the same. The beam index information may be the initial beam index information of the initial beam, or may be the alternative beam index information of the alternative beam. Beams indicated by beam index information in one TA set may belong to a same cell, or may belong to different cells. Therefore, a cell identifier of a cell associated with each beam may further be identified in the TA set.

Optionally, the processor 603 is further configured to: determine beams that have same uplink TA and are in beams for communication with the user equipment as a group, where the beam includes at least one of the initial beam or the alternative beam; and generate one TA set according to each group, where the TA set includes a TA set identifier, beam index information of each beam in the group, and a cell identifier and a time alignment timer TAT that correspond to each beam in the group.

The transmitter 601 is further configured to send the TA set generated by the processor 603 to the user equipment.

It should be additionally noted that when the uplink TA changes because the user equipment moves, the base station may reconfigure a TA set for the user equipment according to new uplink TA, and allocate beam index information in the TA set and a cell associated with the beam index information. The base station may adjust the uplink TA and the TA set by using a TA cmd.

First alternative beam index information that is selected from each piece of sent alternative beam index information and that is sent by user equipment is received, where the first alternative beam index information is alternative beam index information of which reference signal information of an initial beam is less than a second threshold and of which reference signal information determined after RRM measurement is performed on an alternative beam indicated by each piece of alternative beam index information is greater than a third threshold. Communication with the user equipment is performed according to an alternative beam corresponding to the first alternative beam index information. An alternative beam of relatively good quality can be used for communication with the user equipment when quality of an allocated initial beam is relatively poor, thereby achieving an effect of improving communication efficiency.

A third application scenario uses an example in which the base station is applied to a power control scenario for description. This application scenario corresponds to the third application scenario in the embodiment shown in FIG. 3.

The base station uses the beamforming technology, and path losses at different beam directions may be different. Therefore, an initial beam with a smallest path loss needs to be selected from the allocated initial beam, and communication is performed on the selected initial beam.

Optionally, the receiver 602 is configured to: after the processor 603 determines, according to the RRM measurement report, the initial beam index information that is used for communication with the user equipment, receive a power headroom report PHR from the user equipment, where the PHR includes power headroom PH, and the PH is generated, after path loss information is obtained by measuring RSRP of each initial beam, according to smallest path loss information.

The processor 603 is specifically configured to allocate an uplink resource for the user equipment according to the PH received by the receiver 602 and an initial beam corresponding to the PH, and communicate with the user equipment on the corresponding uplink resource by using the initial beam corresponding to the PH.

Beam index information sent by the base station may correspond to a beam outside a beam range corresponding to the RRM measurement report, may correspond to an initial beam in a beam range corresponding to the RRM measurement report, or may be an adaptively determined beam. This is not limited in this embodiment.

After receiving the PHR, the base station allocates the uplink resource for the user equipment according to beam index information and the PH in the PHR, so that the user equipment sends uplink information on a corresponding initial beam by using appropriate power not greater than maximum allowed transmit power of the user equipment.

If the base station expects to perform uplink scheduling on the user equipment within a smaller beam range to obtain a better directional gain and more accurate power control, initial beam index information can be dynamically indicated by using a MAC CE, so that the user equipment reports PH of a beam with a smallest path loss thereof.

Optionally, the transmitter 601 is further configured to: before the receiver 602 receives the power headroom report PHR from the user equipment, send, to the user equipment, a first indication carrying first beam index information of a first beam in a beam range of a single initial beam, where the first indication is used to instruct the user equipment to measure RSRP of the first beam.

It should be additionally noted that when the base station does not limit uplink transmit power of the user equipment, the user equipment may support multiple beams in terms of uplink, to improve air interface efficiency. If the user equipment supports multiple beams at the same time and power is limited to an extent, transmit power of at least one beam further needs to be lowered. For details on a specific lowering method, refer to descriptions of the third application scenario in the embodiment shown in FIG. 3, which are not described herein.

A PHR from user equipment is received, where the PHR includes PH, and the PH is generated, after path loss information is obtained by measuring RSRP of each initial beam, according to smallest path loss information; an uplink resource is allocated for the user equipment according to the PH and an initial beam corresponding to the PH; communication with the user equipment is performed on the corresponding uplink resource by using the initial beam corresponding to the PH, so that an uplink resource corresponding to an initial beam with a smallest path loss can be selected for communication with the user equipment, thereby reducing transmit power.

A fourth application scenario uses an example in which the base station is applied to a CSI measurement scenario for description. This application scenario corresponds to the fourth application scenario in the embodiment shown in FIG. 3.

In this embodiment, the user equipment further needs to perform CSI measurement on the initial beam to obtain CSI information, so as to determine quality of the initial beam according to the CSI information. A beam measured by the user equipment may be an initial beam in a range of the RRM measurement report; then, the user equipment first needs to acquire an initial beam corresponding to the RRM measurement report. For details on a specific acquiring method, refer to descriptions of the fourth application scenario in the embodiment shown in FIG. 3, which are not described herein.

Optionally, the receiver 602 is configured to: after the processor 603 determines, according to the RRM measurement report, the initial beam index information that is used for communication with the user equipment, receive a channel state information CSI measurement report from the user equipment, where the CSI measurement report includes the CSI information, and the CSI information is generated, after a channel quality indicator CQI is obtained by performing CSI measurement on each initial beam, according to a highest CQI.

The processor 603 is configured to communicate with the user equipment according to the CSI information received by the receiver 602 and an initial beam corresponding to the CSI information.

If the base station expects to perform uplink scheduling on the user equipment within a smaller beam range to obtain a better directional gain, beam index information can be dynamically indicated by using a MAC CE, so that the user equipment reports CSI information with a highest CQI thereof. Specifically, the transmitter 601 is further configured to: before the receiver 602 receives the channel state information CSI measurement report from the user equipment, send, to the user equipment, a second indication carrying second beam index information of a second beam in a beam range of a single initial beam, where the second indication is used to instruct the user equipment to perform CSI measurement on the second beam.

A CSI measurement report from user equipment is received, where the CSI measurement report includes CSI information, and the CSI information is generated, after a CQI is obtained by performing CSI measurement on each initial beam, according to a highest CQI; communication with the user equipment is performed according to the CSI information and an initial beam corresponding to the CSI information, and an initial beam with the highest CQI can be selected for communication with the user equipment, thereby improving communication efficiency.

A fifth application scenario uses an example in which the base station is applied to a cell bandwidth adjustment scenario for description. This application scenario corresponds to the fifth application scenario in the embodiment shown in FIG. 3.

In this embodiment, when a traffic volume of each user equipment that accesses a cell changes and consequently, load of the cell changes, the base station needs to adjust cell bandwidth of the cell. For details on a specific adjustment method, refer to descriptions of the fifth application scenario in the embodiment shown in FIG. 3, which are not described herein.

Optionally, the processor 603 is further configured to: after determining, according to the RRM measurement report, the initial beam index information that is used for communication with the user equipment, adjust cell bandwidth according to a traffic volume of at least one user equipment, where the cell bandwidth has a positive correlation with the traffic volume.

The transmitter 601 is further configured to broadcast information about cell bandwidth adjusted by the processor 603 and information about a center frequency to each user equipment, or send information about adjusted cell bandwidth and information about a center frequency to each user equipment by using RRC signaling, where the center frequency is a center frequency in a frequency range corresponding to the adjusted cell bandwidth or is a specified frequency in the frequency range.

An adjusted cell may use multiple channels, so that the multiple channels share a same HARQ entity. In this case, the entire cell may include multiple same-bandwidth channels, and the base station may send common information on a channel located at the center frequency, or the base station may send the common information on a central frequency of each channel. That is, if the adjusted cell includes same-bandwidth channels, the transmitter 601 is further configured to send the common information to each user equipment on the channel located at the center frequency, or send the common information to each user equipment on the central frequency of each channel.

Cell bandwidth is adjusted according to a traffic volume of at least one user equipment, where the cell bandwidth has a positive correlation with the traffic volume; information about adjusted cell bandwidth and information about a center frequency are broadcast to each user equipment, or information about adjusted cell bandwidth and information about a center frequency are broadcast to each user equipment by using RRC signaling, so that only the cell bandwidth can be adjusted and it is not required to configure another radio resource configuration parameter, thereby reducing communication overheads during a cell bandwidth configuration process.

A sixth application scenario uses an example in which the base station is applied to a user bandwidth adjustment scenario for description. This application scenario corresponds to the sixth application scenario in the embodiment shown in FIG. 3.

Sometimes, an overall load status of a cell does not change significantly but traffic volumes of some user equipments change greatly, and consequently, a requirement of these user equipments for cell bandwidth changes. In this case, only cell bandwidth of these user equipments needs to be adjusted. From a perspective of user equipment, user bandwidth of the user equipment may be adaptively reduced or increased. From a perspective of the base station, however, the base station still sends information by using originally used cell bandwidth but frequency ranges used by different user equipments may be different.

Optionally, the processor 603 is further configured to: after determining, according to the RRM measurement report, the initial beam index information that is used for communication with the user equipment, adjust user bandwidth of the user equipment according to a traffic volume of the user equipment, where the user bandwidth has a positive correlation with the traffic volume.

The transmitter 601 is further configured to send, by using at least one of RRC signaling, a MAC CE, or a control channel, information about user bandwidth adjusted by the processor 603 to the user equipment.

The user bandwidth includes channels. Therefore, when adjusting the user bandwidth, the base station may adjust the user bandwidth according to the traffic volume by using a channel allocated for the user equipment. Specifically, the processor 603 is specifically configured to adjust, according to the traffic volume of the user equipment, at least one channel allocated for the user equipment, to obtain the user bandwidth.

Specifically, for details, refer to descriptions of the sixth application scenario in the embodiment shown in FIG. 3, which are not described herein.

User bandwidth of user equipment is adjusted according to a traffic volume of the user equipment, where the user bandwidth has a positive correlation with the traffic volume; information about adjusted user bandwidth is sent to the user equipment according to at least one of RRC signaling, a MAC CE, or a control channel, so that the user bandwidth can be adjusted in real time according to the traffic volume of the user equipment, thereby ensuring normal working of the user equipment.

A seventh application scenario uses an example in which the base station is applied to an SPS scenario for description. This application scenario corresponds to the seventh application scenario in the embodiment shown in FIG. 3.

The transmitter 601 is configured to send SPS resource information to the user equipment, where the SPS resource information is used to indicate resource information and beam index information that are allocated by the base station for the user equipment.

When the SPS resource information includes beam index information, the user equipment may determine a beam according to the beam index information. When the SPS resource information does not include the beam index information, the user equipment may determine the beam according to beam index information carried in the RRM measurement report. The beam may be a sending beam, or may be a receiving beam. The base station may indicate the beam index information when configuring the user equipment by using RRC signaling or when using a control channel to activate an SPS resource.

The processor 603 is configured to communicate with the user equipment according to a beam corresponding to beam index information that is indicated by SPS information.

When the SPS resource information indicates at least two pieces of beam index information, the base station and the user equipment may agree to use a beam of relatively good quality or to use a preset beam according to a measurement result. In this case, the user equipment may send/receive information on the beam of relatively good quality, and correspondingly, the base station receives/sends information on the beam. Alternatively, the user equipment sends/receives information on at least one preset beam at the same time, and correspondingly, the base station receives/sends information on the at least one beam.

The user equipment selects a beam with a relatively good signal status when sending/receiving information in an SPS manner, or sends and/or receives information on one or more predetermined beams at the same time. Correspondingly, the base station may receive/send information on the one or more predetermined beams in the SPS manner. The base station and the user equipment may preferentially select one or more beams with a good signal status from multiple predetermined beam ranges according to the measurement result.

It should be additionally noted that when the base station re-indicates the beam index information according to the measurement result or according to beam index information recommended by the user equipment, only the beam index information in the SPS resource information needs to be modified and it is not required to modify the resource information. In this case, the base station may re-indicate the beam index information to the user equipment by using the RRC signaling, the MAC CE, or the control channel.

SPS resource information is sent to user equipment, where the SPS resource information is used to indicate resource information and beam index information that are allocated by the base station for the user equipment; communication with the user equipment is performed according to a beam corresponding to the beam index information that is indicated by SPS information, so that a resource and a beam can be configured for the user equipment in a manner of sending the SPS resource information, and a problem of wasting communication overheads that is caused by dynamically configuring a resource and a beam for the user equipment can be resolved, thereby achieving an effect of reducing communication overheads.

An eighth application scenario uses an example in which the base station is applied to a D2D scenario for description. This application scenario corresponds to the eighth application scenario in the embodiment shown in FIG. 3.

To avoid mutual interference of D2D communication or D2D communication interference to normal communication of another user equipment in a cell, the base station allocates initial beam index information of a beam for D2D communication for the user equipment.

The transmitter 601 is configured to send, to the user equipment, resource indication information used during D2D communication, where the resource indication information includes D2D resource information and the initial beam index information, and is used to instruct the user equipment and the another user equipment to use a resource and an initial beam used during D2D communication.

The initial beam index information allocated by the base station may be set by the base station, or may be initial beam index information that the user equipment requests the base station to allocate after determining beam index information of a beam of relatively good quality according to a measurement result. The initial beam index information allocated by the base station is used for D2D communication between the user equipment and the another user equipment. The D2D resource information includes time-domain resource information and frequency-domain resource information.

It should be additionally noted that cellular communication used between the base station and the user equipment and D2D communication used between the user equipment and the another user equipment may reuse a time-domain resource and a frequency-domain resource on different initial beams.

Resource indication information sent by a base station is received, where the resource indication information includes D2D resource information and beam index information; a resource and a beam used when D2D communication with another user equipment is used is determined according to the resource indication information, so that communication with the another user equipment can be performed according to an initial beam allocated by the base station, thereby resolving a problem of mutual interference in D2D communication, and obtaining an effect of improving communication quality.

In conclusion, according to the base station provided in this embodiment of the present invention, initial beam index information of an initial beam, allocated for user equipment, of a millimeter wave band is sent to the UE; an RRM measurement report from the user equipment is received, where the RRM measurement report is obtained after the user equipment performs RRM measurement on the initial beam indicated by the initial beam index information; the initial beam index information that is used for communication with the user equipment is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 7:
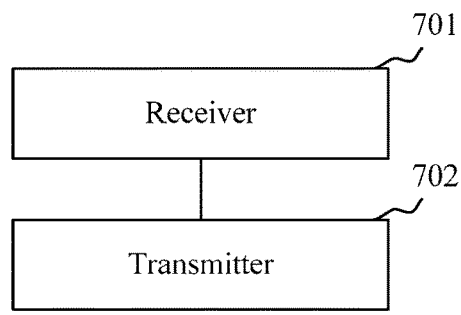
FIG. 7 is a structural block diagram of user equipment according to another embodiment of the present invention.

Referring to FIG. 7, FIG. 7 shows a structural block diagram of user equipment according to an embodiment of the present invention. The user equipment may be the UE shown in FIG. 1, and the UE may include a receiver 701 and a transmitter 702.

The receiver 701 is configured to receive initial beam index information sent by a base station, where the initial beam index information is used to indicate an initial beam, allocated by the base station for the user equipment, of a millimeter wave band.

For details on the initial beam index information, refer to descriptions in the embodiment shown in FIG. 2, which are not described herein.

The transmitter 702 is configured to send an RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In order to select an initial beam of relatively good signal quality, for communication, from the initial beam allocated by the base station to improve communication quality, the user equipment may further perform RRM measurement on the determined initial beam allocated by the base station, and generate an RRM measurement report according to a measurement result.

The user equipment may send the RRM measurement report to an LTE eNB, where the LTE eNB forwards the RRM measurement report to a millimeter wave eNB; or may send the RRM measurement report to a millimeter wave eNB. This embodiment imposes no limitation on a manner of sending the RRM measurement report by the user equipment. For a method for sending an RRM measurement report by user equipment in the following embodiments of the present invention, refer to descriptions in this embodiment, which are not described in the following.

The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

In conclusion, according to the user equipment provided in this embodiment of the present invention, initial beam index information sent by a base station is received, where the initial beam index information is used to indicate an initial beam, allocated by the base station for the user equipment, of a millimeter wave band; a radio resource management RRM measurement report is sent, where the RRM measurement report is obtained after the user equipment performs RRM measurement on the initial beam indicated by the initial beam index information, and the RRM measurement report is used to instruct the base station to determine the initial beam index information that is used for communication with the user equipment. Signal quality of the initial beam can be reported to the base station according to the RRM measurement report so that the base station selects a beam of relatively good signal quality to communicate with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 8:
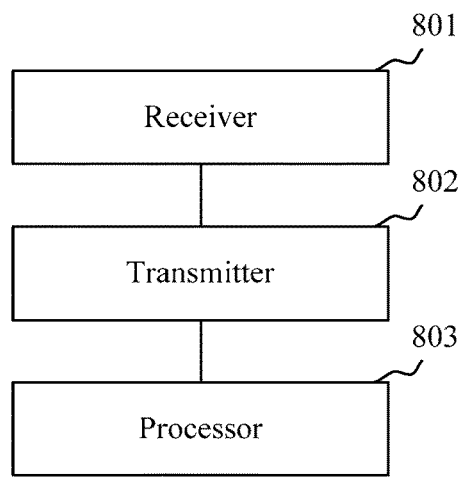
FIG. 8 is a structural block diagram of user equipment according to another embodiment of the present invention.

Referring to FIG. 8, FIG. 8 shows a structural block diagram of user equipment according to an embodiment of the present invention. The user equipment may be the UE shown in FIG. 1, and the UE may include a receiver 801 and a transmitter 802.

The receiver 801 is configured to receive initial beam index information sent by a base station, where the initial beam index information is used to indicate an initial beam, allocated by the base station for the user equipment, of a millimeter wave band.

For details on the initial beam index information, refer to descriptions in the embodiment shown in FIG. 2, which are not described herein.

The transmitter 802 is configured to send an RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In order to select an initial beam of relatively good signal quality, for communication, from the initial beam allocated by the base station to improve communication quality, the user equipment may further perform RRM measurement on the determined initial beam allocated by the base station, and generate an RRM measurement report according to a measurement result. The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

For a method for sending an RRM measurement report by user equipment, refer to descriptions in the embodiment shown in FIG. 2, which are not described in the following.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

The following uses different application scenarios as examples to describe a beam configuration method, and details are as follows:

A first application scenario uses an example in which the user equipment is applied to a discontinuous receiving scenario for description. This application scenario corresponds to the first application scenario in the embodiment shown in FIG. 5.

There are a dormant state and an active state for the user equipment, and user equipment in the active state needs to listen to a control channel by using a beam allocated by the base station, so as to receive, on the control channel, control information that is sent by the base station by using a beamforming technology. The control information includes a resource allocation control instruction, where the resource allocation control instruction is used to indicate an uplink/downlink resource allocated by the base station for the user equipment. When the user equipment switches from the dormant state to the active state, a beam on which resource allocation control signaling is previously received when the user equipment is in the active state no longer applies. Therefore, the user equipment further needs to determine a beam of a control channel that needs to be listened to this time. This embodiment provides two methods for determining a beam of a control channel that needs to be listened to. The following separately describes the two methods in detail.

In a first method, if the RRM measurement report includes reference signal information corresponding to each piece of initial beam index information and the reference signal information includes at least one of RSRP or RSRQ, the user equipment further includes a processor 803, further configured to: after the transmitter 802 sends the RRM measurement report, determine first initial beam index information of which the reference signal information is greater than a first threshold after the user equipment switches from a dormant state to an active state.

The receiver 801 is further configured to listen to control information on a control channel by using an initial beam corresponding to the first initial beam index information determined by the processor 803.

In the first method for determining the beam, the base station and the user equipment may agree to use an initial beam of relatively good signal quality in the RRM measurement report. For details on a specific process, refer to descriptions of the first application scenario in the embodiment shown in FIG. 3, which are not described herein.

If the user equipment switches from the dormant state to the active state, the user equipment can determine at least one initial beam according to the foregoing method from the RRM measurement report, and listen to the control information on the control channel by using the determined at least one initial beam.

In a second method, the receiver 801 is further configured to: receive second initial beam index information that is specified from each piece of initial beam index information in the RRM measurement report by the base station by using at least one of radio resource control RRC signaling or a Media Access Control control element MAC CE; and listen to control information on a control channel by using an initial beam corresponding to the second initial beam index information.

In the second method for determining the beam, the base station may specify, from the allocated initial beam, an initial beam that is used to send the resource allocation control signaling on the control channel, and then send the second initial beam index information of the specified initial beam to the user equipment by using the RRC signaling or the MAC CE.

It should be additionally noted that beam index information may also be jointly determined by using the foregoing first method and second method. For details, refer to descriptions of the first application scenario in the embodiment shown in FIG. 3, which are not described herein.

After determining a beam of the control channel, the user equipment may further listen to the control channel in at least one of the following manners. The receiver 801 is specifically configured to receive the control information in an omnidirectional manner, or receive the control information by using a beam range greater than or equal to a beam range of the initial beam corresponding to the first initial beam index information, or receive the control information by using a beam range less than a beam range of the initial beam corresponding to the first initial beam index information. Alternatively, the receiver 801 is specifically configured to receive the control information in an omnidirectional manner, or receive the control information by using a beam range greater than or equal to a beam range of the initial beam corresponding to the second initial beam index information, or receive the control information by using a beam range less than a beam range of the initial beam corresponding to the second initial beam index information.

In this embodiment, for details on a process of listening to the control information by the user equipment, refer to descriptions of the first application scenario in the embodiment shown in FIG. 3, which are not described herein.

If an RRM measurement report includes reference signal information corresponding to each piece of initial beam index information and the reference signal information includes at least one of reference signal received power RSRP or reference signal received quality RSRQ, after user equipment switches from a dormant state to an active state, the user equipment determines first initial beam index information of which the reference signal information is greater than a first threshold, and listen to control information on a control channel by using an initial beam corresponding to the first initial beam index information, so that the control information can be received by using an initial beam of relatively good signal quality in the RRM measurement report, thereby improving communication efficiency.

A second application scenario uses an example in which the user equipment is applied to a TA scenario for description. This application scenario corresponds to the second application scenario in the embodiment shown in FIG. 5.

A barrier between the user equipment and the base station lowers communication quality of a beam. Therefore, the base station may preconfigure an alternative beam for the user equipment, so as to improve communication quality by avoiding the barrier. Therefore, optionally, the receiver 801 is further configured to receive alternative beam index information sent by the base station, where the alternative beam index information is used to indicate an alternative beam, allocated by the base station for the user equipment, of a millimeter wave band.

The user equipment further includes a processor 803, further configured to: when reference signal information of the initial beam is less than a second threshold, perform RRM measurement on an alternative beam indicated by each piece of alternative beam index information received by the receiver 801, where the reference signal information includes at least one of RSRP or RSRQ; and determine, according to the RRM measurement, first alternative beam index information of which reference signal information is greater than a third threshold.

The transmitter 802 is further configured to send the first alternative beam index information determined by the processor 803 to the base station, where the base station is configured to communicate with the user equipment according to an alternative beam corresponding to the first alternative beam index information.

For details on a process of configuring an alternative beam for the user equipment by the base station, refer to descriptions of the second application scenario in the embodiment shown in FIG. 3, which are not described herein.

In this embodiment, different user equipments have different distances with the base station. Therefore, signal transmission delays of different user equipments are different. If uplink information sent by different user equipments needs to arrive at the base station at the same time, the base station needs to configure different TA for different user equipments according to distances between the user equipments and the base station. Generally, compared with the initial beam allocated by the base station, the alternative beam has a relatively long propagation path, leading to a relatively large propagation delay. In this case, consequently, the uplink TA changes suddenly. In this case, the user equipment needs to redetermine the uplink TA. Determining the uplink TA needs to be implemented by using a random access procedure.

In this embodiment, the transmitter 802 is further configured to: automatically send a first random access request to the base station, where the first random access request is used to instruct the base station to generate uplink TA and to communicate with the user equipment according to the uplink TA and an alternative beam corresponding to allocated second alternative beam index information; or receive, on a control channel, a random access instruction sent by the base station, where the random access instruction is sent after the base station determines, by using beam tracking, to use the alternative beam allocated for the user equipment to communicate with the user equipment; and send a second random access request to the base station according to the random access instruction, where the second random access request is used to instruct the base station to generate uplink TA and to communicate with the user equipment according to the uplink TA and the alternative beam corresponding to the received first alternative beam index information.

When the user equipment actively triggers the random access procedure, the user equipment actively sends the first random access request to the base station. When the user equipment triggers the random access procedure as instructed by a random access instruction, the user equipment sends a second random access request to the base station. For details on a specific process, refer to descriptions of the second application scenario in the embodiment shown in FIG. 3, which are not described herein.

Accordingly, when the user equipment detects that reference signal information of each alternative beam is less than the third threshold and that reference signal information of at least one initial beam is greater than the second threshold, it is determined that quality of the initial beam is relatively good, and initial beam index information of the at least one initial beam is sent to the base station. The base station uses the at least one initial beam to communicate with the base station. Alternatively, the base station uses a beamforming technology to determine that the user equipment is about to leave the barrier area; and when detecting that the reference signal information of the at least one initial beam is greater than the second threshold, determines to use the at least one initial beam to communicate with the base station. In this case, the user equipment may redetermine the uplink TA, or may not determine the uplink TA.

In this embodiment, there may be different TA for beams used by the user equipment, and the TA may be for a same millimeter wave base station or may be for different millimeter wave base stations. Therefore, the base station may further configure at least one TA set for each user equipment, where each TA set includes at least one piece of beam index information, and uplink TA corresponding to each piece of beam index information is the same. The beam index information may be the initial beam index information of the initial beam, or may be the alternative beam index information of the alternative beam. Beams indicated by beam index information in one TA set may belong to a same cell, or may belong to different cells. Therefore, a cell identifier of a cell associated with each beam may further be identified in the TA set.

The receiver 801 is further configured to receive a TA set sent by the base station, where the TA set is generated, after the base station determines beams that have same uplink TA and are in beams for communication with the user equipment as a group, according to each group, the TA set includes a TA set identifier, beam index information of each beam in the group, and a cell identifier and a time alignment timer TAT that correspond to each beam in the group, and the beam includes at least one of the initial beam or the alternative beam.

The user equipment further includes a processor 803, configured to: when the TAT in the TA set received by the receiver 801 has expired, detect whether the cell identifier in the TA set corresponds to beam index information in another TA set and whether a TAT in the another TA set has not expired; and when it is detected that the cell identifier in the TA set corresponds to the beam index information in the another TA set and the TAT in the another TA set has not expired, determine a cell corresponding to the beam index information, and maintain a hybrid automatic repeat request HARQ buffer area and a sounding reference symbol SRS resource that correspond to the cell; or when it is detected that the cell identifier in the TA set corresponds to the beam index information in the another TA set and the TAT in the another TA set has expired, determine a cell corresponding to the beam index information, and release a HARQ buffer area and an SRS resource that correspond to the cell.

Alternative beam index information sent by a base station is received, where the alternative beam index information is used to indicate an alternative beam, allocated by the base station for user equipment, of a millimeter wave band; if reference signal information of an initial beam is less than a second threshold, RRM measurement is performed on an alternative beam indicated by each piece of alternative beam index information; first alternative beam index information of which reference signal information is greater than a third threshold is determined according to the RRM measurement; the determined first alternative beam index information is sent to the base station. An alternative beam of relatively good quality can be used for communication with the base station when quality of an allocated initial beam is relatively poor, achieving an effect of improving communication efficiency.

A third application scenario uses an example in which the user equipment is applied to a power control scenario for description. This application scenario corresponds to the third application scenario in the embodiment shown in FIG. 5.

The base station uses the beamforming technology, and path losses at different beam directions may be different. Therefore, an initial beam with a smallest path loss needs to be selected from the allocated initial beam, and communication is performed on the selected initial beam.

Optionally, the user equipment further includes a processor 803, configured to: after the transmitter 802 sends an RRM measurement report, measure RSRP of an initial beam corresponding to each piece of initial beam index information, to obtain path loss information of each initial beam; and generate power headroom PH according to smallest path loss information, to obtain a power headroom report PHR.

The transmitter 802 is further configured to send the PHR generated by the processor 803, where the PHR is used to instruct the base station to allocate an uplink resource for the user equipment according to the PH and an initial beam corresponding to the PH and to communicate with the user equipment on the corresponding uplink resource by using the initial beam corresponding to the PH.

Beam index information sent by the base station may correspond to a beam outside a beam range corresponding to the RRM measurement report, may correspond to an initial beam in a beam range corresponding to the RRM measurement report, or may be an adaptively determined beam. This is not limited in this embodiment.

If the base station expects to perform uplink scheduling on the user equipment within a smaller beam range to obtain a better directional gain and more accurate power control, initial beam index information can be dynamically indicated by using a MAC CE, so that the user equipment reports PH of a beam with a smallest path loss thereof.

Optionally, the receiver 801 is further configured to receive a first indication that is sent by the base station and carries first beam index information of a first beam in a beam range of a single initial beam.

The processor 803 is further configured to measure RSRP of each first beam that is indicated by the first indication received by the receiver 801, to obtain path loss information of each first beam.

It should be additionally noted that when the base station does not limit uplink transmit power of the user equipment, the user equipment may support multiple beams in terms of uplink, to improve air interface efficiency. If the user equipment supports multiple beams at the same time and power is limited to an extent, transmit power of at least one beam further needs to be lowered. For details on a specific lowering method, refer to descriptions of the third application scenario in the embodiment shown in FIG. 3, which are not described herein.

RSRP of an initial beam corresponding to each piece of initial beam index information is performed, to obtain path loss information of each initial beam; PH is generated according to smallest path loss information, to obtain a PHR; the PHR is sent, where the PHR is used to instruct a base station to allocate an uplink resource for user equipment according to the PH and an initial beam corresponding to the PH; communication with the user equipment is performed on the corresponding uplink resource by using the initial beam corresponding to the PH, so that an uplink resource corresponding to an initial beam with a smallest path loss can be selected for communication with the base station, thereby reducing transmit power.

A fourth application scenario uses an example in which the user equipment is applied to a CSI measurement scenario for description. This application scenario corresponds to the fourth application scenario in the embodiment shown in FIG. 5.

In this embodiment, the user equipment further needs to perform CSI measurement on the initial beam to obtain CSI information, so as to determine quality of the initial beam according to the CSI information.

Optionally, the user equipment further includes a processor 803, configured to: after the transmitter 802 sends an RRM measurement report, perform channel state information CSI measurement on an initial beam corresponding to each piece of initial beam index information, to obtain a channel quality indicator CQI of each initial beam; and generate at least one piece of channel state information CSI information according to a highest CQI, to obtain a CSI measurement report.

The transmitter 802 is further configured to send the CSI measurement report generated by the processor 803, where the CSI measurement report is used to instruct the base station to communicate with the user equipment according to the CSI information and an initial beam corresponding to the CSI information.

A beam measured by the user equipment may be an initial beam in a range of the RRM measurement report; then, the user equipment first needs to acquire an initial beam corresponding to the RRM measurement report. For details on a specific acquiring method, refer to descriptions of the fourth application scenario in the embodiment shown in FIG. 3, which are not described herein.

After measuring the CSI information of each initial beam, the user equipment may sort out, from each piece of CSI information, CSI information that includes a highest CQI, and generate the CSI measurement report according to at least one CSI information that is sorted out. The CSI information includes at least one of a CQI, a PMI, or an RI, and the user equipment may send at least one of the CQI, the PMI, or the RI to the base station at the same time or at different moments.

If the base station expects to perform uplink scheduling on the user equipment within a smaller beam range to obtain a better directional gain, beam index information can be dynamically indicated by using a MAC CE, so that the user equipment reports CSI information with a highest CQI thereof.

Optionally, the receiver 801 is further configured to receive a second indication that is sent by the base station and carries second beam index information of a second beam in a beam range of a single initial beam.

The processor 803 is further configured to perform CSI measurement on each second beam that is indicated by the second indication received by the receiver 801, to obtain a CQI of each second beam.

Channel state information CSI measurement is performed on an initial beam corresponding to each piece of initial beam index information, to obtain a CQI of each initial beam; CSI information is generated according to a highest CQI, to obtain a CSI measurement report; the CSI measurement report is sent, where the CSI measurement report is used to instruct a base station to communicate with user equipment according to the CSI information and an initial beam corresponding to the CSI information, so that an initial beam with the highest CQI can be selected to communicate with the base station, thereby improving communication efficiency.

A fifth application scenario uses an example in which the user equipment is applied to a cell bandwidth adjustment scenario for description. This application scenario corresponds to the fifth application scenario in the embodiment shown in FIG. 5.

In this embodiment, when a traffic volume of each user equipment that accesses a cell changes and consequently, load of the cell changes, the base station needs to adjust cell bandwidth of the cell. For details on a specific adjustment method, refer to descriptions of the fifth application scenario in the embodiment shown in FIG. 3, which are not described herein.

An adjusted cell may use multiple channels, so that the multiple channels share a same HARQ entity. In this case, the entire cell may include multiple same-bandwidth channels, and the base station may send common information on a channel located at the center frequency, or the base station may send the common information on a central frequency of each channel.

Accordingly, the receiver 801 is further configured to: receive, by means of broadcasting, information about adjusted cell bandwidth and information about a center frequency that are sent by the base station, or receive RRC signaling sent by the base station, where the RRC signaling carries information about adjusted cell bandwidth and information about a center frequency, the adjusted cell bandwidth is adjusted by the base station according to a traffic volume of at least one user equipment, the cell bandwidth has a positive correlation with the traffic volume, and the center frequency is a central frequency in a frequency range corresponding to the adjusted cell bandwidth or is a specified frequency in the frequency range; and if the adjusted cell includes same-bandwidth channels, receive, on a channel located at the center frequency, common information sent by the base station, or receive, on a central frequency of each channel, common information sent by the base station.

The user equipment may receive the information about the adjusted cell bandwidth and information about the center frequency in a manner corresponding to a manner in which the base station sends the information about the adjusted cell bandwidth and information about the center frequency. The user equipment receives, according to the information about the center frequency, common information on a channel located at the center frequency, or receives common information on a central frequency of each channel.

Information about adjusted cell bandwidth and information about a center frequency that are sent by a base station are received by means of broadcasting, or RRC signaling sent by a base station is received, where the RRC signaling carries information about adjusted cell bandwidth and information about a center frequency, the adjusted cell bandwidth is adjusted by the base station according to a traffic volume of user equipment, the cell bandwidth has a positive correlation with the traffic volume, and the center frequency is a central frequency in a frequency range corresponding to the adjusted cell bandwidth or is a specified frequency in the frequency range, so that only the cell bandwidth can be adjusted and it is not required to configure another radio resource configuration parameter, thereby reducing communication overheads during a cell bandwidth configuration process.

A sixth application scenario uses an example in which the user equipment is applied to a user bandwidth adjustment scenario for description. This application scenario corresponds to the sixth application scenario in the embodiment shown in FIG. 5.

Sometimes, an overall load status of a cell does not change significantly but traffic volumes of some user equipments change greatly, and consequently, a requirement of these user equipments for cell bandwidth changes. In this case, only cell bandwidth of these user equipments needs to be adjusted. From a perspective of user equipment, user bandwidth of the user equipment may be adaptively reduced or increased. From a perspective of the base station, however, the base station still sends information by using originally used cell bandwidth but frequency ranges used by different user equipments may be different.

The user bandwidth includes channels. Therefore, when adjusting the user bandwidth, the base station may adjust the user bandwidth according to the traffic volume by using a channel allocated for the user equipment.

Accordingly, the receiver 801 is further configured to: receive information, sent by the base station, about adjusted user bandwidth by using at least one of RRC signaling, a MAC CE, or a control channel, where the adjusted user bandwidth is adjusted by the base station according to a traffic volume of the user equipment, and the user bandwidth has a positive correlation with the traffic volume; and listen to a control channel of channels that are included by the user bandwidth.

The user equipment may receive the information about the adjusted user bandwidth in a manner corresponding to a manner in which the base station sends the information about the adjusted cell bandwidth, and listen to the channels that are included by the user bandwidth. Bandwidth remaining after the user bandwidth is adjusted may be continuous or discontinuous in a frequency domain.

Specifically, for details, refer to descriptions of the sixth application scenario in the embodiment shown in FIG. 3, which are not described herein.

Information, sent by a base station, about adjusted user bandwidth is received by using at least one of RRC signaling, a MAC CE, or a control channel, where the adjusted user bandwidth is adjusted by the base station according to a traffic volume of user equipment, and the user bandwidth has a positive correlation with the traffic volume, so that the user bandwidth can be adjusted in real time according to the traffic volume of the user equipment, thereby ensuring normal working of the user equipment.

A seventh application scenario uses an example in which the user equipment is applied to an SPS scenario for description. This application scenario corresponds to the seventh application scenario in the embodiment shown in FIG. 5.

The receiver 801 is configured to receive SPS resource information sent by the base station.

When the SPS resource information includes beam index information, the user equipment may determine a beam according to the beam index information. When the SPS resource information does not include the beam index information, the user equipment may determine the beam according to beam index information carried in the RRM measurement report. The beam may be a sending beam, or may be a receiving beam. The base station may indicate the beam index information when configuring the user equipment by using RRC signaling or when using a control channel to activate an SPS resource.

The user equipment further includes a processor 803, configured to determine, according to the SPS resource information, resource information and beam index information that are allocated by the base station for the user equipment.

When the SPS resource information indicates at least two pieces of beam index information, the base station and the user equipment may agree to use a beam of relatively good quality or to use a preset beam according to a measurement result. In this case, the user equipment may send/receive information on the beam of relatively good quality, and correspondingly, the base station receives/sends information on the beam. Alternatively, the user equipment sends/receives information on at least one preset beam at the same time, and correspondingly, the base station receives/sends information on the at least one beam.

The user equipment selects a beam with a relatively good signal status when sending/receiving information in an SPS manner, or sends and/or receives information on one or more predetermined beams at the same time. Correspondingly, the base station may receive/send information on the one or more predetermined beams in the SPS manner. The base station and the user equipment may preferentially select one or more beams with a good signal status from multiple predetermined beam ranges according to the measurement result.

It should be additionally noted that when the base station re-indicates the beam index information according to the measurement result or according to beam index information recommended by the user equipment, only the beam index information in the SPS resource information needs to be modified and it is not required to modify the resource information. In this case, the base station may re-indicate the beam index information to the user equipment by using the RRC signaling, the MAC CE, or the control channel.

SPS resource information sent by a base station is received, and resource information and beam index information that are allocated by the base station for user equipment is determined according to the SPS resource information, so that a resource and a beam can be configured in a manner of sending the SPS resource information, and a problem of wasting communication overheads that is caused by dynamically configuring a resource and a beam for the user equipment can be resolved, thereby achieving an effect of reducing communication overheads.

An eighth application scenario uses an example in which the user equipment is applied to a D2D scenario for description. This application scenario corresponds to the eighth application scenario in the embodiment shown in FIG. 5.

To avoid mutual interference of D2D communication or D2D communication interference to normal communication of another user equipment in a cell, the base station allocates initial beam index information of a beam for D2D communication for the user equipment.

The receiver 801 receives resource indication information sent by the base station, where the resource indication information includes D2D resource information and the initial beam index information.

The user equipment further includes a processor 803, configured to determine, according to the resource indication information received by the receiver 801, a resource and an initial beam used when D2D communication with another user equipment is used.

Beam index information allocated by the base station may be set by the base station, or may be initial beam index information that the user equipment requests the base station to allocate after determining beam index information of a beam of relatively good quality according to a measurement result. The beam index information allocated by the base station is used for D2D communication between the user equipment and the another user equipment. The D2D resource information includes time-domain resource information and frequency-domain resource information.

It should be additionally noted that cellular communication used between the base station and the user equipment and D2D communication used between the user equipment and the another user equipment may reuse a time-domain resource and a frequency-domain resource on different initial beams.

Resource indication information sent by a base station is received, where the resource indication information includes D2D resource information and beam index information; a resource and a beam used when D2D communication with another user equipment is used is determined according to the resource indication information, so that communication with the another user equipment can be performed according to an initial beam allocated by the base station, thereby resolving a problem of mutual interference in D2D communication, and achieving an effect of improving communication quality.

In conclusion, according to the user equipment provided in this embodiment of the present invention, initial beam index information sent by a base station is received, where the initial beam index information is used to indicate an initial beam, allocated by the base station for the user equipment, of a millimeter wave band; a radio resource management RRM measurement report is sent, where the RRM measurement report is obtained after the user equipment performs RRM measurement on the initial beam indicated by the initial beam index information, and the RRM measurement report is used to instruct the base station to determine the initial beam index information that is used for communication with the user equipment. Signal quality of the initial beam can be reported to the base station according to the RRM measurement report so that the base station selects a beam of relatively good signal quality to communicate with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 9:
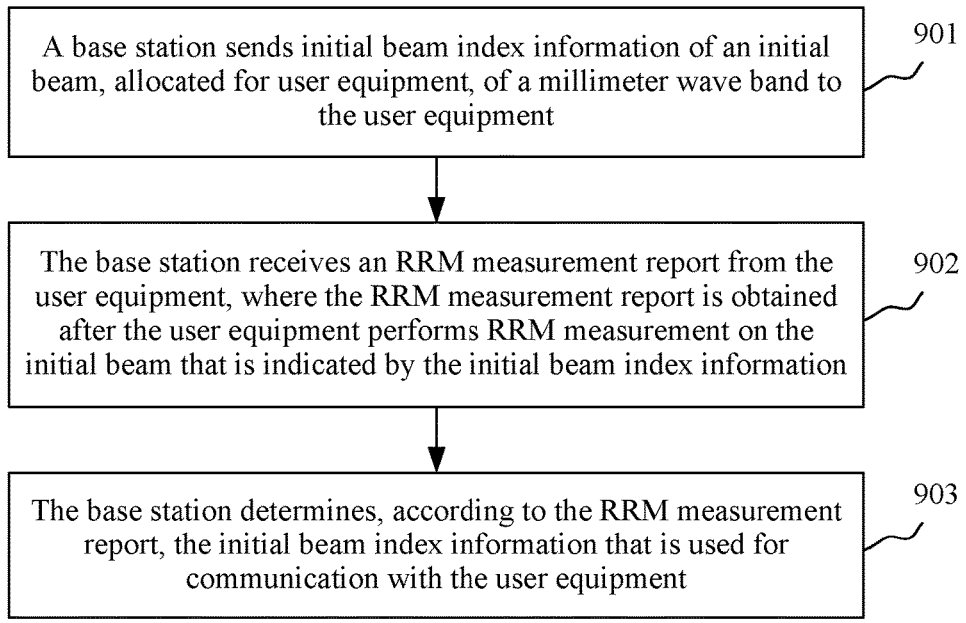
FIG. 9 is a method flowchart of a beam configuration method according to another embodiment of the present invention.

Referring to FIG. 9, FIG. 9 shows a method flowchart of a beam configuration method according to an embodiment of the present invention. The beam configuration method may include the following steps.

Step 901: A base station sends initial beam index information of an initial beam, allocated for user equipment, of a millimeter wave band to the user equipment.

The initial beam index information is used to indicate an initial beam used when the base station sends downlink information to the user equipment, and is preconfigured by the base station for the user equipment. The initial beam index information is associated with an antenna weight value or codebook information used when the base station sends downlink information, to determine information such as a direction and a width of the initial beam. The direction of the initial beam refers to angle information of the initial beam with respect to a horizontal direction and/or a vertical direction. The initial beam index information is further associated with characteristic information of the initial beam, and the base station sends particular characteristic information of the initial beam on different initial beams, so that the user equipment identifies different initial beams according to different characteristic information. For details, refer to descriptions in the embodiment shown in FIG. 2, which are not described herein.

Step 902: The base station receives an RRM measurement report from the user equipment, where the RRM measurement report is obtained after the user equipment performs RRM measurement on the initial beam that is indicated by the initial beam index information.

Step 903: The base station determines, according to the RRM measurement report, the initial beam index information that is used for communication with the user equipment.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

In conclusion, according to the beam configuration method provided in this embodiment of the present invention, initial beam index information of an initial beam, allocated for user equipment, of a millimeter wave band is sent to UE; an RRM measurement report from the user equipment is received, where the RRM measurement report is obtained after the user equipment performs RRM measurement on the initial beam indicated by the initial beam index information; the initial beam index information that is used for communication with the user equipment is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Another embodiment of the present invention provides a beam configuration method, where the beam configuration method may include the following steps.

Step 901: A base station sends initial beam index information of an initial beam, allocated for user equipment, of a millimeter wave band to the user equipment.

The initial beam index information is used to indicate a beam used when the base station sends downlink information to the user equipment, and is preconfigured by the base station for the user equipment. The initial beam index information is associated with an antenna weight value or codebook information used when the base station sends downlink information, to determine information such as a direction and a width of the initial beam. The direction of the initial beam refers to angle information of the initial beam with respect to a horizontal direction and/or a vertical direction. For example, a beam direction of an initial beam is a direction of 30° to −60° with respect to a horizontal direction, a direction of 20° to −40° with respect to a vertical direction, or the like. The initial beam index information is further associated with characteristic information of the initial beam, and the base station sends particular characteristic information of the initial beam on different initial beams, so that the user equipment identifies different initial beams according to different characteristic information. For details, refer to descriptions in the embodiment shown in FIG. 2, which are not described herein.

In this embodiment, the base station may configure at least one initial beam for the user equipment, and send initial beam index information of each initial beam in the at least one initial beam to the user equipment, so that the user equipment determines an initial beam on which the downlink information sent by the base station is to be received.

Step 902: The base station receives an RRM measurement report from the user equipment, where the RRM measurement report is obtained after the user equipment performs RRM measurement on the initial beam that is indicated by the initial beam index information.

Step 903: The base station determines, according to the RRM measurement report, the initial beam index information that is used for communication with the user equipment.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

The following uses different application scenarios as examples to describe a beam configuration method, and details are as follows:

A first application scenario uses an example in which the base station is applied to a discontinuous receiving scenario for description. This application scenario corresponds to the first application scenario in the embodiment shown in FIG. 3.

There are a dormant state and an active state for the user equipment, and user equipment in the active state needs to listen to a control channel by using a beam allocated by the base station, so as to receive, on the control channel, control information that is sent by the base station by using a beamforming technology. The control information includes a resource allocation control instruction, where the resource allocation control instruction is used to indicate an uplink/downlink resource allocated by the base station for the user equipment. When the user equipment switches from the dormant state to the active state, a beam on which resource allocation control signaling is previously received when the user equipment is in the active state no longer applies. Therefore, the user equipment further needs to determine a beam of a control channel that needs to be listened to at this time. This embodiment provides two methods for determining a beam of a control channel that needs to be listened to. The following separately describes the two methods in detail.

In a first method, the determining, by the base station according to the RRM measurement report, the initial beam index information that is used for communication with the user equipment includes:

determining, by the base station from reference signal information corresponding to each piece of initial beam index information in the RRM measurement report, first initial beam index information of which the reference signal information is greater than a first threshold, and the reference signal information includes at least one of RSRP or RSRQ; where the base station sends control information to the user equipment on a control channel by using an initial beam corresponding to the determined first initial beam index information, and the user equipment is configured to: after switching from a dormant state to an active state, listen to the control information by using the initial beam corresponding to the determined first initial beam index information.

In the first method for determining the beam, the base station and the user equipment may agree to use an initial beam of relatively good signal quality in the RRM measurement report. For details on a specific process, refer to descriptions of the first application scenario in the embodiment shown in FIG. 3, which are not described herein.

In a second method, the base station specifies second initial beam index information from each piece of initial beam index information in the RRM measurement report by using at least one of radio resource control RRC signaling or a Media Access Control control element MAC CE, where an initial beam corresponding to the specified second initial beam index information is used to send the control information to the user equipment on a control channel.

In the second method for determining the beam, the base station may specify, from the allocated initial beam, an initial beam that is used to send the resource allocation control signaling on the control channel, and then send the second initial beam index information of the specified initial beam to the user equipment by using the RRC signaling or the MAC CE.

It should be additionally noted that beam index information may also be jointly determined by using the foregoing first method and second method. For details, refer to descriptions of the first application scenario in the embodiment shown in FIG. 3, which are not described herein.

First initial beam index information of which reference signal information is greater than a first threshold is determined from reference signal information corresponding to each piece of initial beam index information in an RRM measurement report, control information is sent to user equipment on a control channel by using an initial beam corresponding to the first initial beam index information, so that the control information can be transmitted by using an initial beam of relatively good signal quality in the RRM measurement report, thereby improving communication efficiency.

A second application scenario uses an example in which the base station is applied to a TA scenario for description. This application scenario corresponds to the second application scenario in the embodiment shown in FIG. 3.

A barrier between the user equipment and the base station lowers communication quality of the initial beam. Therefore, the base station may preconfigure an alternative beam for the user equipment, so as to improve communication quality by avoiding the barrier. Therefore, specifically, the beam configuration method provided in this embodiment further includes:

sending, by the base station, alternative beam index information of an alternative beam, allocated for the user equipment, of a millimeter wave band to the user equipment;

receiving, by the base station, first alternative beam index information that is selected from each piece of alternative beam index information and that is sent by the user equipment, where the first alternative beam index information is alternative beam index information of which reference signal information of the initial beam is less than a second threshold and of which reference signal information determined after RRM measurement is performed on an alternative beam indicated by each piece of alternative beam index information is greater than a third threshold, and the reference signal information includes at least one of RSRP or RSRQ; and communicating, by the base station, with the user equipment according to an alternative beam corresponding to the received first alternative beam index information.

For details on a process of configuring an alternative beam for the user equipment by the base station, refer to descriptions of the second application scenario in the embodiment shown in FIG. 3, which are not described herein. The base station communicates with the user equipment according to an alternative beam corresponding to at least one piece of received alternative beam index information.

Further, in addition to that the user equipment actively performs RRM measurement on the initial beam and determines, by using the reference signal information, whether to use an alternative beam for communication, the base station may use a beam tracking technology to detect whether the user equipment is about to enter a barrier area. When the base station detects that the user equipment is about to enter the barrier area, the user equipment is triggered to perform RRM measurement on the alternative beam.

In this embodiment, different user equipments have different distances with the base station. Therefore, signal transmission delays of different user equipments are different. If uplink information sent by different user equipments needs to arrive at the base station at the same time, the base station needs to configure different TA for different user equipments according to distances between the user equipments and the base station. Generally, compared with the initial beam allocated by the base station, the alternative beam has a relatively long propagation path, leading to a relatively large propagation delay. In this case, consequently, the uplink TA changes suddenly. In this case, the user equipment needs to redetermine the uplink TA. Determining the uplink TA needs to be implemented by using a random access procedure.

When the user equipment actively triggers the random access procedure, the user equipment actively sends a first random access request to the base station. In this case, the communicating, by the base station, with the user equipment according to an alternative beam corresponding to the received first alternative beam index information includes:

receiving, by the base station, a first random access request sent by the user equipment, and generating uplink timing advance TA according to the first random access request; and communicating, by the base station, with the user equipment according to the uplink TA and the alternative beam corresponding to the received first alternative beam index information.

When the user equipment triggers the random access procedure as instructed by a random access instruction, the user equipment sends a second random access request to the base station. In this case, the method further includes:

determining, by the base station by using beam tracking, to use the alternative beam allocated for the user equipment to communicate with the user equipment;

sending, by the base station, a random access instruction to the user equipment on a control channel;

receiving, by the base station, a second random access request that is sent by the user equipment according to the random access instruction, and generating uplink TA according to the second random access request; and communicating, by the base station, with the user equipment according to the uplink TA and an alternative beam corresponding to allocated second alternative beam index information.

In this embodiment, there may be different TA for beams used by the user equipment, and the TA may be for a same millimeter wave base station or may be for different millimeter wave base stations. Therefore, the base station may further configure at least one TA set for each user equipment, where each TA set includes at least one piece of beam index information, and uplink TA corresponding to each piece of beam index information is the same. The beam index information may be the initial beam index information of the initial beam, or may be the alternative beam index information of the alternative beam. Beams indicated by beam index information in one TA set may belong to a same cell, or may belong to different cells. Therefore, a cell identifier of a cell associated with each beam may further be identified in the TA set.

Optionally, the method further includes:

determining, by the base station, beams that have same uplink TA and are in beams for communication with the user equipment as a group, where the beam includes at least one of the initial beam or the alternative beam;

generating, by the base station, one TA set according to each group, where the TA set includes a TA set identifier, beam index information of each beam in the group, and a cell identifier and a time alignment timer TAT that correspond to each beam in the group; and sending, by the base station, the generated TA set to the user equipment.

It should be additionally noted that when the uplink TA changes because the user equipment moves, the base station may reconfigure a TA set for the user equipment according to new uplink TA, and allocate beam index information in the TA set and a cell associated with the beam index information. The base station may adjust the uplink TA and the TA set by using a TA cmd.

A third application scenario uses an example in which the base station is applied to a power control scenario for description. This application scenario corresponds to the third application scenario in the embodiment shown in FIG. 3.

The base station uses the beamforming technology, and path losses at different beam directions may be different. Therefore, an initial beam with a smallest path loss needs to be selected from the allocated initial beam, and communication is performed on the selected initial beam.

Optionally, after the determining, by the base station according to the RRM measurement report, the initial beam index information that is used for communication with the user equipment, the method further includes:

receiving, by the base station, a power headroom report PHR from the user equipment, where the PHR includes power headroom PH, and the PH is generated, after a path loss is obtained by measuring RSRP of each initial beam, according to smallest path loss information;

allocating, by the base station, an uplink resource for the user equipment according to the PH and an initial beam corresponding to the PH; and communicating, by the base station, with the user equipment on the corresponding uplink resource by using the initial beam corresponding to the PH.

Beam index information sent by the base station may correspond to a beam outside a beam range corresponding to the RRM measurement report, may correspond to an initial beam in a beam range corresponding to the RRM measurement report, or may be an adaptively determined beam. This is not limited in this embodiment.

After receiving the PHR, the base station allocates the uplink resource for the user equipment according to beam index information and the PH in the PHR, so that the user equipment sends uplink information on a corresponding initial beam by using appropriate power not greater than maximum allowed transmit power of the user equipment.

If the base station expects to perform uplink scheduling on the user equipment within a smaller beam range to obtain a better directional gain and more accurate power control, initial beam index information can be dynamically indicated by using a MAC CE, so that the user equipment reports PH of a beam with a smallest path loss thereof.

Optionally, before the receiving, by the base station, a power headroom report PHR from the user equipment, the method further includes:

sending, by the base station to the user equipment, a first indication carrying first beam index information of a first beam in a beam range of a single initial beam, where the first indication is used to instruct the user equipment to measure RSRP of the first beam.

It should be additionally noted that when the base station does not limit uplink transmit power of the user equipment, the user equipment may support multiple beams in terms of uplink, to improve air interface efficiency. If the user equipment supports multiple beams at the same time and power is limited to an extent, transmit power of at least one beam further needs to be lowered. For details on a specific lowering method, refer to descriptions of the third application scenario in the embodiment shown in FIG. 3, which are not described herein.

A PHR from user equipment is received, where the PHR includes PH, and the PH is generated, after path loss information is obtained by measuring RSRP of each initial beam, according to smallest path loss information; an uplink resource is allocated for the user equipment according to the PH and an initial beam corresponding to the PH; communication with the user equipment is performed on the corresponding uplink resource by using the initial beam corresponding to the PH, so that an uplink resource corresponding to an initial beam with a smallest path loss can be selected for communication with the user equipment, thereby reducing transmit power.

A fourth application scenario uses an example in which the base station is applied to a CSI measurement scenario for description. This application scenario corresponds to the fourth application scenario in the embodiment shown in FIG. 3.

In this embodiment, the user equipment further needs to perform CSI measurement on the initial beam to obtain CSI information, so as to determine quality of the initial beam according to the CSI information. A beam measured by the user equipment may be an initial beam in a range of the RRM measurement report; then, the user equipment first needs to acquire an initial beam corresponding to the RRM measurement report. For details on a specific acquiring method, refer to descriptions of the fourth application scenario in the embodiment shown in FIG. 3, which are not described herein.

Optionally, after the determining, by the base station according to the RRM measurement report, the initial beam index information that is used for communication with the user equipment, the method further includes:

receiving, by the base station, a channel state information CSI measurement report from the user equipment, where the CSI measurement report includes CSI information, and the CSI information is generated, after a channel quality indicator CQI is obtained by performing CSI measurement on each initial beam, according to a highest CQI; and communicating, by the base station, with the user equipment according to the CSI information and an initial beam corresponding to the CSI information.

If the base station expects to perform uplink scheduling on the user equipment within a smaller beam range to obtain a better directional gain, beam index information can be dynamically indicated by using a MAC CE, so that the user equipment reports CSI information with a highest CQI thereof. Specifically, before the receiving, by the base station, a channel state information CSI measurement report from the user equipment, the method further includes:

sending, by the base station to the user equipment, a second indication carrying second beam index information of a second beam in a beam range of a single initial beam, where the second indication is used to instruct the user equipment to perform CSI measurement on the second beam.

A CSI measurement report from user equipment is received, where the CSI measurement report includes CSI information, and the CSI information is generated, after a CQI is obtained by performing CSI measurement on each initial beam, according to a highest CQI; communication with the user equipment is performed according to the CSI information and an initial beam corresponding to the CSI information, and an initial beam with the highest CQI can be selected for communication with the user equipment, thereby improving communication efficiency.

A fifth application scenario uses an example in which the base station is applied to a cell bandwidth adjustment scenario for description. This application scenario corresponds to the fifth application scenario in the embodiment shown in FIG. 3.

In this embodiment, when a traffic volume of each user equipment that accesses a cell changes and consequently, load of the cell changes, the base station needs to adjust cell bandwidth of the cell. For details on a specific adjustment method, refer to descriptions of the fifth application scenario in the embodiment shown in FIG. 3, which are not described herein.

Optionally, after the determining, by the base station according to the RRM measurement report, the initial beam index information that is used for communication with the user equipment, the method further includes:

adjusting, by the base station, cell bandwidth according to a traffic volume of the user equipment, where the cell bandwidth has a positive correlation with the traffic volume; and broadcasting, by the base station, information about adjusted cell bandwidth and information about a center frequency to each user equipment, or sending information about adjusted cell bandwidth and information about a center frequency to each user equipment by using RRC signaling, where the center frequency is a center frequency in a frequency range corresponding to the adjusted cell bandwidth or is a specified frequency in the frequency range.

An adjusted cell may use multiple channels, so that the multiple channels share a same HARQ entity. In this case, the entire cell may include multiple same-bandwidth channels, and the base station may send common information on a channel located at the center frequency, or the base station may send the common information on a central frequency of each channel. That is, if the adjusted cell includes same-bandwidth channels, the method further includes:

sending, by the base station, common information to each user equipment on a channel located at the center frequency, or sending common information to each user equipment on a central frequency of each channel.

Cell bandwidth is adjusted according to a traffic volume of at least one user equipment, where the cell bandwidth has a positive correlation with the traffic volume; information about adjusted cell bandwidth and information about a center frequency are broadcast to each user equipment, or information about adjusted cell bandwidth and information about a center frequency are broadcast to each user equipment by using RRC signaling, so that only the cell bandwidth can be adjusted and it is not required to configure another radio resource configuration parameter, thereby reducing communication overheads during a cell bandwidth configuration process.

A sixth application scenario uses an example in which the base station is applied to a user bandwidth adjustment scenario for description. This application scenario corresponds to the sixth application scenario in the embodiment shown in FIG. 3.

Sometimes, an overall load status of a cell does not change significantly but traffic volumes of some user equipments change greatly, and consequently, a requirement of these user equipments for cell bandwidth changes. In this case, only cell bandwidth of these user equipments needs to be adjusted. From a perspective of user equipment, user bandwidth of the user equipment may be adaptively reduced or increased. From a perspective of the base station, however, the base station still sends information by using originally used cell bandwidth but frequency ranges used by different user equipments may be different.

Optionally, after the determining, by the base station according to the RRM measurement report, the initial beam index information that is used for communication with the user equipment, the method further includes:

adjusting, by the base station, user bandwidth of the user equipment according to a traffic volume of the user equipment, where the user bandwidth has a positive correlation with the traffic volume; and sending, by the base station, information about adjusted user bandwidth to the user equipment by using at least one of RRC signaling, a MAC CE, or a control channel.

The user bandwidth includes channels. Therefore, when adjusting the user bandwidth, the base station may adjust the user bandwidth according to the traffic volume by using a channel allocated for the user equipment. Specifically, the adjusting, by the base station, user bandwidth of the user equipment according to a traffic volume of the user equipment includes:

adjusting, by the base station according to the traffic volume of the user equipment, a channel allocated for the user equipment, to obtain the user bandwidth.

Specifically, for details, refer to descriptions of the sixth application scenario in the embodiment shown in FIG. 3, which are not described herein.

User bandwidth of user equipment is adjusted according to a traffic volume of the user equipment, where the user bandwidth has a positive correlation with the traffic volume; information about adjusted user bandwidth is sent to the user equipment according to at least one of RRC signaling, a MAC CE, or a control channel, so that the user bandwidth can be adjusted in real time according to the traffic volume of the user equipment, thereby ensuring normal working of the user equipment.

A seventh application scenario uses an example in which the base station is applied to an SPS scenario for description. This application scenario corresponds to the seventh application scenario in the embodiment shown in FIG. 3.

A transmitter 601 is configured to send SPS resource information to the user equipment, where the SPS resource information is used to indicate resource information and beam index information that are allocated by the base station for the user equipment.

When the SPS resource information includes beam index information, the user equipment may determine a beam according to the beam index information. When the SPS resource information does not include the beam index information, the user equipment may determine the beam according to beam index information carried in the RRM measurement report. The beam may be a sending beam, or may be a receiving beam. The base station may indicate the beam index information when configuring the user equipment by using RRC signaling or when using a control channel to activate an SPS resource.

A processor 603 is configured to communicate with the user equipment according to a beam corresponding to beam index information that is indicated by SPS information.

When the SPS resource information indicates at least two pieces of beam index information, the base station and the user equipment may agree to use a beam of relatively good quality or to use a preset beam according to a measurement result. In this case, the user equipment may send/receive information on the beam of relatively good quality, and correspondingly, the base station receives/sends information on the beam. Alternatively, the user equipment sends/receives information on at least one preset beam at the same time, and correspondingly, the base station receives/sends information on the at least one beam.

The user equipment selects a beam with a relatively good signal status when sending/receiving information in an SPS manner, or sends and/or receives information on one or more predetermined beams at the same time. Correspondingly, the base station may receive/send information on the one or more predetermined beams in the SPS manner. The base station and the user equipment may preferentially select one or more beams with a good signal status from multiple predetermined beam ranges according to the measurement result.

It should be additionally noted that when the base station re-indicates the beam index information according to the measurement result or according to beam index information recommended by the user equipment, only the beam index information in the SPS resource information needs to be modified and it is not required to modify the resource information. In this case, the base station may re-indicate the beam index information to the user equipment by using the RRC signaling, the MAC CE, or the control channel.

SPS resource information is sent to user equipment, where the SPS resource information is used to indicate resource information and beam index information that are allocated by the base station for the user equipment; communication with the user equipment is performed according to a beam corresponding to the beam index information that is indicated by SPS information, so that a resource and a beam can be configured for the user equipment in a manner of sending the SPS resource information, and a problem of wasting communication overheads that is caused by dynamically configuring a resource and a beam for the user equipment can be resolved, thereby achieving an effect of reducing communication overheads.

An eighth application scenario uses an example in which the base station is applied to a D2D scenario for description. This application scenario corresponds to the eighth application scenario in the embodiment shown in FIG. 3.

To avoid mutual interference of D2D communication or D2D communication interference to normal communication of another user equipment in a cell, the base station allocates initial beam index information of a beam for D2D communication for the user equipment.

A transmitter 601 is configured to send, to the user equipment, resource indication information used during D2D communication, where the resource indication information includes D2D resource information and the initial beam index information, and is used to instruct the user equipment and the another user equipment to use a resource and an initial beam used during D2D communication.

Beam index information allocated by the base station may be set by the base station, or may be initial beam index information that the user equipment requests the base station to allocate after determining beam index information of a beam of relatively good quality according to a measurement result. The beam index information allocated by the base station is used for D2D communication between the user equipment and the another user equipment. The D2D resource information includes time-domain resource information and frequency-domain resource information.

It should be additionally noted that cellular communication used between the base station and the user equipment and D2D communication used between the user equipment and the another user equipment may reuse a time-domain resource and a frequency-domain resource on different initial beams.

Resource indication information sent by a base station is received, where the resource indication information includes D2D resource information and beam index information; a resource and a beam used when D2D communication with another user equipment is used is determined according to the resource indication information, so that communication with the another user equipment can be performed according to an initial beam allocated by the base station, thereby resolving a problem of mutual interference in D2D communication, and achieving an effect of improving communication quality.

In conclusion, according to the beam configuration method provided in this embodiment of the present invention, initial beam index information of an initial beam, allocated for user equipment, of a millimeter wave band is sent to UE; an RRM measurement report from the user equipment is received, where the RRM measurement report is obtained after the user equipment performs RRM measurement on the initial beam indicated by the initial beam index information; the initial beam index information that is used for communication with the user equipment is determined according to the RRM measurement report. Signal quality of the initial beam can be determined according to the RRM measurement report, then an initial beam of relatively good signal quality is selected for communication with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Figure 10:
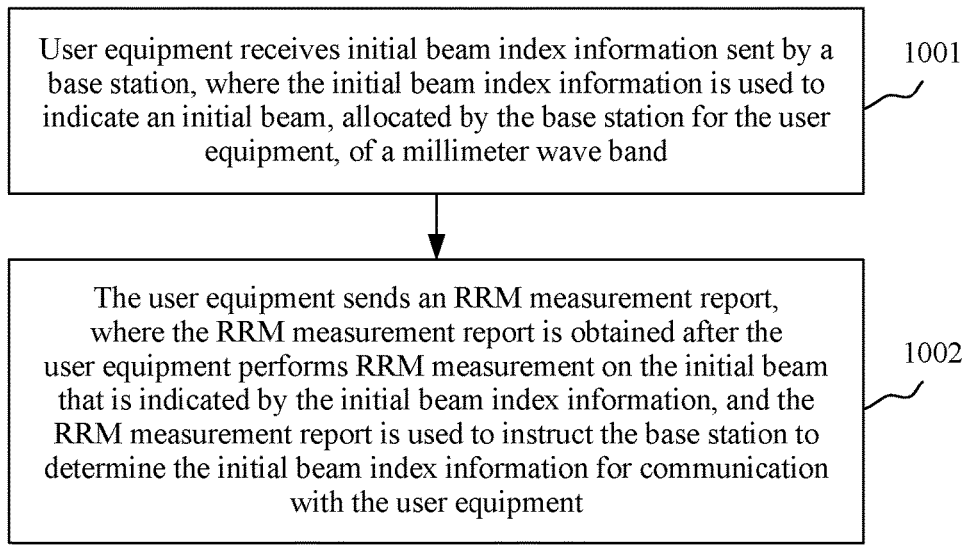
FIG. 10 is a method flowchart of a beam configuration method according to another embodiment of the present invention.

Referring to FIG. 10, FIG. 10 shows a method flowchart of a beam configuration method according to an embodiment of the present invention. The beam configuration method may include the following steps.

Step 1001: User equipment receives initial beam index information sent by a base station, where the initial beam index information is used to indicate an initial beam, allocated by the base station for the user equipment, of a millimeter wave band.

For details on the initial beam index information, refer to descriptions in the embodiment shown in FIG. 2, which are not described herein.

Step 1002: The user equipment sends an RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In order to select an initial beam of relatively good signal quality, for communication, from the initial beam allocated by the base station to improve communication quality, the user equipment may further perform RRM measurement on the determined initial beam allocated by the base station, and generate an RRM measurement report according to a measurement result.

The user equipment may send the RRM measurement report to an LTE eNB, where the LTE eNB forwards the RRM measurement report to a millimeter wave eNB; or may send the RRM measurement report to a millimeter wave eNB. This embodiment imposes no limitation on a manner of sending the RRM measurement report by the user equipment. For a method for sending an RRM measurement report by user equipment in the following embodiments of the present invention, refer to descriptions in this embodiment, which are not described in the following.

The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

In conclusion, according to the beam configuration method provided in this embodiment of the present invention, initial beam index information sent by a base station is received, where the initial beam index information is used to indicate an initial beam, allocated by the base station for the user equipment, of a millimeter wave band; a radio resource management RRM measurement report is sent, where the RRM measurement report is obtained after the user equipment performs RRM measurement on the initial beam indicated by the initial beam index information, and the RRM measurement report is used to instruct the base station to determine the initial beam index information that is used for communication with the user equipment. Signal quality of the initial beam can be reported to the base station according to the RRM measurement report so that the base station selects a beam of relatively good signal quality to communicate with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

Another embodiment of the present invention provides a beam configuration method, where the beam configuration method may include the following steps.

Step 1001: User equipment receives initial beam index information sent by a base station, where the initial beam index information is used to indicate an initial beam, allocated by the base station for the user equipment, of a millimeter wave band.

For details on the initial beam index information, refer to descriptions in the embodiment shown in FIG. 2, which are not described herein.

Step 1002: The user equipment sends an RRM measurement report, where the RRM measurement report is obtained after the user equipment performs RRM measurement on the initial beam that is indicated by the initial beam index information, and the RRM measurement report is used to instruct the base station to determine the initial beam index information that is used for communication with the user equipment.

In order to select an initial beam of relatively good signal quality, for communication, from the initial beam allocated by the base station to improve communication quality, the user equipment may further perform RRM measurement on the determined initial beam allocated by the base station, and generate an RRM measurement report according to a measurement result.

The user equipment may send the RRM measurement report to an LTE eNB, where the LTE eNB forwards the RRM measurement report to a millimeter wave eNB; or may send the RRM measurement report to a millimeter wave eNB. This embodiment imposes no limitation on a manner of sending the RRM measurement report by the user equipment. For a method for sending an RRM measurement report by user equipment in the following embodiments of the present invention, refer to descriptions in this embodiment, which are not described in the following.

The RRM measurement herein may refer to measurement used for mobility management in an ordinary meaning, and is a measurement method filtered through an RRC layer, or may refer to measurement performed in a beam training manner. For details, refer to descriptions in the embodiment shown in FIG. 2, which are not described herein.

The base station determines signal quality of the initial beam according to the RRM measurement report, and then selects an initial beam of relatively good signal quality for communication with the UE, and a beamforming technology is used to resolve existing problems of a relatively short transmission distance of a millimeter wave band and a failure to meet a data communication requirement of user equipment in a cellular communication environment, thereby increasing a transmission distance of a millimeter wave band.

The following uses different application scenarios as examples to describe a beam configuration method, and details are as follows:

A first application scenario uses an example in which the user equipment is applied to a discontinuous receiving scenario for description. This application scenario corresponds to the first application scenario in the embodiment shown in FIG. 5.

There are a dormant state and an active state for the user equipment, and user equipment in the active state needs to listen to a control channel by using a beam allocated by the base station, so as to receive, on the control channel, control information that is sent by the base station by using a beamforming technology. The control information includes a resource allocation control instruction, where the resource allocation control instruction is used to indicate an uplink/downlink resource allocated by the base station for the user equipment. When the user equipment switches from the dormant state to the active state, a beam on which resource allocation control signaling is previously received when the user equipment is in the active state no longer applies. Therefore, the user equipment further needs to determine a beam of a control channel that needs to be listened to this time. This embodiment provides two methods for determining a beam of a control channel that needs to be listened to. The following separately describes the two methods in detail.

In a first method, if the RRM measurement report includes reference signal information corresponding to each piece of initial beam index information and the reference signal information includes at least one of RSRP or RSRQ, after the sending, by the user equipment, an RRM measurement report, the method further includes:

determining, by the user equipment, first initial beam index information of which the reference signal information is greater than a first threshold after the user equipment switches from a dormant state to an active state; and listening to, by the user equipment, control information on a control channel by using an initial beam corresponding to the first initial beam index information.

In the first method for determining the beam, the base station and the user equipment may agree to use an initial beam of relatively good signal quality in the RRM measurement report. For details on a specific process, refer to descriptions of the first application scenario in the embodiment shown in FIG. 3, which are not described herein.

If the user equipment switches from the dormant state to the active state, the user equipment can determine at least one initial beam according to the foregoing method from the RRM measurement report, and listen to the control information on the control channel by using the determined at least one initial beam.

In a second method, the method further includes:

receiving, by the user equipment, second initial beam index information that is specified from each piece of initial beam index information in the RRM measurement report by the base station by using at least one of radio resource control RRC signaling or a Media Access Control control element MAC CE; and listening to, by the user equipment, control information on a control channel by using an initial beam corresponding to the second initial beam index information.

In the second method for determining the beam, the base station may specify, from the allocated initial beam, an initial beam that is used to send the resource allocation control signaling on the control channel, and then send the second initial beam index information of the specified initial beam to the user equipment by using the RRC signaling or the MAC CE.

It should be additionally noted that beam index information may also be jointly determined by using the foregoing first method and second method. For details, refer to descriptions of the first application scenario in the embodiment shown in FIG. 3, which are not described herein.

After determining a beam of the control channel, the user equipment may further listen to the control channel in at least one of the following manners. The listening to, by the user equipment, control information on a control channel by using an initial beam corresponding to the first initial beam index information includes: receiving, by the user equipment, the control information in an omnidirectional manner, or receiving the control information by using a beam range greater than or equal to a beam range of the initial beam corresponding to the first initial beam index information, or receiving the control information by using a beam range less than a beam range of the initial beam corresponding to the first initial beam index information.

The listening to, by the user equipment, control information on a control channel by using an initial beam corresponding to the second initial beam index information includes: receiving, by the user equipment, the control information in an omnidirectional manner, or receiving the control information by using a beam range greater than or equal to a beam range of the initial beam corresponding to the second initial beam index information, or receiving the control information by using a beam range less than a beam range of the initial beam corresponding to the second initial beam index information.

In this embodiment, for details on a process of listening to the control information by the user equipment, refer to descriptions of the first application scenario in the embodiment shown in FIG. 3, which are not described herein.

If an RRM measurement report includes reference signal information corresponding to each piece of initial beam index information and the reference signal information includes at least one of reference signal received power RSRP or reference signal received quality RSRQ, after user equipment switches from a dormant state to an active state, the user equipment determines first initial beam index information of which the reference signal information is greater than a first threshold, and listen to control information on a control channel by using an initial beam corresponding to the first initial beam index information, so that the control information can be received by using an initial beam of relatively good signal quality in the RRM measurement report, thereby improving communication efficiency.

A second application scenario uses an example in which the user equipment is applied to a TA scenario for description. This application scenario corresponds to the second application scenario in the embodiment shown in FIG. 5.

A barrier between the user equipment and the base station lowers communication quality of a beam. Therefore, the base station may preconfigure an alternative beam for the user equipment, so as to improve communication quality by avoiding the barrier. Therefore, optionally, the method further includes:

receiving, by the user equipment, alternative beam index information sent by the base station, where the alternative beam index information is used to indicate an alternative beam, allocated by the base station for the user equipment, of a millimeter wave band;

if reference signal information of the initial beam is less than a second threshold, performing, by the user equipment, RRM measurement on an alternative beam indicated by each piece of alternative beam index information, where the reference signal information includes at least one of RSRP or RSRQ;

determining, by the user equipment according to the RRM measurement, first alternative beam index information of which reference signal information is greater than a third threshold; and sending, by the user equipment, the determined first alternative beam index information to the base station, where the base station is configured to communicate with the user equipment according to an alternative beam corresponding to the first alternative beam index information.

For details on a process of configuring an alternative beam for the user equipment by the base station, refer to descriptions of the second application scenario in the embodiment shown in FIG. 3, which are not described herein.

In this embodiment, different user equipments have different distances with the base station. Therefore, signal transmission delays of different user equipments are different. If uplink information sent by different user equipments needs to arrive at the base station at the same time, the base station needs to configure different TA for different user equipments according to distances between the user equipments and the base station. Generally, compared with the initial beam allocated by the base station, the alternative beam has a relatively long propagation path, leading to a relatively large propagation delay. In this case, consequently, the uplink TA changes suddenly. In this case, the user equipment needs to redetermine the uplink TA. Determining the uplink TA needs to be implemented by using a random access procedure.

In this embodiment, the method further includes:

automatically sending, by the user equipment, a first random access request to the base station, where the first random access request is used to instruct the base station to generate uplink timing advance TA and to communicate with the user equipment according to the uplink TA and an alternative beam corresponding to allocated second alternative beam index information; or receiving, by the user equipment on a control channel, a random access instruction sent by the base station, where the random access instruction is sent after the base station determines, by using beam tracking, to use the alternative beam allocated for the user equipment to communicate with the user equipment; sending a second random access request to the base station according to the random access instruction, where the second random access request is used to instruct the base station to generate uplink TA and to communicate with the user equipment according to the uplink TA and the alternative beam corresponding to the received first alternative beam index information.

When the user equipment actively triggers the random access procedure, the user equipment actively sends the first random access request to the base station. When the user equipment triggers the random access procedure as instructed by a random access instruction, the user equipment sends a second random access request to the base station. For details on a specific process, refer to descriptions of the second application scenario in the embodiment shown in FIG. 3, which are not described herein.

Accordingly, when the user equipment detects that reference signal information of each alternative beam is less than the third threshold and that reference signal information of at least one initial beam is greater than the second threshold, it is determined that quality of the initial beam is relatively good, and initial beam index information of the at least one initial beam is sent to the base station. The base station uses the at least one initial beam to communicate with the base station. Alternatively, the base station uses a beamforming technology to determine that the user equipment is about to leave the barrier area; and when detecting that the reference signal information of the at least one initial beam is greater than the second threshold, determines to use the at least one initial beam to communicate with the base station. In this case, the user equipment may redetermine the uplink TA, or may not determine the uplink TA.

In this embodiment, there may be different TA for beams used by the user equipment, and the TA may be for a same millimeter wave base station or may be for different millimeter wave base stations. Therefore, the base station may further configure at least one TA set for each user equipment, where each TA set includes at least one piece of beam index information, and uplink TA corresponding to each piece of beam index information is the same. The beam index information may be the initial beam index information of the initial beam, or may be the alternative beam index information of the alternative beam. Beams indicated by beam index information in one TA set may belong to a same cell, or may belong to different cells. Therefore, a cell identifier of a cell associated with each beam may further be identified in the TA set.

In this embodiment, the method further includes:
 receiving, by the user equipment, a TA set sent by the base station, where the TA set is generated, after the base station determines beams that have same uplink TA and are in beams for communication with the user equipment as a group, according to each group, the TA set includes a TA set identifier, beam index information of each beam in the group, and a cell identifier and a time alignment timer TAT that correspond to each beam in the group, and the beam includes at least one of the initial beam or the alternative beam;
 if the TAT in the TA set has expired, detecting, by the user equipment, whether the cell identifier in the TA set corresponds to beam index information in another TA set and whether a TAT in the another TA set has not expired; and
 if it is detected that the cell identifier in the TA set corresponds to the beam index information in the another TA set and the TAT in the another TA set has not expired, determining, by the user equipment, a cell corresponding to the beam index information, and maintaining a hybrid automatic repeat request HARQ buffer area and a sounding reference symbol SRS resource that correspond to the cell; or
 if it is detected that the cell identifier in the TA set corresponds to the beam index information in the another TA set and the TAT in the another TA set has expired, determining, by the user equipment, a cell corresponding to the beam index information, and releasing a HARQ buffer area and an SRS resource that correspond to the cell.

Alternative beam index information sent by a base station is received, where the alternative beam index information is used to indicate an alternative beam, allocated by the base station for user equipment, of a millimeter wave band; if reference signal information of an initial beam is less than a second threshold, RRM measurement is performed on an alternative beam indicated by each piece of alternative beam index information; first alternative beam index information of which reference signal information is greater than a third threshold is determined according to the RRM measurement; the determined first alternative beam index information is sent to the base station. An alternative beam of relatively good quality can be used for communication with the base station when quality of an allocated initial beam is relatively poor, achieving an effect of improving communication efficiency.

A third application scenario uses an example in which the user equipment is applied to a power control scenario for description. This application scenario corresponds to the third application scenario in the embodiment shown in FIG. 5.

The base station uses the beamforming technology, and path losses at different beam directions may be different. Therefore, an initial beam with a smallest path loss needs to be selected from the allocated initial beam, and communication is performed on the selected initial beam.

Optionally, after the sending, by the user equipment, a radio resource management RRM measurement report, the method further includes:
 measuring, by the user equipment, RSRP of an initial beam corresponding to each piece of initial beam index information, to obtain path loss information of each initial beam;
 generating, by the user equipment, power headroom PH according to smallest path loss information, to obtain a power headroom report PHR; and
 sending, by the user equipment, the PHR, where the PHR is used to instruct the base station to allocate an uplink resource for the user equipment according to the PH and an initial beam corresponding to the PH and to communicate with the user equipment on the corresponding uplink resource by using the initial beam corresponding to the PH.

Beam index information sent by the base station may correspond to a beam outside a beam range corresponding to the RRM measurement report, may correspond to an initial beam in a beam range corresponding to the RRM measurement report, or may be an adaptively determined beam. This is not limited in this embodiment.

If the base station expects to perform uplink scheduling on the user equipment within a smaller beam range to obtain a better directional gain and more accurate power control, initial beam index information can be dynamically indicated by using a MAC CE, so that the user equipment reports PH of a beam with a smallest path loss thereof.

Optionally, the measuring, by the user equipment, RSRP of an initial beam corresponding to each piece of initial beam index information, to obtain path loss information of each initial beam includes:
 receiving, by the user equipment, a first indication that is sent by the base station and carries first beam index information of a first beam in a beam range of a single initial beam; and
 measuring, by the user equipment, RSRP of each first beam indicated by the first indication, to obtain path loss information of each first beam.

It should be additionally noted that when the base station does not limit uplink transmit power of the user equipment, the user equipment may support multiple beams in terms of uplink, to improve air interface efficiency. If the user equipment supports multiple beams at the same time and power is limited to an extent, transmit power of at least one beam further needs to be lowered. For details on a specific lowering method, refer to descriptions of the third application scenario in the embodiment shown in FIG. 3, which are not described herein.

RSRP of an initial beam corresponding to each piece of initial beam index information is performed, to obtain path loss information of each initial beam; PH is generated according to smallest path loss information, to obtain a PHR; the PHR is sent, where the PHR is used to instruct a base station to allocate an uplink resource for user equipment according to the PH and an initial beam corresponding to the PH; communication with the user equipment is performed on the corresponding uplink resource by using the initial beam corresponding to the PH, so that an uplink resource corresponding to an initial beam with a smallest path loss can be selected for communication with the base station, thereby reducing transmit power.

A fourth application scenario uses an example in which the user equipment is applied to a CSI measurement scenario for description. This application scenario corresponds to the fourth application scenario in the embodiment shown in FIG. 5.

In this embodiment, the user equipment further needs to perform CSI measurement on the initial beam to obtain CSI information, so as to determine quality of the initial beam according to the CSI information.

Optionally, after the sending, by the user equipment, a radio resource management RRM measurement report, the method further includes:

performing, by the user equipment, channel state information CSI measurement on an initial beam corresponding to each piece of initial beam index information, to obtain a channel quality indicator CQI of each initial beam;

generating, by the user equipment, channel state information CSI information according to a highest CQI, to obtain a CSI measurement report; and sending, by the user equipment, the CSI measurement report, where the CSI measurement report is used to instruct the base station to communicate with the user equipment according to the CSI information and an initial beam corresponding to the CSI information.

A beam measured by the user equipment may be an initial beam in a range of the RRM measurement report; then, the user equipment first needs to acquire an initial beam corresponding to the RRM measurement report. For details on a specific acquiring method, refer to descriptions of the fourth application scenario in the embodiment shown in FIG. 3, which are not described herein.

After measuring the CSI information of each initial beam, the user equipment may sort out, from each piece of CSI information, CSI information that includes a highest CQI, and generate the CSI measurement report according to at least one CSI information that is sorted out. The CSI information includes at least one of a CQI, a PMI, or an RI, and the user equipment may send at least one of the CQI, the PMI, or the RI to the base station at the same time or at different moments.

If the base station expects to perform uplink scheduling on the user equipment within a smaller beam range to obtain a better directional gain, beam index information can be dynamically indicated by using a MAC CE, so that the user equipment reports CSI information with a highest CQI thereof.

Optionally, the performing, by the user equipment, channel state information CSI measurement on an initial beam corresponding to each piece of initial beam index information, to obtain a channel quality indicator CQI of each initial beam includes:

receiving, by the user equipment, a second indication that is sent by the base station and carries second beam index information of a second beam in a beam range of a single initial beam; and performing, by the user equipment, CSI measurement on each second beam indicated by the second indication, to obtain a CQI of each second beam.

Channel state information CSI measurement is performed on an initial beam corresponding to each piece of initial beam index information, to obtain a CQI of each initial beam; CSI information is generated according to a highest CQI, to obtain a CSI measurement report; the CSI measurement report is sent, where the CSI measurement report is used to instruct a base station to communicate with user equipment according to the CSI information and an initial beam corresponding to the CSI information, so that an initial beam with the highest CQI can be selected to communicate with the base station, thereby improving communication efficiency.

A fifth application scenario uses an example in which the user equipment is applied to a cell bandwidth adjustment scenario for description. This application scenario corresponds to the fifth application scenario in the embodiment shown in FIG. 5.

In this embodiment, when a traffic volume of each user equipment that accesses a cell changes and consequently, load of the cell changes, the base station needs to adjust cell bandwidth of the cell. For details on a specific adjustment method, refer to descriptions of the fifth application scenario in the embodiment shown in FIG. 3, which are not described herein.

An adjusted cell may use multiple channels, so that the multiple channels share a same HARQ entity. In this case, the entire cell may include multiple same-bandwidth channels, and the base station may send common information on a channel located at the center frequency, or the base station may send the common information on a central frequency of each channel.

Accordingly, the method further includes:

receiving, by the user equipment by means of broadcasting, information about adjusted cell bandwidth and information about a center frequency that are sent by the base station, or receiving RRC signaling sent by the base station, where the RRC signaling carries information about adjusted cell bandwidth and information about a center frequency, the adjusted cell bandwidth is adjusted by the base station according to a traffic volume of the user equipment, the cell bandwidth has a positive correlation with the traffic volume, and the center frequency is a central frequency in a frequency range corresponding to the adjusted cell bandwidth or is a specified frequency in the frequency range; and if the adjusted cell includes same-bandwidth channels, receiving, by the user equipment on a channel located at the center frequency, common information sent by the base station, or receiving, on a central frequency of each channel, common information sent by the base station.

The user equipment may receive the information about the adjusted cell bandwidth and information about the center frequency in a manner corresponding to a manner in which the base station sends the information about the adjusted cell bandwidth and information about the center frequency. The user equipment receives, according to the information about the center frequency, common information on a channel located at the center frequency, or receives common information on a central frequency of each channel.

Information about adjusted cell bandwidth and information about a center frequency that are sent by a base station are received by means of broadcasting, or RRC signaling sent by a base station is received, where the RRC signaling carries information about adjusted cell bandwidth and information about a center frequency, the adjusted cell bandwidth is adjusted by the base station according to a traffic volume of user equipment, the cell bandwidth has a positive correlation with the traffic volume, and the center frequency is a central frequency in a frequency range corresponding to the adjusted cell bandwidth or is a specified frequency in the frequency range, so that only the cell bandwidth can be adjusted and it is not required to configure another radio resource configuration parameter, thereby reducing communication overheads during a cell bandwidth configuration process.

A sixth application scenario uses an example in which the user equipment is applied to a user bandwidth adjustment scenario for description. This application scenario corresponds to the sixth application scenario in the embodiment shown in FIG. 5.

Sometimes, an overall load status of a cell does not change significantly but traffic volumes of some user equipments change greatly, and consequently, a requirement of these user equipments for cell bandwidth changes. In this case, only cell bandwidth of these user equipments needs to be adjusted. From a perspective of user equipment, user bandwidth of the user equipment may be adaptively reduced or increased. From a perspective of the base station, however, the base station still sends information by using originally used cell bandwidth but frequency ranges used by different user equipments may be different.

The user bandwidth includes channels. Therefore, when adjusting the user bandwidth, the base station may adjust the user bandwidth according to the traffic volume by using a channel allocated for the user equipment.

Accordingly, the method further includes:

receiving, by the user equipment, information, sent by the base station, about adjusted user bandwidth by using at least one of RRC signaling, a MAC CE, or a control channel, where the adjusted user bandwidth is adjusted by the base station according to a traffic volume of the user equipment, and the user bandwidth has a positive correlation with the traffic volume; and listening to, by the user equipment, a control channel of channels included by the user bandwidth.

The user equipment may receive the information about the adjusted user bandwidth in a manner corresponding to a manner in which the base station sends the information about the adjusted cell bandwidth, and listen to the channels that are included by the user bandwidth. Bandwidth remaining after the user bandwidth is adjusted may be continuous or discontinuous in a frequency domain.

Specifically, for details, refer to descriptions of the sixth application scenario in the embodiment shown in FIG. 3, which are not described herein.

Information, sent by a base station, about adjusted user bandwidth is received by using at least one of RRC signaling, a MAC CE, or a control channel, where the adjusted user bandwidth is adjusted by the base station according to a traffic volume of user equipment, and the user bandwidth has a positive correlation with the traffic volume, so that the user bandwidth can be adjusted in real time according to the traffic volume of the user equipment, thereby ensuring normal working of the user equipment.

A seventh application scenario uses an example in which the user equipment is applied to an SPS scenario for description. This application scenario corresponds to the seventh application scenario in the embodiment shown in FIG. 5.

A receiver 801 is configured to receive SPS resource information sent by the base station.

When the SPS resource information includes beam index information, the user equipment may determine a beam according to the beam index information. When the SPS resource information does not include the beam index information, the user equipment may determine the beam according to beam index information carried in the RRM measurement report. The beam may be a sending beam, or may be a receiving beam. The base station may indicate the beam index information when configuring the user equipment by using RRC signaling or when using a control channel to activate an SPS resource.

The user equipment further includes a processor 803, configured to determine, according to the SPS resource information, resource information and beam index information that are allocated by the base station for the user equipment.

When the SPS resource information indicates at least two pieces of beam index information, the base station and the user equipment may agree to use a beam of relatively good quality or to use a preset beam according to a measurement result. In this case, the user equipment may send/receive information on the beam of relatively good quality, and correspondingly, the base station receives/sends information on the beam. Alternatively, the user equipment sends/receives information on at least one preset beam at the same time, and correspondingly, the base station receives/sends information on the at least one beam.

The user equipment selects a beam with a relatively good signal status when sending/receiving information in an SPS manner, or sends and/or receives information on one or more predetermined beams at the same time. Correspondingly, the base station may receive/send information on the one or more predetermined beams in the SPS manner. The base station and the user equipment may preferentially select one or more beams with a good signal status from multiple predetermined beam ranges according to the measurement result.

It should be additionally noted that when the base station re-indicates the beam index information according to the measurement result or according to beam index information recommended by the user equipment, only the beam index information in the SPS resource information needs to be modified and it is not required to modify the resource information. In this case, the base station may re-indicate the beam index information to the user equipment by using the RRC signaling, the MAC CE, or the control channel.

SPS resource information sent by a base station is received, and resource information and beam index information that are allocated by the base station for user equipment is determined according to the SPS resource information, so that a resource and a beam can be configured in a manner of sending the SPS resource information, and a problem of wasting communication overheads that is caused by dynamically configuring a resource and a beam for the user equipment can be resolved, thereby achieving an effect of reducing communication overheads.

An eighth application scenario uses an example in which the user equipment is applied to a D2D scenario for description. This application scenario corresponds to the eighth application scenario in the embodiment shown in FIG. 5.

To avoid mutual interference of D2D communication or D2D communication interference to normal communication of another user equipment in a cell, the base station allocates initial beam index information of a beam for D2D communication for the user equipment.

A receiver 801 receives resource indication information sent by the base station, where the resource indication information includes D2D resource information and the initial beam index information.

The user equipment further includes a processor 803, configured to determine, according to the resource indication information received by the receiver 801, a resource and an initial beam used when D2D communication with another user equipment is used.

Beam index information allocated by the base station may be set by the base station, or may be initial beam index information that the user equipment requests the base station to allocate after determining beam index information of a beam of relatively good quality according to a measurement result. The beam index information allocated by the base station is used for D2D communication between the user equipment and the another user equipment. The D2D resource information includes time-domain resource information and frequency-domain resource information.

It should be additionally noted that cellular communication used between the base station and the user equipment and D2D communication used between the user equipment and the another user equipment may reuse a time-domain resource and a frequency-domain resource on different initial beams.

Resource indication information sent by a base station is received, where the resource indication information includes D2D resource information and beam index information; a resource and a beam used when D2D communication with another user equipment is used is determined according to the resource indication information, so that communication with the another user equipment can be performed according to an initial beam allocated by the base station, thereby resolving a problem of mutual interference in D2D communication, and achieving an effect of improving communication quality.

In conclusion, according to the beam configuration method provided in this embodiment of the present invention, initial beam index information sent by a base station is received, where the initial beam index information is used to indicate an initial beam, allocated by the base station for the user equipment, of a millimeter wave band; a radio resource management RRM measurement report is sent, where the RRM measurement report is obtained after the user equipment performs RRM measurement on the initial beam indicated by the initial beam index information, and the RRM measurement report is used to instruct the base station to determine the initial beam index information that is used for communication with the user equipment. Signal quality of the initial beam can be reported to the base station according to the RRM measurement report so that the base station selects a beam of relatively good signal quality to communicate with the user equipment, and a beamforming technology is used to resolve existing problems of a relatively short transmission distance of a millimeter wave band and a failure to meet a data communication requirement of user equipment in a cellular communication environment, so that an effect of increasing a transmission distance of a millimeter wave band is achieved.

It should be noted that when the base station and the user equipment provided in the foregoing embodiments perform beam configuration, the division of the foregoing function modules is used as an example only; during an actual application, the foregoing function allocation can be completed by different function modules according to a requirement, that is, internal structures of the base station and the user equipment are divided into different function modules to perform all or some of the foregoing functions. In addition, the base station and the user equipment provided by the foregoing embodiments and the beam configuration method embodiments belong to the same idea. For details on a specific implementation process, refer to the method embodiments, which are not described herein.

The sequence numbers of the foregoing embodiments of the present invention are merely for illustrative purposes, and are not intended to indicate priorities of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A base station, wherein the base station comprises:
a transmitter, configured to send initial beam index information of an initial beam, allocated for user equipment, of a millimeter wave band to the user equipment:
a receiver, configured to receive a radio resource management (RRM) measurement report from the user equipment, wherein the RRM measurement report is obtained after the user equipment performs RRM measurement on the initial beam that is indicated by the initial beam index information sent by the transmitter; and
a processor, configured to determine, according to the RRM measurement report received by the receiver, the initial beam index information that is used for communication with the user equipment;
wherein the transmitter is further configured to send alternative beam index information of an alternative beam, allocated for the user equipment, of the millimeter wave band to the user equipment;
the receiver is further configured to receive first alternative beam index information that is selected from each piece of alternative beam index information sent by the transmitter and that is sent by the user equipment, wherein the first alternative beam index information is alternative beam index information of which reference signal information of the initial beam is less than a second threshold and of which reference signal information determined after RRM measurement is performed on the alternative beam indicated by each piece of alternative beam index information is greater than a third threshold, and the reference signal information comprises at least one of reference signal receiving power (RSRP) or reference signal receiving quality (RSRQ); and the processor is further configured to communicate with the user equipment according to the alternative beam corresponding to the first alternative beam index information received by the receiver.

2. The base station according to claim 1, wherein the processor is configured to determine, from reference signal information corresponding to each piece of initial beam index information in the RRM measurement report, first initial beam index information of which the reference signal information is greater than a first threshold, wherein the reference signal information comprises at least one of RSRP or RSRQ; and the transmitter is further configured to send control information to the user equipment on a control channel using an initial beam corresponding to the first initial beam index information determined by the processor, and the user equipment is configured to, after switching from a dormant state to an active state, listen to the control information using the initial beam corresponding to the determined first initial beam index information.

3. The base station according to claim 1, wherein the transmitter is further configured to specify second initial beam index information from each piece of initial beam index information in the RRM measurement report using at least one of radio resource control (RRC) signaling or a Media Access Control Element (MAC CE), wherein an initial beam corresponding to the specified second initial beam index information is used to send the control information to the user equipment on a control channel.

4. The base station according to claim 3, wherein: the transmitter is further configured to receive a first random access request sent by the user equipment; and the processor is configured to generate an uplink timing advance (TA) according to the first random access request, and communicate with the user equipment according to the uplink TA and the alternative beam corresponding to the received first alternative beam index information.

5. The base station according to claim 3, wherein the processor is further configured to determine, using beam tracking, to use the alternative beam allocated for the user equipment to communicate with the user equipment; the transmitter is further configured to send a random access instruction to the user equipment on a control channel; the receiver is further configured to receive a second random access request that is sent by the user equipment according to the random access instruction sent by the transmitter, and the processor is configured to generate an uplink timing advance (TA) according to the second random access request received by the receiver, and communicate with the user equipment according to the uplink TA and an alternative beam corresponding to allocated second alternative beam index information.

6. User equipment, wherein the user equipment comprises: a receiver, configured to receive initial beam index information sent by a base station, wherein the initial beam index information is used to indicate an initial beam, allocated by the base station for the user equipment, of a millimeter wave band; and a transmitter, configured to send a radio resource management (RRM) measurement report to the base station, wherein the RRM measurement report is obtained after the user equipment performs RRM measurement on the initial beam that is indicated by the initial beam index information, and the RRM measurement report is used to instruct the base station to determine the initial beam index information that is used for communication with the user equipment; wherein: the receiver is further configured to receive alternative beam index information sent by the base station, wherein the alternative beam index information is used to indicate an alternative beam, allocated by the base station for the user equipment, of the millimeter wave band; the user equipment further comprises a processor, configured to, when reference signal information of the initial beam is less than a second threshold, perform RRM measurement on the alternative beam indicated by each piece of alternative beam index information received by the receiver, wherein the reference signal information comprises at least one of reference signal received power (RSRP) or reference signal received quality (RSRQ); and determine, according to the RRM measurement, first alternative beam index information of which reference signal information is greater than a third threshold; and the transmitter is further configured to send the first alternative beam index information determined by the processor to the base station, wherein the base station is configured to communicate with the user equipment according to the alternative beam corresponding to the first alternative beam index information.

7. The user equipment according to claim 6, wherein if the RRM measurement report comprises reference signal information corresponding to each piece of initial beam index information and the reference signal information comprises at least one of reference signal received power (RSRP) or reference signal received quality (RSRQ), the user equipment further comprises a processor, configured to, after the transmitter sends the radio resource management RRM measurement report, determine first initial beam index information of which the reference signal information is greater than a first threshold after the user equipment switches from a dormant state to an active state; and the receiver is further configured to listen to control information on a control channel using an initial beam corresponding to the first initial beam index information determined by the processor.

8. The user equipment according to claim 7, wherein the receiver is configured to receive the control information in an omnidirectional manner, or receive the control information using a beam range greater than or equal to a beam range of the initial beam corresponding to the first initial beam index information, or receive the control information using a beam range less than a beam range of the initial beam corresponding to the first initial beam index information; or receive the control information using a beam range greater than or equal to a beam range of the initial beam corresponding to the second initial beam index information, or receive the control information using a beam range less than a beam range of the initial beam corresponding to the second initial beam index information.

9. The user equipment according to claim 6, wherein the receiver is further configured to receive second initial beam index information that is specified from each piece of initial beam index information in the RRM measurement report by the base station using at least one of radio resource control (RRC) signaling or a Media Access Control Element (MAC CE); and listen to control information on a control channel using an initial beam corresponding to the second initial beam index information.

10. The user equipment according to claim 6 wherein the transmitter is further configured to automatically send a first random access request to the base station, wherein the first random access request is used to instruct the base station to generate an uplink timing advance (TA) and to communicate with the user equipment according to the uplink TA and an alternative beam corresponding to allocated second alternative beam index information; or receive, on a control channel, a random access instruction sent by the base station, wherein the random access instruction is sent after the base station determines, using beam tracking, to use the alternative beam allocated for the user equipment to communicate with the user equipment; and send a second random access request to the base station according to the random access instruction, wherein the second random access request is used to instruct the base station to generate the uplink TA and to communicate with the user equipment according to the uplink TA and the alternative beam corresponding to the received first alternative beam index information.

11. A beam configuration method, wherein the method comprises: sending, by a base station, initial beam index information of an initial beam, allocated for user equipment, of a millimeter wave band to the user equipment; receiving, by the base station, a radio resource management (RRM) measurement report from the user equipment, wherein the RRM measurement report is obtained after the user equipment performs RRM measurement on the initial beam that is indicated by the initial beam index information; and determining, by the base station according to the RRM measurement report, the initial beam index information that is used for communication with the user equipment; wherein the method further comprises: sending, by the base station, alternative beam index information of an alternative beam, allocated for the user equipment, of the millimeter wave band to the user equipment; receiving, by the base station, first alternative beam index information that is selected from each piece of alternative beam index information and that is sent by the user equipment, wherein the first alternative beam index information is alternative beam index information of which reference signal information of the initial beam is less than a second threshold and of which reference signal information determined after RRM measurement is performed on the alternative beam indicated by each piece of alternative beam index information is greater than a third threshold, and the reference signal information comprises at least one of reference signal received power (RSRP) or reference signal received quality (RSRQ); and communicating, by the base station, with the user equipment according to the alternative beam corresponding to the received first alternative beam index information.

12. The method according to claim 11, wherein the determining, by the base station according to the RRM measurement report, the initial beam index information that is used for communication with the user equipment comprises: determining, by the base station from reference signal information corresponding to each piece of initial beam index information in the RRM measurement report, first initial beam index information of which the reference signal information is greater than a first threshold, wherein the reference signal information comprises at least one of RSRP or RSRQ; wherein the base station sends control information to the user equipment on a control channel using an initial beam corresponding to the determined first initial beam index information, and the user equipment is configured to, after switching from a dormant state to an active state, listen to the control information by using the initial beam corresponding to the determined first initial beam index information.

13. The method according to claim 11, wherein the method further comprises: specifying, by the base station, second initial beam index information from each piece of initial beam index information in the RRM measurement report using at least one of radio resource control (RRC) signaling or a Media Access Control Element (MAC CE), wherein an initial beam corresponding to the specified second initial beam index information is used to send the control information to the user equipment on a control channel.

14. The method according to claim 13, wherein the communicating, by the base station, with the user equipment according to an alternative beam corresponding to the received first alternative beam index information comprises: receiving, by the base station, a first random access request sent by the user equipment, and generating an uplink timing advance (TA) according to the first random access request; and communicating, by the base station, with the user equipment according to the uplink TA and the alternative beam corresponding to the received first alternative beam index information.

15. The method according to claim 13, wherein the method further comprises: determining, by the base station by using beam tracking, to use the alternative beam allocated for the user equipment to communicate with the user equipment; sending, by the base station, a random access instruction to the user equipment on a control channel; receiving, by the base station, a second random access request that is sent by the user equipment according to the random access instruction, and generating an uplink timing advance (TA) according to the second random access request; and communicating, by the base station, with the user equipment according to the uplink TA and an alternative beam corresponding to allocated second alternative beam index information.

16. A beam configuration method, wherein the method comprises: receiving, by user equipment, initial beam index information sent by a base station, wherein the initial beam index information is used to indicate an initial beam, allocated by the base station for the user equipment, of a millimeter wave band; sending, by the user equipment, a radio resource management (RRM) measurement report, wherein the RRM measurement report is obtained after the user equipment performs RRM measurement on the initial beam that is indicated by the initial beam index information, and the RRM measurement report is used to instruct the base station to determine the initial beam index information that is used for communication with the user equipment; receiving, by the user equipment, alternative beam index information sent by the base station, wherein the alternative beam index information is used to indicate an alternative beam, allocated by the base station for the user equipment, of the millimeter wave band; if reference signal information of the initial beam is less than a second threshold, performing, by the user equipment, RRM measurement on the alternative beam indicated by each piece of alternative beam index information, wherein the reference signal information comprises at least one of reference signal received power (RSRP) or reference signal received quality (RSRQ); determining, by the user equipment according to the RRM measurement, first alternative beam index information of which reference signal information is greater than a third threshold; and sending, by the user equipment, the determined first alternative beam index information to the base station, wherein the base station is configured to communicate with the user equipment according to the alternative beam corresponding to the first alternative beam index information.

17. The method according to claim 16, wherein if the RRM measurement report comprises reference signal information corresponding to each piece of initial beam index information and the reference signal information comprises at least one of reference signal received power (RSRP) or reference signal received quality (RSRQ), after the sending, by the user equipment, a radio resource management RRM measurement report, the method further comprises: determining, by the user equipment, first initial beam index information of which the reference signal information is greater than a first threshold after the user equipment switches from a dormant state to an active state; and listening to, by the user equipment, control information on a control channel using an initial beam corresponding to the first initial beam index information.

18. The method according to claim 17, wherein the listening to, by the user equipment, control information on a control channel using an initial beam corresponding to the first initial beam index information comprises: receiving, by the user equipment, the control information in an omnidirectional manner, or receiving the control information using a beam range greater than or equal to a beam range of the initial beam corresponding to the first initial beam index information, or receiving the control information using a beam range less than a beam range of the initial beam corresponding to the first initial beam index information; and the listening to, by the user equipment, control information on a control channel using an initial beam corresponding to the second initial beam index information comprises: receiving, by the user equipment, the control information in an omnidirectional manner, or receiving the control information using a beam range greater than or equal to a beam range of the initial beam corresponding to the second initial beam index information, or receiving the control information using a beam range less than a beam range of the initial beam corresponding to the second initial beam index information.

19. The method according to claim 16, wherein the method further comprises: receiving, by the user equipment, second initial beam index information that is specified from each piece of initial beam index information in the RRM measurement report by the base station using at least one of radio resource control (RRC) signaling or a Media Access Control Element (MAC CE); and listening to, by the user equipment, control information on a control channel using an initial beam corresponding to the second initial beam index information.

20. The method according to claim 16, wherein the method further comprises: automatically sending, by the user equipment, a first random access request to the base station, wherein the first random access request is used to instruct the base station to generate an uplink timing advance (TA) and to communicate with the user equipment according to the uplink TA and an alternative beam corresponding to allocated second alternative beam index information; or receiving, by the user equipment on a control channel, a random access instruction sent by the base station, wherein the random access instruction is sent after the base station determines, using beam tracking, to use the alternative beam allocated for the user equipment to communicate with the user equipment; sending a second random access request to the base station according to the random access instruction, wherein the second random access request is used to instruct the base station to generate the uplink TA and to communicate with the user equipment according to the uplink TA and the alternative beam corresponding to the received first alternative beam index information.

* * * * *

UNITED STATES PATENT AND TRADEMARK OFFICE
CERTIFICATE OF CORRECTION

PATENT NO. : 10,264,568 B2
APPLICATION NO. : 15/466546
DATED : April 16, 2019
INVENTOR(S) : Zhang et al.

Page 1 of 1

It is certified that error appears in the above-identified patent and that said Letters Patent is hereby corrected as shown below:

Claim 6, Column 98, Line 55-56 "reference signal received quality (RSRO)" should read
-- reference signal received quality (RSRQ) --.

Signed and Sealed this
Twenty-first Day of January, 2020

Andrei Iancu
*Director of the United States Patent and Trademark Office*